(12) United States Patent
Belmont et al.

(10) Patent No.: US 12,176,522 B2
(45) Date of Patent: Dec. 24, 2024

(54) CARBON FOAMS, DOPED CARBON COMPOSITES, PROCESSES FOR FABRICATING CARBON FOAMS AND DOPED CARBON COMPOSITES, AND USES THEREOF

(71) Applicant: UNIVERSITY OF WYOMING, Laramie, WY (US)

(72) Inventors: Erica Belmont, Laramie, WY (US); Kurt Stahlfeld, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 17/541,105

(22) Filed: Dec. 2, 2021

(65) Prior Publication Data

US 2022/0181607 A1    Jun. 9, 2022

Related U.S. Application Data

(60) Provisional application No. 63/121,150, filed on Dec. 3, 2020.

(51) Int. Cl.
| | | |
|---|---|---|
| *H01M 4/1393* | (2010.01) | |
| *B01J 3/00* | (2006.01) | |
| *C01B 32/05* | (2017.01) | |
| *C11B 1/00* | (2006.01) | |
| *H01M 4/36* | (2006.01) | |
| *H01M 4/38* | (2006.01) | |
| *H01M 4/587* | (2010.01) | |

(52) U.S. Cl.
CPC ............. *H01M 4/364* (2013.01); *B01J 3/008* (2013.01); *C01B 32/05* (2017.08); *C11B 1/00* (2013.01); *H01M 4/386* (2013.01); *H01M 4/587* (2013.01); *C01P 2002/85* (2013.01); *C01P 2002/88* (2013.01); *C01P 2004/03* (2013.01); *C01P 2006/10* (2013.01); *C01P 2006/16* (2013.01); *C01P 2006/40* (2013.01)

(58) Field of Classification Search
CPC ...... H01M 4/364; H01M 4/386; H01M 4/587; C01B 32/05; B01J 3/008; C11B 1/00; C01P 2002/85; C01P 2002/88; C01P 2004/03; C01P 2006/10; C01P 2006/16; C01P 2006/40

See application file for complete search history.

(56) References Cited

U.S. PATENT DOCUMENTS

| | | | |
|---|---|---|---|
| 3,121,050 A | 2/1964 | Ford | |
| 5,888,469 A | 3/1999 | Stiller et al. | |
| 6,033,506 A | 3/2000 | Klett | |
| 8,277,557 B2 * | 10/2012 | Reknes | C04B 16/12 106/726 |

OTHER PUBLICATIONS

Preparation of Lignosulfonate-Based Carbon Foams by Pyrolysis and Their Use in the Microencapsulation of a Phase Change Material, Palazzolo et al., ACS Sustainable Chem. Eng. 2018, 6, 2453-2461.*

Biomass feedstocks for renewable fuel production: a review of the impacts of feedstock and pretreatment on the yield and product distribution of fast pyrolysis bio-oils and vapors, Carpenter et al., Green Chem., 2014, 16, 384-406.*

Biomass-derived porous carbons with tailored graphitization degree and pore size distribution for supercapacitors with ultra-high rate capability, He et al., Applied Surface Science 515 (2020) 146020.*

Chemical modification of lignins: Towards biobased polymers, Laurichesse et al., Progress in Polymer Science 39 (2014) 1266-1290.*

Production of Carbon Foams from Rice Husk, Lazzari et al., Materials Research. 2019; 22(suppl. 1): e20190427.*

Facile synthesis of lignosulfonate-derived sulfur-doped carbon materials for photocatalytic degradation of tetracycline under visible-light irradiation, S. Liu et al., Microporous and Mesoporous Materials 336 (2022) 111876.*

Nitrogen, oxygen and sulfur co-doped hierarchical porous carbons toward high-performance supercapacitors by direct pyrolysis of kraft lignin, F. Liu et al., Carbon 149 (2019) 105-116.*

Yuan, Y., Ding, Y., Wang, C., Xu, F., Lin, Z., Qin, Y., Li, Ying, Yang, M., He, X., Peng, Q., Li, Yibin, 2016. Multifunctional Stiff Carbon Foam Derived from Bread. ACS Appl. Mater. Interfaces 8, 16852-16861. https://doi.org/10.1021/acsami.6b03985.

Taherzadeh, M.J., Eklund, R., Gustafsson, L., Niklasson, C., Lidé, G., 1997. Characterization and Fermentation of Dilute-Acid Hydrolyzates from Wood.

Teixeira, A.R., Mooney, K.G., Kruger, U.S., Williams, C.L., Suszynski, W.J., Schmidt, L.D., Schmidt, D.P., Dauenhauer, P.J., 2011. Aerosol generation by reactive boiling ejection of molten cellulose. Energy Environ. Sci. 4, 4306-4321. https://doi.org/10.1039/c1ee01876k.

Wang, L., Skreiberg, Ø., Gronli, M., Specht, G.P., Antal, M.J., 2013. Is Elevated Pressure Required to Achieve a High Fixed-Carbon Yield of Charcoal from Biomass? Part 2: The Importance of Particle Size. https://doi.org/10.1021/ef400041h.

(Continued)

*Primary Examiner* — Haidung D Nguyen
(74) *Attorney, Agent, or Firm* — Patterson + Sheridan, LLP

(57) ABSTRACT

Embodiments of the present disclosure generally relate to carbon foams, processes for forming carbon foams, doped carbon composites, processes for forming doped carbon composites, and uses thereof, e.g., as electrodes. Processes described herein relate to fabrication of carbon foam and materials derived from the pyrolyzation of biomass at supercritical and subcritical conditions for $CO_2$, $N_2$, $H_2O$, or combinations thereof. The process includes exposing biomass to $CO_2$, $N_2$, $H_2O$, or combinations thereof under various parameters for temperature, pressure, heating rate and fluid flow rate. Silicon-carbon composites and sulfur-carbon composites for use as, e.g., electrodes, are also described.

13 Claims, 14 Drawing Sheets

(56) References Cited

OTHER PUBLICATIONS

Wang, L., Trninic, M., Skreiberg, O., Gronli, M., Considine, R., Antal, M.J., 2011. Is elevated pressure required to achieve a high fixed-carbon yield of charcoal from biomass? Part 1: Round-robin results for three different corncob materials, in: Energy and Fuels. pp. 3251-3265. https://doi.org/10.1021/ef200450h.

Wang, Q., Han, X.H., Sommers, A., Park, Y., T' Joen, C., Jacobi, A., 2012. A review on application of carbonaceous materials and carbon matrix composites for heat exchangers and heat sinks. Int. J. Refrig. 35, 7-26. https://doi.org/10.1016/J.IJREFRIG.2011.09.001.

Williams, S., Higashi, C., Phothisantikul, P., Wesenbeeck, S. Van, Antal, M.J., 2015. The fundamentals of biocarbon formation at elevated pressure: From 1851 to the 21st century. J. Anal. Appl. Pyrolysis 113, 225-230. https://doi.org/10.1016/j.jaap.2014.12.021.

Wu, X.-L., Wen, T., Guo, H.-L., Yang, S., Wang, X., Xu, A.-W., 2013. Biomass-Derived Sponge-like Carbonaceous Hydrogels and Aerogels for Supercapacitors. https://doi.org/10.1021/nn400566d.

Wu, Z.Y., Li, C., Liang, H.W., Chen, J.F., Yu, S.H., 2013. Ultralight, flexible, and fire-resistant carbon nanofiber aerogels from bacterial cellulose. Angew. Chemie—Int. Ed. 52, 2925-2929. https://doi.org/10.1002/anie.201209676.

Yang, H., Yan, R., Chen, H., Lee, D.H., Zheng, C., 2007. Characteristics of hemicellulose, cellulose and lignin pyrolysis. https://doi.org/10.1016/j.fuel.2006.12.013.

Yang, X., He, P., Xia, Y., 2009. Preparation of mesocellular carbon foam and its application for lithium/oxygen battery. Electrochem. commun. 11, 1127-1130. https://doi.org/10.1016/J.ELECOM.2009.03.029.

Amini, N., Aguey-Zinsou, K.F., Guo, Z.X., 2011. Processing of strong and highly conductive carbon foams as electrode. Carbon N. Y. 49, 3857-3864. https://doi.org/10.1016/j.carbon.2011.05.022.

Antal, M.J., Grønli, M., 2003. The art, science, and technology of charcoal production. Ind. Eng. Chem. Res. https://doi.org/10.1021/ie0207919.

Asmadi, M., Kawamoto, H., Saka, S., 2011. Gas- and solid/liquid-phase reactions during pyrolysis of softwood and hardwood lignins. J. Anal. Appl. Pyrolysis 92, 417-425. https://doi.org/10.1016/j.jaap.2011.08.003.

Basile, L., Tugnoli, A., Stramigioli, C., Cozzani, V., 2014. Influence of pressure on the heat of biomass pyrolysis. Fuel 137, 277-284. https://doi.org/10.1016/j.fuel.2014.07.071.

Biagini, E., Narducci, P., Tognotti, L., 2008. Size and structural characterization of lignin-cellulosic fuels after the rapid devolatilization. Fuel 87, 177-186. https://doi.org/10.1016/j.fuel.2007.04.010.

Biagini, E., Simone, M., Tognotti, L., 2009. Characterization of high heating rate chars of biomass fuels. Proc. Combust. Inst. 32 II, 2043-2050. https://doi.org/10.1016/j.proci.2008.06.076.

Cetin, E., Moghtaderi, B., Gupta, R., Wall, T.F., 2004. Influence of pyrolysis conditions on the structure and gasification reactivity of biomass chars. Fuel 83, 2139-2150. https://doi.org/10.1016/j.fuel.2004.05.008.

Chen, Q., Yang, R., Zhao, B., Li, Y., Wang, S., Wu, H., Zhuo, Y., Chen, C., 2014. Investigation of heat of biomass pyrolysis and secondary reactions by simultaneous thermogravimetry and differential scanning calorimetry. Fuel 134, 467-476. https://doi.org/10.1016/j.fuel.2014.05.092.

Zondlo, J.W., Stansberry, P.G., Kennel, E.B., Chen, C., Stiller, A.H., 2006. Carbon foam derived from various precursors. Carbon N. Y. 44, 1535-1543. https://doi.org/10.1016/j.carbon.2005.12.021.

Dall'Ora, M., Jensen, P.A., Jensen, A.D., 2008. Suspension combustion of wood: Influence of pyrolysis conditions on char yield, morphology, and reactivity. Energy and Fuels 22, 2955-2962. https://doi.org/10.1021/ef800136b.

Dauenhauer, P.J., Colby, J.L., Balonek, C.M., Suszynski, W.J., Schmidt, L.D., 2009. Reactive boiling of cellulose for integrated catalysis through an intermediate liquid. Green Chem. 11, 1555-1561. https://doi.org/10.1039/b915068b.

Demirbas, A., Arin, G., 2002. Energy Sources An Overview of Biomass Pyrolysis. An Overv. Biomass Pyrolysis, Energy Sources 24, 471-482. https://doi.org/10.1080/00908310252889979.

Di Blasi, C., 2008. Modeling chemical and physical processes of wood and biomass pyrolysis. Prog. Energy Combust. Sci. https://doi.org/10.1016/j.pecs.2006.12.001.

Dimesso, L., Becker, D., Spanheimer, C., Jaegermann, W., 2012. Investigation of graphitic carbon foams/LiNiPO4 composites. J. Solid State Electrochem. 16, 3791-3798. https://doi.org/10.1007/s10008-012-1817-1.

Fisher, T., Hajaligol, M., Waymack, B., Kellogg, D., 2002. Pyrolysis behavior and kinetics of biomass derived materials. J. Anal. Appl. Pyrolysis 62, 331-349. https://doi.org/10.1016/S0165-2370(01)00129-2.

Zhang, Y., Zhao, M., Wang, H., Hu, H., Liu, R., Huang, Z., Chen, C., Chen, D., Feng, Z., 2019. Damaged starch derived carbon foam-supported heteropolyacid for catalytic conversion of cellulose: Improved catalytic performance and efficient reusability. Bioresour. Technol. 288. https://doi.org/10.1016/j.biortech.2019.121532.

Gallego, N.C., Klett, J.W., 2003. Carbon foams for thermal management, in: Carbon. Pergamon, pp. 1461-1466. https://doi.org/10.1016/S0008-6223(03)00091-5.

Gallego, N.C., Klett, J.W., 2002. Carbon Foams for Thermal Management Nidia C. Gallego and James W. Klett Metals and Ceramics Division, Oak Ridge TN, 37831. Int. Semin. Adv. Appl. Carbon Mater. National Laboratory, Oak Ridge, TN, 37831.

Gomez, C., Velo, E., Barontini, F., Cozzani, V., 2009. Influence of Secondary Reactions on the Heat of Pyrolysis of Biomass. Ind. Eng. Chem. Res. https://doi.org/10.1021/ie9007985.

Haas, T.J., Nimlos, M.R., Donohoe, B.S., 2009. Real-time and post-reaction microscopic structural analysis of biomass undergoing pyrolysis. Energy and Fuels 23, 3810-3817. https://doi.org/10.1021/ef900201b.

Haseli, Y., Van Oijen, J.A., De Goey, L.P.H., 2011. Modeling biomass particle pyrolysis with temperature-dependent heat of reactions. J. Anal. Appl. Pyrolysis 90, 140-154. https://doi.org/10.1016/j.jaap.2010.11.006.

He, F., Yi, W., Bai, X., 2006. Investigation on caloric requirement of biomass pyrolysis using TG-DSC analyzer. Energy Convers. Manag. 47, 2461-2469. https://doi.org/10.1016/j.enconman.2005.11.011.

Inagaki, M., Qiu, J., Guo, Q., 2015. Carbon foam: Preparation and application. Carbon N. Y. https://doi.org/10.1016/j.carbon.2015.02.021.

Jarvis, M.W., Haas, T.J., Donohoe, B.S., Daily, J.W., Gaston, K.R., Frederick, W.J., Nimlos, M.R., 2011. Elucidation of biomass pyrolysis products using a laminar entrained flow reactor and char particle imaging. Energy and Fuels 25, 324-336. https://doi.org/10.1021/ef100832d.

Klett, J., Hardy, R., Romine, E., Walls, C., Burchell, T., 2000. High-thermal-conductivity, mesophase-pitch-derived carbon foams: effect of precursor on structure and properties. Carbon N. Y. 38, 953-973. https://doi.org/10.1016/S0008-6223(99)00190-6.

Zhang, L., Wang, Y., Peng, B., Yu, W., Wang, H., Wang, T., Deng, B., Chai, L., Zhang, K., Wang, J., 2014. Preparation of a macroscopic, robust carbon-fiber monolith from filamentous fungi and its application in Li—S batteries. Green Chem. 16. https://doi.org/10.1039/c4gc00761a.

Léedé, J., Blanchard, F., Boutin, O., 2002. Radiant flash pyrolysis of cellulose pellets: Products and mechanisms involved in transient and steady state conditions. Fuel 81, 1269-1279. https://doi.org/10.1016/S0016-2361(02)00039-X.

Lepage, G., Albernaz, F.O., Perrier, G., Merlin, G., 2012. Characterization of a microbial fuel cell with reticulated carbon foam electrodes. Bioresour. Technol. 124, 199-207. https://doi.org/10.1016/j.biortech.2012.07.067.

Li, W., Han, C., Liu, W., Zhang, M., Tao, K., 2007. Expanded graphite applied in the catalytic process as a catalyst support. Catal. Today 125, 278-281. https://doi.org/10.1016/j.cattod.2007.01.035.

Liu, L., Yin, Y.X., Li, J.Y., Wang, S.H., Guo, Y.G., Wan, L.J., 2018. Uniform Lithium Nucleation/Growth Induced by Lightweight Nitrogen-Doped Graphitic Carbon Foams for High-Performance Lithium Metal Anodes. Adv. Mater. 30, 1-8. https://doi.org/10.1002/adma.201706216.

Mahinpey, N., Murugan, P., Mani, T., Raina, R., 2009. Analysis of bio-oil, biogas, and biochar from pressurized pyrolysis of wheat

(56) References Cited

OTHER PUBLICATIONS straw using a tubular reactor. Energy and Fuels 23, 2736-2742. https://doi.org/10.1021/ef8010959.
Maldonado-Hódar, F.J., Moreno-Castilla, C., Rivera-Utrilla, J., Hanzawa, Y., Yamada, Y., 2000. Catalytic Graphitization of Carbon Aerogels by Transition Metals. https://doi.org/10.1021/la991080r.
Maliutina, K., Tahmasebi, A., Yu, J., 2018. Pressurized entrained-flow pyrolysis of microalgae: Enhanced production of hydrogen and nitrogen-containing compounds. Bioresour. Technol. 256, 160-169. https://doi.org/10.1016/j.biortech.2018.02.016.
Marsh, H., Crawford, D., Taylor, D.W., 1983. Catalytic graphitization by iron of isotropic carbon from polyfurfuryl alcohol, 725-1090 K. A high resolution electron microscope study. Carbon N. Y. 21, 81-87. https://doi.org/10.1016/0008-6223(83)90160-4.
Melligan, F., Auccaise, R., Novotny, E.H., Leahy, J.J., Hayes, M.H.B., Kwapinski, W., 2011. Pressurised pyrolysis of Miscanthus using a fixed bed reactor. Bioresour. Technol. 102, 3466-3470. https://doi.org/10.1016/j.biortech.2010.10.129.
Milosavljevic, I., Oja, V., Suuberg, E.M., 1996. Thermal Effects in Cellulose Pyrolysis: Relationship to Char Formation Processes.
Mochida, I., Ohtsubo, R., Takeshita, K., Marsh, H., 1980. Catalytic graphitization of non-graphitizable carbon by chromium and manganese oxides. Carbon N. Y. 18, 117-123. https://doi.org/10.1016/0008-6223(80)90019-6.
Mok, W.S.-L., Antal, M.J., 1983. Effects of pressure on biomass pyrolysis. II. Heats of reaction of cellulose pyrolysis. Thermochim. Acta 68, 165-186. https://doi.org/10.1016/0040-6031(83)80222-6.
Montoya, J., Pecha, B., Janna, F.C., Garcia-Perez, M., 2017. Identification of the fractions responsible for morphology conservation in lignocellulosic pyrolysis: Visualization studies of sugarcane bagasse and its pseudo-components. J. Anal. Appl. Pyrolysis 123, 307-318. https://doi.org/10.1016/j.jaap.2016.11.015.
Müsellim, E., Tahir, M.H., Ahmad, M.S., Ceylan, S., 2018. Thermokinetic and TG/DSC-FTIR study of pea waste biomass pyrolysis. Appl. Therm. Eng. 137, 54-61. https://doi.org/10.1016/j.applthermaleng.2018.03.050.

Qin, L., Wu, Y., Hou, Z., Jiang, E., 2020. Influence of biomass components, temperature and pressure on the pyrolysis behavior and biochar properties of pine nut shells. Bioresour. Technol. 313. https://doi.org/10.1016/j.biortech.2020.123682.
Qu, T., Guo, W., Shen, L., Xiao, J., Zhao, K., 2011. Experimental Study of Biomass Pyrolysis Based on Three Major Components: Hemicellulose, Cellulose, and Lignin. Ind. Eng. Chem. Res 50, 10424-10433. https://doi.org/10.1021/ie1025453.
Rabemanolontsoa, H., Saka, S., 2013. Comparative study on chemical composition of various biomass species. RSC Adv. 3, 3946-3956. https://doi.org/10.1039/c3ra22958k.
Rath, J., Wolfinger, M.G., Steiner, G., Krammer, G., Barontini, F., Cozzani, V., 2003. Heat of wood pyrolysis. Fuel 82, 81-91. https://doi.org/10.1016/S0016-2361(02)00138-2.
Recari, J., Berrueco, C., Abelló, S., Montané, D., Farriol, X., 2014. Effect of temperature and pressure on characteristics and reactivity of biomass-derived chars. Bioresour. Technol. 170, 204-210. https://doi.org/10.1016/j.biortech.2014.07.080.
Ren, Y., Xu, Q., Zhang, J., Yang, H., Wang, B., Yang, D., Hu, J., Liu, Z., 2014. Functionalization of biomass carbonaceous aerogels: Selective preparation of MnO2@CA composites for supercapacitors. ACS Appl. Mater. Interfaces 6, 9689-9697. https://doi.org/10.1021/am502035g.
Rios, R.V.R.A., Martínez-Escandell, M., Molina-Sabio, M., Rodríguez-Reinoso, F., 2006. Carbon foam prepared by pyrolysis of olive stones under steam. Carbon N. Y. 44, 1448-1454. https://doi.org/10.1016/j.carbon.2005.11.028.
Rousset, P., Figueiredo, C., De Souza, M., Quirino, W., 2011. Pressure effect on the quality of eucalyptus wood charcoal for the steel industry: A statistical analysis approach. Fuel Process. Technol. 92, 1890-1897. https://doi.org/10.1016/j.fuproc.2011.05.005.
Schroeter, J., Felix, F., 2005. Melting cellulose. Cellulose. https://doi.org/10.1007/s10570-004-0344-3.
Smith, M.W., Pecha, B., Helms, G., Scudiero, L., Garcia-Perez, M., 2017. Chemical and morphological evaluation of chars produced from primary biomass constituents: Cellulose, xylan, and lignin. Biomass and Bioenergy 104, 17-35. https://doi.org/10.1016/j.biombioe.2017.05.015.

* cited by examiner

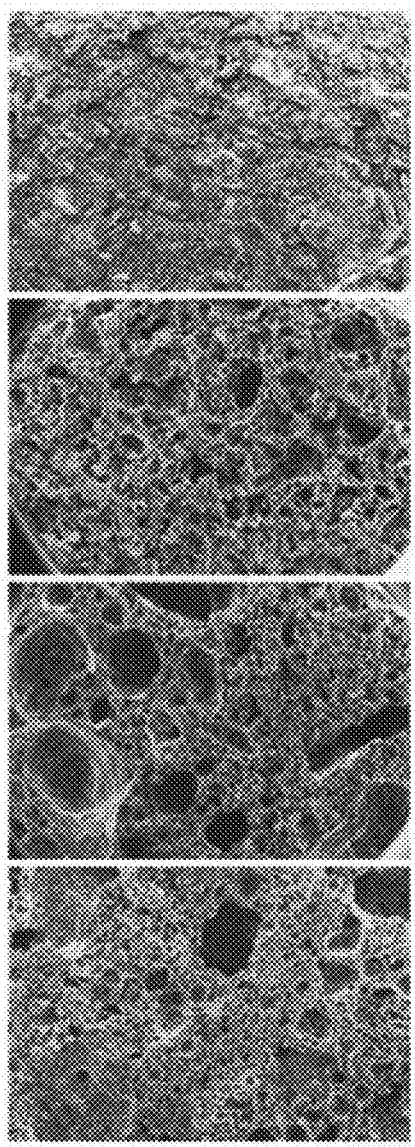
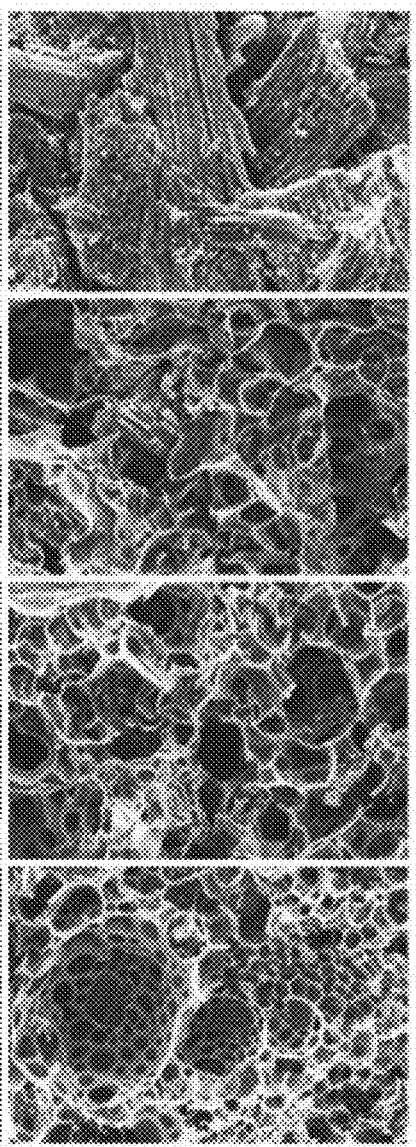
FIG. 7A FIG. 7B
FIG. 7C FIG. 7D
FIG. 7E FIG. 7F
FIG. 7G FIG. 7H
1 mm    100 μm

CARBON FOAMS, DOPED CARBON COMPOSITES, PROCESSES FOR FABRICATING CARBON FOAMS AND DOPED CARBON COMPOSITES, AND USES THEREOF

CROSS-REFERENCE TO RELATED APPLICATIONS

This application claims benefit of U.S. Provisional Patent Application No. 63/121,150, filed Dec. 3, 2020, which is herein incorporated by reference in its entirety.

GOVERNMENT RIGHTS

This invention was made with government support under 1835083 awarded by National Science Foundation. The government has certain rights in the invention.

BACKGROUND

Field

Embodiments of the present disclosure generally relate to carbon foams, processes for forming carbon foams, doped carbon composites, processes for forming doped carbon composites, and uses thereof, e.g., as electrodes.

Description of the Related Art

Biomass pyrolysis utilizes elevated temperatures to thermochemically upgrade organic material into energy and useful products such as carbon foams. Carbon foams are highly porous, carbonaceous solids with high carbon content. Such foams typically have a monolithic porous structure and properties that make them favorable and promising materials in a wide array of high-value applications such as electrodes in lithium batteries and fuel cells. In addition, highly thermally and/or electrically conductive carbon foams have potential for high-value uses such as catalyst supports and electrodes in lithium batteries and fuel cells.

Efforts toward increasing the energy density and reducing the cost of lithium (Li) ion batteries (LIBs) have focused in part on silicon anodes. However, the development of silicon anodes has been limited by stability issues. Namely, excessive volumetric expansion of the silicon occurs upon lithium insertion, causing pulverization of the silicon particles as well as cracking of, and adhesion loss in, the anode. Such structural damage reduces electrical contact within the anode and shortens the cycle life of LIBs. Li-Sulfur (Li—S) batteries have also been studied as replacements for conventional LIBs due to, e.g., their specific energy densities. However, commercialization of Li—S batteries has been hindered by several difficulties such as the extremely low electrical conductivity of sulfur and the lithiation of sulfur during battery discharging to form various soluble and highly-reactive polysulfide species. These highly-reactive polysulfide species can react harmfully with various battery components resulting in low Coulombic efficiency, high self-discharge rates, and low cycle life.

Based on, e.g., the aforementioned properties of the carbon foams, carbon foams have the potential to replace existing materials in battery and electrode applications, among other applications. However, the development and utilization of carbon foams in battery and electrode applications has proven difficult. Moreover, the fabrication of carbon foams from environmentally benign feedstocks is not well developed and current carbon foam fabrication methods are costly.

Therefore, there is a need for improved carbon foams and processes for carbon foam fabrication.

SUMMARY

Embodiments of the present disclosure generally relate to carbon foams, processes for forming carbon foams, doped carbon composites, processes for forming doped carbon composites, and uses thereof, e.g., as electrodes.

In an embodiment, a process for forming a carbon foam is provided. The process includes processing biomass into a feedstock, the feedstock comprising a plurality of particles having a particle size of about 30 µm to about 1 mm, and loading the feedstock into a reactor, the reactor disposed inside a furnace. The process further includes pyrolyzing the feedstock to form the carbon foam, wherein pyrolyzing the feedstock includes: pressurizing the reactor with $CO_2$, $N_2$, $H_2O$, or combinations thereof, the $CO_2$, $N_2$, $H_2O$, or combinations thereof in a supercritical state or subcritical state, wherein the pressure of the reactor is from about 4.1 MPa to about 10.5 MPa; contacting the feedstock with the $CO_2$, $N_2$, $H_2O$, or combinations thereof; heating the furnace at a heat rate of about 10° C./min to about 50° C./min until the reactor reaches a specified temperature of about 450° C. to about 550° C.; and exposing the reactor to the specified temperature for a period of about ten minutes to about 1 hour to form the carbon foam.

In another embodiment, a process for forming a composite is provided. The process includes forming a mixture comprising biomass and one or more of a sulfur source, a silicon source, or a surfactant, and loading the mixture into a reactor. The process further includes pyrolyzing the mixture to form the composite, wherein pyrolyzing the mixture includes: pressurizing the reactor with $CO_2$, $N_2$, or both, the $CO_2$, $N_2$, or both in a supercritical state or subcritical state; contacting the mixture with the $CO_2$, $N_2$, or both; heating the reactor at a specified temperature to form the composite. The composite formed includes a carbon foam matrix comprising a plurality of intact pores, and particles, the particles comprising silicon or sulfur, the particles encapsulated within the carbon foam matrix, the intact pores, or both.

In another embodiment, an electrode is provided. The electrode includes a first component comprising a carbon foam matrix comprising a plurality of pores; and a second component encapsulated within the carbon foam matrix, the pores, or both, the second component comprising particles, the particles comprising silicon or sulfur.

In another embodiment, an energy storage device is provided. The energy storage device includes a first current collector; a cathode disposed over at least a portion of the first current collector; a separator disposed over at least a portion of the cathode; an anode disposed over at least a portion of the separator; and a second current collector disposed over at least a portion of the anode. In some embodiments, the cathode includes a carbon foam matrix comprising a plurality of pores, and sulfur particles encapsulated within the carbon foam matrix, the pores, or both. In some embodiments, the anode can include a carbon foam matrix comprising a plurality of pores, and silicon particles encapsulated within the carbon foam matrix, the pores, or both.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limited of its scope, and may admit to other equally effective embodiments.

FIG. 7A is an exemplary SEM image of biochar produced from the pyrolysis of corn stover at about 0.1 MPa according to at least one embodiment of the present disclosure (scale: 1 mm).

FIG. 7B is an exemplary SEM image of biochar produced from the pyrolysis of corn stover at about 0.1 MPa according to at least one embodiment of the present disclosure (scale: 100 µm).

FIG. 7C is an exemplary SEM image of an example carbon foam produced from the pyrolysis of corn stover at about 3.5 MPa according to at least one embodiment of the present disclosure (scale: 1 mm).

FIG. 7D is an exemplary SEM image of an example carbon foam produced from the pyrolysis of corn stover at about 3.5 MPa according to at least one embodiment of the present disclosure (scale: 100 µm).

FIG. 7E is an exemplary SEM image of an example carbon foam produced from the pyrolysis of corn stover at about 7.0 MPa according to at least one embodiment of the present disclosure (scale: 1 mm).

FIG. 7F is an exemplary SEM image of an example carbon foam produced from the pyrolysis of corn stover at about 7.0 MPa according to at least one embodiment of the present disclosure (scale: 100 µm).

FIG. 7G is an exemplary SEM image of an example carbon foam produced from the pyrolysis of corn stover at about 10.5 MPa according to at least one embodiment of the present disclosure (scale: 1 mm).

FIG. 7H is an exemplary SEM image of an example carbon foam produced from the pyrolysis of corn stover at about 10.5 MPa according to at least one embodiment of the present disclosure (scale: 100 µm).

MPa, about 3.5 MPa, about 7.0 MPa, and about 10.5 MPa according to at least one embodiment of the present disclosure.

Figure 9A:
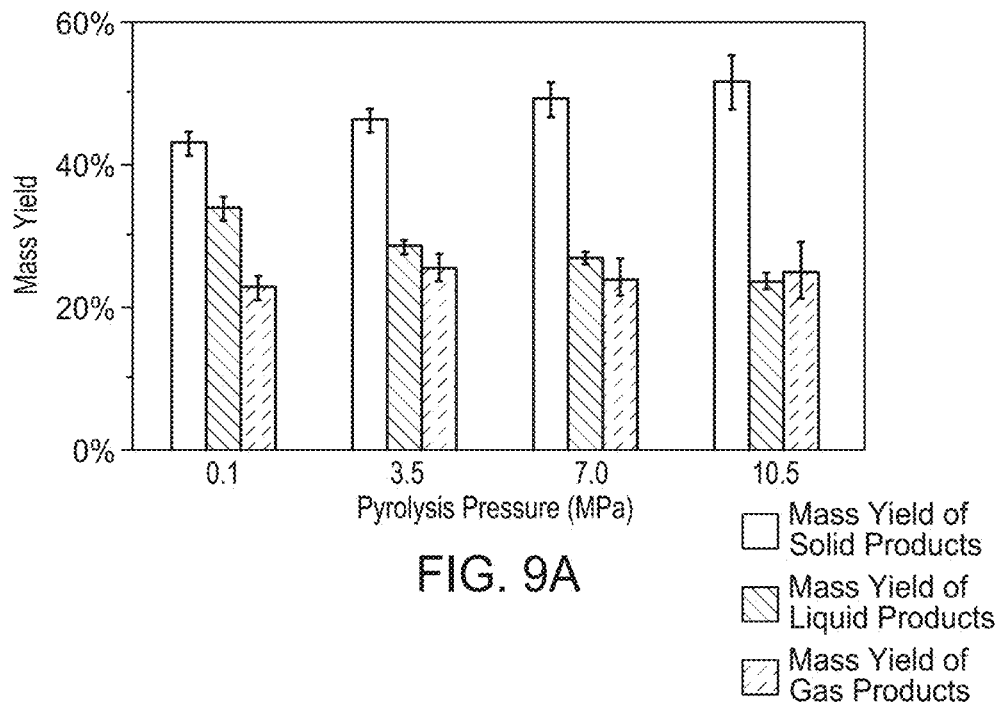
FIG. 9A shows exemplary product yields, by mass, from the pyrolysis of corn stover at varying pressures of about 0.1
Figure 9B:
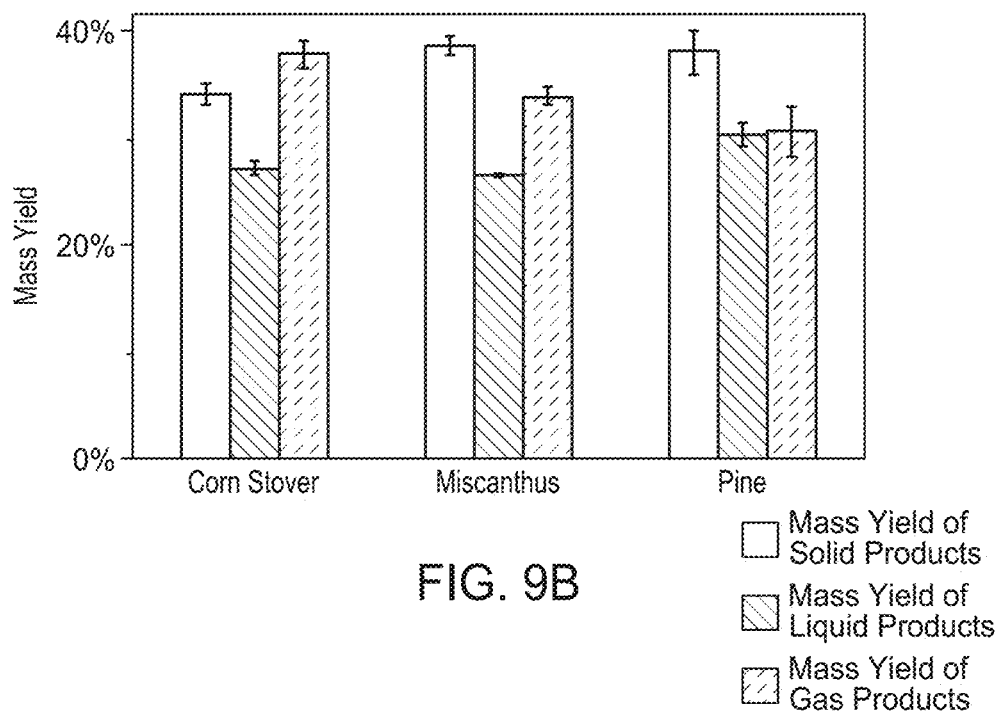

FIG. 9B shows exemplary product yields, by mass, from the pyrolysis of corn stover, *Miscanthus giganteus* (miscanthus), and Lodgepole pine (pine) at a temperature of about 510° C. and a pressure of about 10.5 MPa according to at least one embodiment of the present disclosure.

Figure 9C:
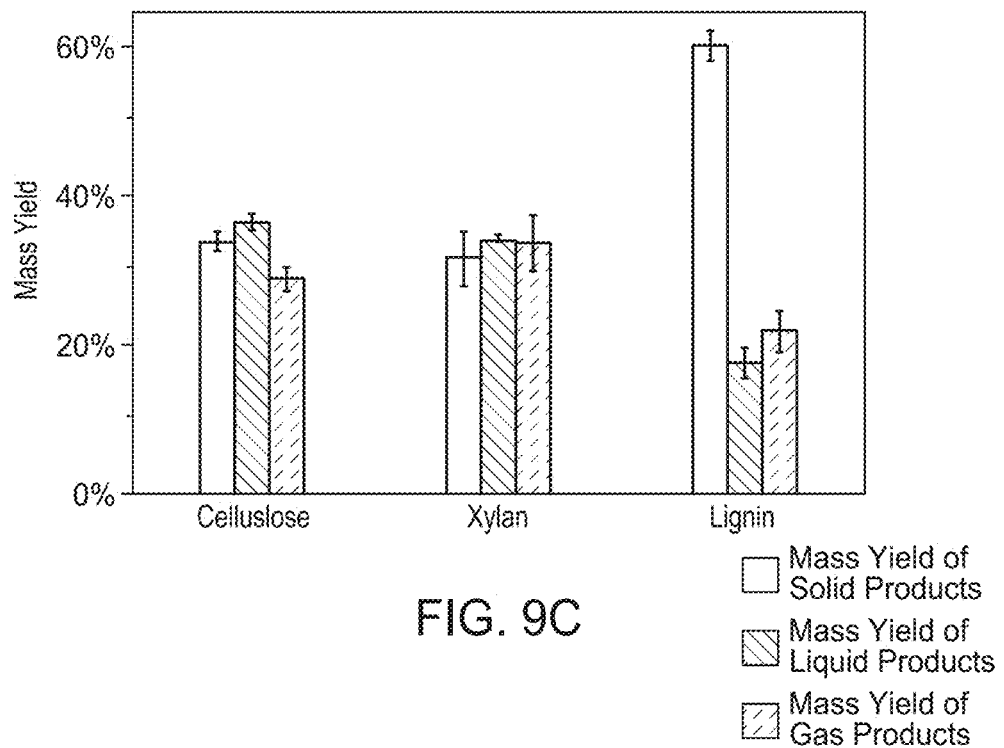

FIG. 9C shows exemplary product yields, by mass, from the pyrolysis of cellulose, xylan, and lignin at a temperature of about 510° C. and a pressure of about 10.5 MPa according to at least one embodiment of the present disclosure.

Figure 10A:
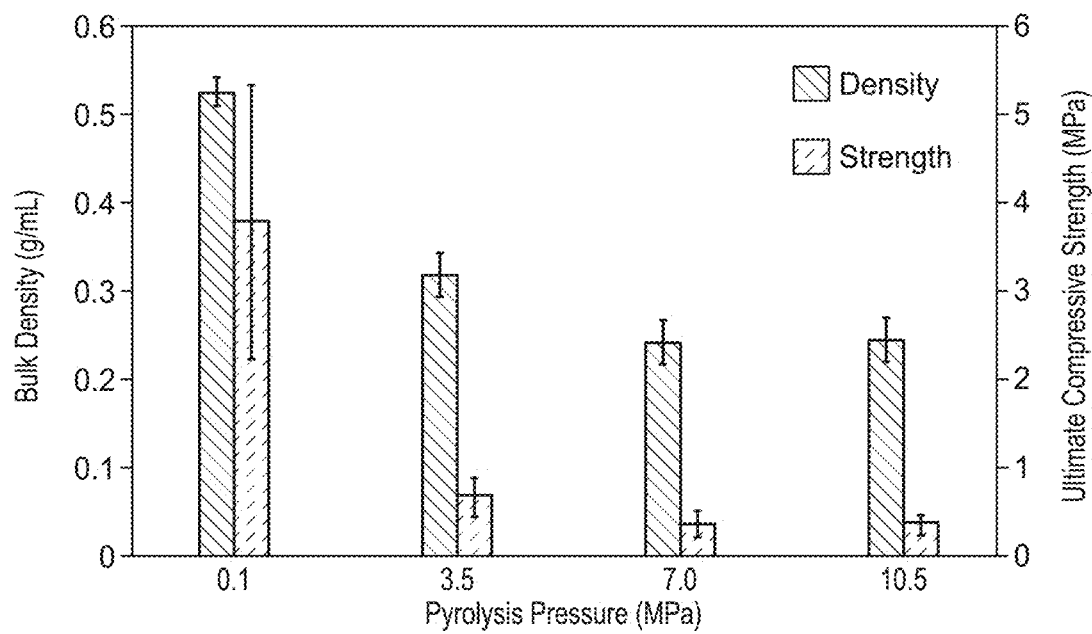

FIG. 10A shows exemplary data for bulk density and ultimate compressive strength of example products produced from the pyrolysis of corn stover at a temperature of about 510° C. and varying pressures according to at least one embodiment of the present disclosure.

Figure 10B:
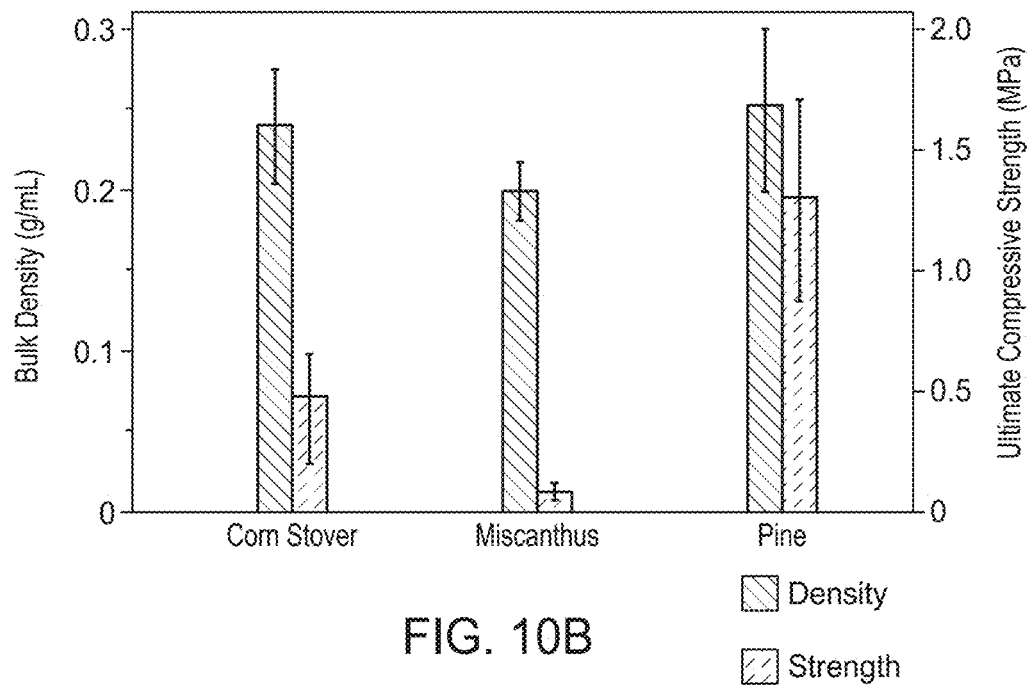

FIG. 10B shows exemplary data for bulk density and ultimate compressive strength of example products produced from the pyrolysis of corn stover, *Miscanthus giganteus*, and Lodgepole pine at a temperature of about 510° C. and a pressure of about 10.5 MPa according to at least one embodiment of the present disclosure.

Figure 10C:
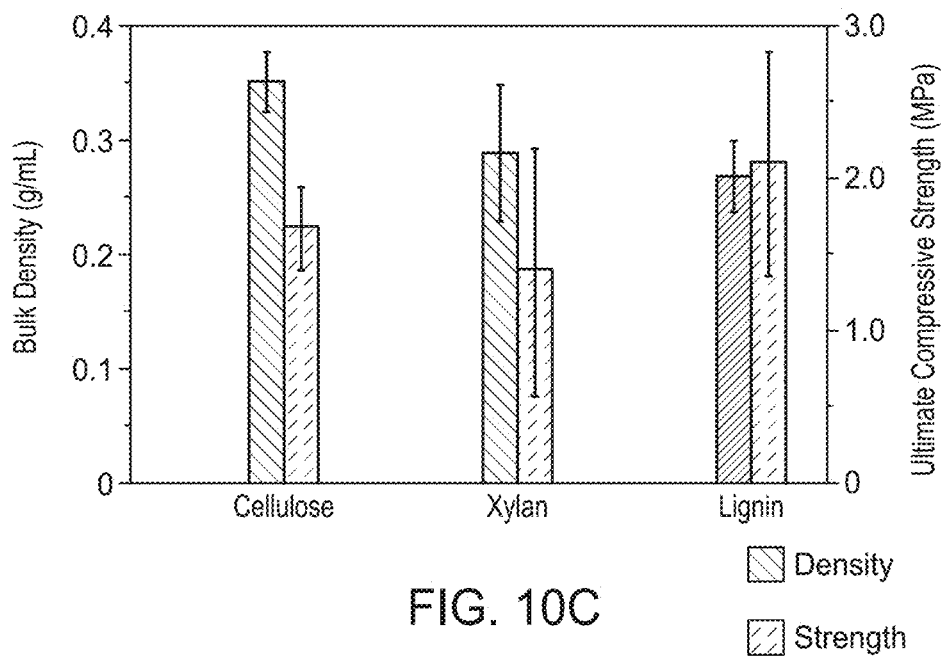

FIG. 10C shows exemplary data for bulk density and ultimate compressive strength of example products produced from the pyrolysis of cellulose, xylan, and lignin at a temperature of about 510° C. and a pressure of about 10.5 MPa according to at least one embodiment of the present disclosure.

DETAILED DESCRIPTION

Embodiments of the present disclosure generally relate to carbon foams, processes for forming carbon foams, doped carbon composite electrodes, and uses thereof. The inventors have found a process for producing carbon foams and doped carbon composites from environmentally benign materials in high yields and low costs. The carbon foams and doped carbon composites described herein can be utilized in a variety of applications such as electrodes for energy storage devices such as batteries as well as fuel cells. As an electrode, carbon foams and doped carbon composites described herein can exhibit improved properties over conventional materials utilized for electrodes such as oxidation resistance, corrosion resistance, low thermal expansion coefficients, and tailorable thermal and electrical conductivities. The carbon foams and doped carbon composites can also be lightweight. Embodiments described herein enable alteration of composition of the carbon foams and composites for implementation as materials in a wide array of industries and applications, such as energy storage in batteries and battery components.

Carbon foams exhibit unique mechanical strength, electrical conductivity, and thermal conductivity properties and have shown promise in replacing existing materials for various applications. However, the development and utilization of carbon foams in battery and electrode applications has proved difficult. Moreover, the fabrication of carbon foams from environmentally benign feedstocks is not well developed. The properties of non-conductive foams, on the other hand, make them favorable for numerous applications including aerospace insulation, refractory materials, fire protection, and medical applications. Carbon foams have not found widespread commercial utilization at least in part due to the high cost of production and/or poor properties of the produced carbon foams. For example, carbon foams have been produced by pyrolysis of polymers, such as melamine, to form Reticulated Vitreous Carbon (RVC) foams. RVC foams have low density, possess good high-temperature stability, and have low coefficients of thermal expansion. However, the RVC foams lack compressive strength and are generally not graphitizable.

More recent foam-production techniques utilize coal and coal-derived pitches as feedstocks for carbon foam production. In these techniques, the feedstock, sometimes mixed with a blowing agent, is heated under pressure to just above the softening point of the material and the pressure is then rapidly dropped. Some compounds in the feedstock and blowing agent can volatilize during depressurization, producing gas pockets that become void space in the resulting foam. To correct such issues, subsequent thermal treatments may be conducted at temperatures ranging from 500 to 1,200° C. to carbonize and stabilize the foams. In addition, graphitization of carbon foams is conventionally used to improve the mechanical strength and increase the electrical and thermal conductivities of the carbon foams. Graphitization is typically carried out by heating carbon foams to temperatures of 2,400 to 3,000° C. or by addition of catalytic metals, such as Fe, Ni, or Mn, and heating to lower temperatures (<1,500° C.). Although such methods can improve the mechanical strength and other properties of the carbon foams produced by conventional methods, they represent additional costs.

Carbon foams have also been commercially produced from coal- and petroleum-derived feedstocks. However, few studies have investigated production of porous carbonaceous materials (e.g., carbon foams) directly from biomass feedstocks such as olive stones, Avicel, xylan, and lignin. For example, carbon foam has been produced from the pyrolysis of olive stones at 500° C. and 1.0 MPa in mixtures of inert gas and water vapor; however, the pyrolysis exhibited incomplete conversion to carbon foam. Olive stones are lipid-rich biomasses containing lignocellulose, ~5.5% fat by mass, among other components, representing a significant difference compared to most lignocellulosic feedstocks. The excess lipid composition of olive stones may explain why an aqueous environment was utilized for carbon foam formation. Complete pyrolysis is largely dependent upon the feedstock's moisture content, where a higher moisture content can lead to the production of carbon foam and bio-oil while a lower moisture content runs the risk of incomplete pyrolysis. Ultimately, the dust formed during incomplete pyrolysis is attributable to the decreased moisture content of lipid-excess lignocellulose. Lipids are insoluble in water therefore creating reduced moisture contents in lipid-excess biomasses. An aqueous environment can make up for the deficiencies in water content of lipid-excess biomasses; however, lignocellulose devoid of the excess fat can perform well in a non-aqueous environment.

Pyrolysis of Avicel, intended as a means of charcoal production, has also been performed, with varied results. When the pyrolysis of Avicel is performed at 2.3 MPa and 300° C., a product resembling carbon foam is formed; such structures were not formed at 0.1 MPa and 300° C. Foaming of xylan has been demonstrated utilizing a very high heating rate (190° C./s) with ambient pressure, while subjecting lignin and cellulose to the same conditions resulted in no carbon foam or very minimal carbon foam.

Embodiments described herein overcome these and other deficiencies of conventional carbon foams and conventional methods of forming carbon foams. Further, and in some examples, the carbon foams described herein are doped with silicon or sulfur. The doped carbon foams or doped carbon composites can be characterized as having silicon or sulfur particles encapsulated, embedded, located, trapped, or otherwise disposed within the pores of the foam or composite material. Such doped carbon foams and doped carbon composites can be used as, e.g., electrodes and overcome one or more deficiencies with conventional silicon anodes and Li-sulfur batteries. As discussed above, the widespread adoption of conventional silicon anodes in lithium ion batteries has been limited due to their stability. Here, lithium can insert into conventional silicon anodes causing destruction of the silicon particles and structural damage to the anode, leading to reduced electrical contact with battery components and reduced cycle life of lithium ion batteries. In addition, the adoption and commercialization of Li-sulfur batteries has been hindered by various challenges such as sulfur's low electrical conductivity and the formation of highly-reactive polysulfide species.

The terms "doped carbon foams" and "doped carbon composites" are used interchangeably unless the context indicates otherwise. The terms "undoped carbon foams" and "undoped carbon composites" are used interchangeably unless the context indicates otherwise.

Embodiments described herein overcome such issues with conventional silicon anodes and Li-sulfur batteries. For example, the carbon foams and composites described herein can include silicon particles or sulfur particles encapsulated, embedded, located, trapped, or otherwise disposed within the pores of the carbon foams and composites. By trapping the silicon or sulfur within the pores of the foam or composite, the doped carbon foams and doped carbon composites described herein can exhibit, e.g., improved mechanical integrity, higher Coulombic efficiency, lower self-discharge rates, and higher cycle life relative to conventional electrodes.

Embodiments described herein demonstrate the feasibility of a novel and economical approach for fabrication of improved quality carbon foam derived from high-pressure pyrolysis. In contrast to conventional materials used as starting materials for carbon foam (e.g., coal- and petroleum-derived feedstocks), embodiments described herein utilize biomass, an environmentally benign and readily available feedstock. Embodiments described herein also enable formation of carbon foams and composites utilizing a wide variety of process parameters such as temperature, pressure, hold time, heating rate, and fluid flow rate. In addition, processes described herein enable collection (and later use) of bio-oils present in the biomass feedstock. The carbon foams and composites described herein have unique pore-size distributions, electrical and thermal conductivities, and mechanical strength.

The feed or feedstock for the pyrolysis processes described includes various carbon materials such as coal and biomass. Biomass refers to a biological material and/or a carbon-containing material. Illustrative, but non-limiting, examples of biomass include materials, by-products, and waste generated from, e.g., agricultural and forestry processes, such as agricultural matter and residues (e.g., wheat straw and corn), energy crops (e.g., wheatgrass and bamboo), forest residues (e.g., materials, by-products and waste from forest harvesting such as woodchips), woody biomass, plant- and algae-based matter and residues, and the like, and combinations thereof. In some embodiments, biomass includes wood, leaves, pulps, stalks, grass material, shrubs, branches, energy crops, vegetables, fruits, flowers, grains, herbaceous crops, bark, needles, logs, trees, and combinations thereof. Additionally, or alternatively, biomass includes by-products and waste from wood-processing, by-products and waste from papermaking or timber processes, by-products and waste from agricultural and forestry activities, rotation crops, lumber, wood chips, sawdust, straw, firewood, wood materials, paper, waste paper, yard waste, and the like.

Although embodiments herein are described with reference to utilizing biomass, coal and/or coal-derived material can be utilized can be utilized.

Biomass can include corn stover (*Zea mays*), Lodgepole pine (*Pinus contorta*), miscanthus (*Miscanthus giganteus*), esterified coal, bituminous coal, lignin, xylan (hemicellulose), and/or cellulose ("Avicel"). Lignocellulose materials are the most plentifully available biomasses on earth, with cellulose and lignin being byproducts of lignocellulose. Because of their renewable and inexpensive properties, lignocellulosic biomass can be an attractive feedstock for the fabrication of carbon foam and bio-oil.

Biomass can include any of the aforementioned materials, combinations or mixtures of the aforementioned materials, in any suitable proportion. The biomass may be processed before pyrolysis, such as by grinding into particles, blending with other materials, compressing into pellets, and/or drying. Such pre-pyrolysis processing of the biomass results in suitable feedstocks for pyrolysis.

Apparatus

Figure 1:
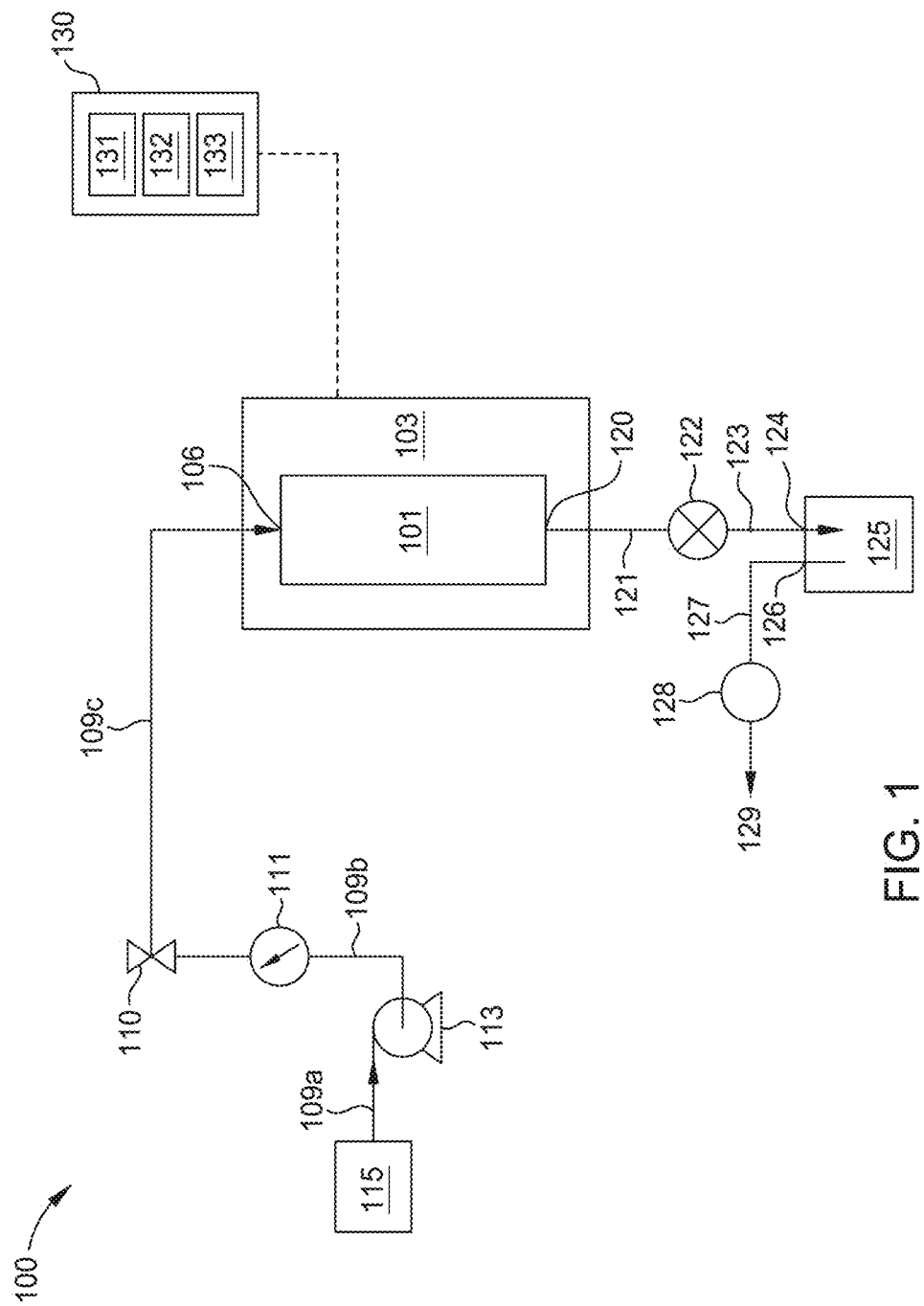
FIG. 1 is a schematic of an example high-pressure pyrolysis unit utilized to form carbon foams according to at least one embodiment of the present disclosure.

FIG. 1 shows a schematic of an apparatus 100 utilized for performing one or more operations of converting biomass to carbon foams according to some embodiments. The apparatus 100 can also be used for performing one or more operations of converting biomass to composite materials such as doped carbon composites, e.g., silicon carbon composites and sulfur carbon composites. The apparatus 100 is a high-pressure pyrolysis unit. Although the apparatus 100 is shown as a bench-top (or small-scale) unit, it is contemplated that a commercial unit having large-scale capabilities can be utilized to produce carbon foams and composite materials described herein. In addition, various modifications or alterations of the apparatus 100 can be made without departing from its scope.

The apparatus 100 includes a reactor 101 (or vessel) for converting a feedstock to a conversion product(s). The reactor 101 can be any suitable reactor such as a stainless steel reactor. The reactor can be a 316L stainless steel reactor having an inner diameter of about 19.3 mm and a length of about 305 mm. Prior to placement of the feedstock (e.g., biomass) in the reactor, the biomass can be processed, e.g., grinding and/or compressing such that the feedstock (e.g., biomass) converted may be in the form of particles, powder, and/or compacted pellets. Additionally, or alternatively, the biomass can be dried to remove residual moisture and/or purified to remove contaminants or undesired materials prior to placement in the reactor 101. Such processing of the biomass to a pyrolysis feedstock is described below.

Prior to loading the feedstock in the reactor 101, the feedstock in the form of loose (e.g., particles/powder) and/or compacted pellets, can be placed in a container, vessel, packet, tube, receptacle, or other structure (not shown) to house, hold, or otherwise contain at least a portion of the feedstock. This container, vessel, packet, tube, receptacle, or other structure, having the feedstock therein, is placed in the reactor 101. In some examples, the feedstock is placed into a mesh packet (such as a stainless steel mesh packet) and the mesh packet having the feedstock therein is placed in the reactor 101. The stainless steel mesh packet can act as a housing unit for the feedstock. The packet can be permeable to enable ambient fluids and evolved products to pass through the packet and contact the biomass. In some examples, feedstocks can be placed in foil, a glass flask, or glass test tube. Here, the loose or compacted pellets can be placed into a receptacle or container (e.g., a glass flask or test tube) that can then be placed into the reactor, and/or the loose or compacted pellets can be wrapped in foil (e.g., aluminum foil) or a stainless steel mesh that can then be placed into the reactor. When a receptacle or container, e.g., the glass flask or glass test-tube is used, the receptacle or container can be approximately the same inner dimensions (e.g., inner diameter) as the pellet press. The use of a receptacle or container can aid in retaining the pellets due to liquefaction of the biomass.

The reactor 101 is positioned inside or otherwise disposed inside of a furnace 103 (or chamber). The reactor 101 can be capable of being operated at suitable temperatures and/or pressures. The furnace 103 can be any furnace capable of being operated at suitable temperatures to, e.g., heat the reactor 101. A tube furnace can be utilized as the furnace 103. The reactor 101 and/or furnace 103 can further include, or be coupled to, equipment that controls the rate of gas/liquid flow therethrough, removes products generated, et cetera. In some embodiments, the apparatus is free of furnace 103. Here, the reactor 101 has, or is coupled to, equipment configured to heat and/or pressurize the reactor 101. The reactor 101 includes a reactor inlet 106 through which a pyrolysis gas can be flowed into the reactor 101. Additionally, or alternatively, the pyrolysis gas may be in the form of a pyrolysis liquid and/or a pyrolysis fluid depending on temperature and/or pressure. The pyrolysis gas, liquid, and/or fluid can include $CO_2$, $N_2$, $H_2O$, or combinations thereof. Other gases, liquids, and/or fluids such as non-reactive gases, liquids, and/or fluids can also be flowed into the reactor via reactor inlet 106. The pyrolysis gas can be utilized at supercritical conditions or subcritical conditions during pyrolysis of a feedstock. The temperatures of the furnace 103, the reactor 101, and/or the reactor inlet 106 can be controlled using proportional-integral-derivative (PID) controllers.

The pyrolysis gas can be housed in a pyrolysis gas source 115 such as a unit or a cylinder. The pyrolysis gas can be flowed or fed from the pyrolysis gas source 115 to the reactor 101 through lines 109a, line 109b, and line 109c. Lines 109a, 109b, and 109c may each be a portion of the same line 109. A valve 110, a pressure gauge 111, and a pump 113 can be located along the lines 109a, 109b, 109c. The valve 110 can be used to control the flow of pyrolysis gas into the reactor 101. The pump 113, such as an air-driven Maximator pump, can be utilized to draw pyrolysis gas from pyrolysis gas source 115, while the pressure gauge 111 can be utilized to monitor the pressure within lines 109a, 109b, and 109c. A compressor, not shown, can also be utilized to pressurize the pyrolysis gas. The pump 113 can further include means for pressurizing the pyrolysis gas. Pressures can be up to about 10.5 MPa, or even higher. At least a portion of line 109c can be temperature controlled such that line 109c is a temperature-controlled transfer line or a heated line. Heat exchangers, heaters, coils, jackets or other suitable equipment can be used to heat at least a portion of line 109c.

The reactor 101 also includes a reactor outlet 120 from which at least a portion of co-products generated during use of the apparatus 100 can be retrieved or flowed through. Pyrolysis gases, liquids, or fluids can also exit the reactor 101 via reactor outlet 120. The reactor 101 is in fluid communication with a backpressure valve 102 and a collection unit 125. As shown, the reactor is coupled to the backpressure valve 122 (or a metering valve) via line 121. The backpressure valve 122 (or metering valve) is coupled via line 123 to the collection unit 125 for collecting at least a portion of co-products (e.g., one or more condensable species such as bio-oils or other materials) generated during use of the apparatus 100. The backpressure valve 122 or metering valve can be a needle valve. The backpressure valve 122 (or metering valve) can be used to meter or control the flow of liquids and/or gases (e.g., co-products generated) exiting the reactor 101 along lines 121,123 and into the collection unit 125. The collection unit 125 can be any suitable unit for collecting substances such as a vessel or flask such as a Pyrex boiling flask. Lines 121 and 123 can be the same line.

The collection unit includes a collection unit inlet 124 through which co-products, e.g., bio-oils, generated during use of the apparatus 100 can be flowed into the collection unit 125. The collection unit 125 can also include a collection unit outlet 126 through which gases 129 (e.g., $CO_2$, $N_2$, or other gases) can be purged from the collection unit 125. The gases 129 can be purged via line 127. A flow meter 128, such as a rotameter, along the line 127 can be utilized to measure the flow rate of $CO_2$, $N_2$, or other gases being purged.

During operation, the collection unit 125 can be submerged in a dry ice bath that can be maintained at a temperature of about $-65°$ C. to about $-85°$ C. Chloroform, ethanol, isopropanol, acetone, and/or suitable materials, can be used with the dry ice to cool the dry ice bath at appropriate temperatures. Other temperatures can be utilized depending on the bio-oil(s) and/or other material(s) that is desired to be isolated, such as less than about $0°$ C. and/or more than about $-80°$ C., such as less than about $-10°$ C., such as less than about $-20°$ C., such as less than about $-30°$ C., such as less than about $-40°$ C., such as less than about $-50°$ C. Cooling of the collection unit 125 can enable the pyrolysis co-products (e.g., condensable species, bio-oils, and/or other materials) to gather and condense inside the collection unit 125.

The bio-oil is a co-product formed during the pyrolysis. The bio-oil can include at least one carbon atom from the feedstock (biomass). That is, at least one carbon atom of the bio-oil originates from the feedstock (biomass).

It is contemplated that one or more of the elements described in FIG. 1 may be coupled to controller 130. The controller 130 is utilized to control one or more operating parameters of the one or more elements as described below. The controller 130 includes a processor 131, memory 132, and support circuits 133. The processor 131 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller.

The memory 132 is non-transitory and may be one or more of readily available memory such as random access memory (RAM), read only memory (ROM), or any other form of digital storage, local or remote. The memory 132 contains instructions, that when executed by the processor 131, facilitates the operation of the apparatus of FIG. 1, the operations of FIG. 2A (described below), the operations of FIG. 2B (described below), and/or other operations or apparatus described herein. The instructions in the memory 132 are in the form of a program product such as a program that implements the process of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the processes described herein, are examples of the present disclosure. In one example, the disclosure may be implemented as the program product stored on a computer-readable storage media (e.g., memory 132) for use with a computer system (not shown). The program(s) of the program product define functions of the disclosure, described herein.

A sample thermocouple, not shown, can be positioned inside the reactor 101 for monitoring the temperature inside the reactor 101. A furnace thermocouple, not shown, can be positioned inside the furnace for monitoring the temperature inside the furnace 103. Although not shown in FIG. 1, it should be understood that various other equipment for controlling, e.g., temperature, pressure, and flow control of various feeds can be used with the apparatus 100. For example, heat exchangers can be used to cool or heat a liquid or a gas along the feed lines or within various units of the apparatus 100, while pumps and motors can be utilized to control the rate of flow of the materials and the operating pressures in apparatus 100. Further, apparatus 100 may include features for facilitating separation and/or purification of components as well as valves or other release mechanisms for, e.g., purging gases or liquids from the system. Various process controls can be used. Such process controls can include probes and sensors such as pressure indicators, differential pressure cells, temperature indicators, thermocouples, temperature switches, resistance temperature detectors, solenoids, flowmeters, flow regulators and valves, gas analyzers, humidity sensors, radar sensors, ammeters, current meters, liquid level detectors, feed level probes, electrical drives, and combinations thereof.

Processes

Embodiments of the present disclosure generally relate to processes for forming carbon foams and composite materials such as doped carbon composites. As discussed above, current techniques of pyrolyzing biomass (e.g., olive stones, Avicel, lignin, and cellulose) has resulted in very little, or zero, amounts of carbon foam. In contrast, embodiments described herein enable production of carbon foam and carbon-containing composites (e.g., sulfur-carbon composites, silicon-carbon composites) from various biomass feedstocks including, but not limited to, corn stover, Lodgepole pine, *Miscanthus*, Avicel, bituminous coal, esterified coal, xylan, and lignin. Other biomass is described above. The high-pressure pyrolysis process described herein is advantaged relative to other carbon foam production approaches due to, e.g., the simplicity and feedstock flexibility of embodiments described herein. Additional environmental advantages can be attained from the use of sustainable biomass waste feedstocks as described.

Embodiments described herein contemplate aqueous and non-aqueous environments for pyrolysis depending upon, e.g., the type of precursor utilized and amount of carbon foam fabrication anticipated. For example, and in some embodiments, pyrolysis of a biomass feedstock can be performed utilizing $CO_2$ and/or $N_2$, along with water ($H_2O$). When $H_2O$, in the form of preheated steam, is introduced in the reactor along with $CO_2$ and/or $N_2$, the $H_2O$ addition can increase the mechanical strength of the produced foams. Water is an optional process parameter to carbon foam formation.

A. Carbon Foams

Figure 2A:
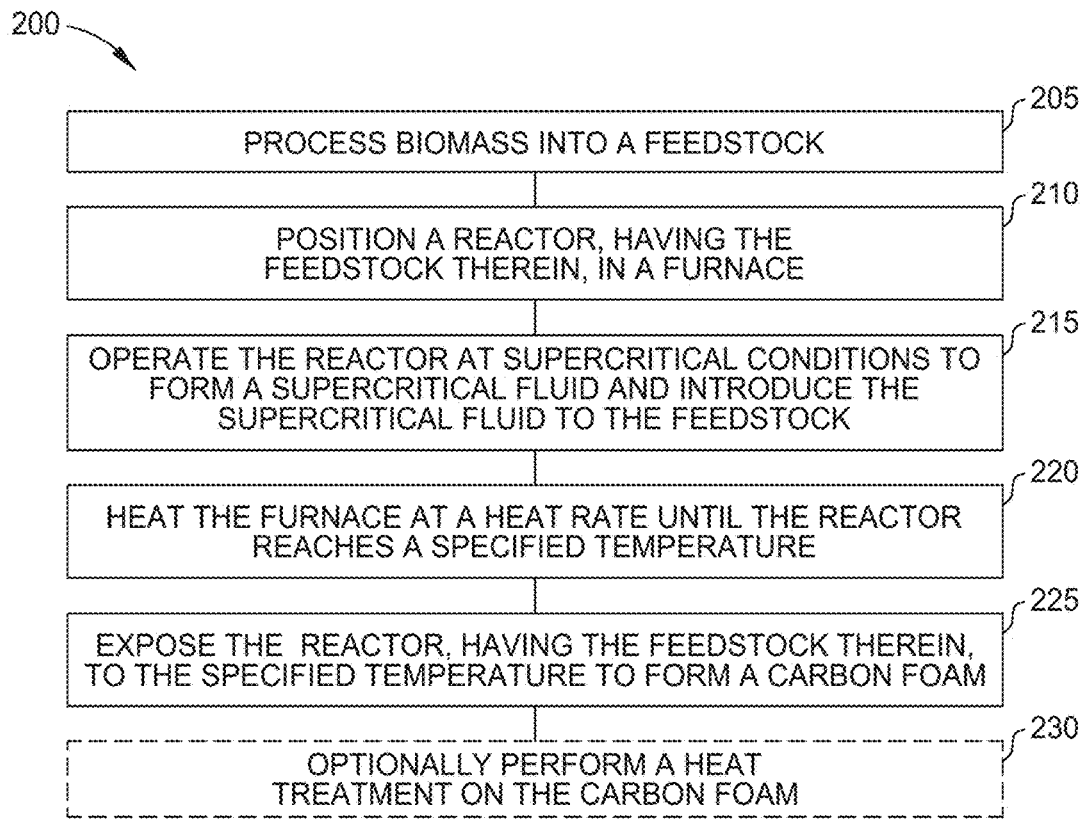
FIG. 2A is a flowchart showing selected operations of an example process for forming carbon foams according to at least one embodiment of the present disclosure.

The present disclosure generally relates to processes for forming carbon foams. Briefly, the process includes processing biomass into a feedstock and pyrolyzing the feedstock to carbon foam. FIG. 2A is a flowchart showing selected operations of a process 200 for making carbon foams according to at least one embodiment of the present disclosure. Although FIG. 2A specifies a supercritical fluid, subcritical fluids can be utilized as described below.

The process 200 includes processing biomass into a feedstock at operation 205. Processing biomass into a feedstock of operation 205 can include crushing, grinding, shearing, pulverizing, et cetera the biomass into a powder and/or particles. Any suitable apparatus can be utilized to crush, grind, shear, mill, or pulverize the biomass. The particles can have a particle size that is less than about 1 mm, such as less than about 0.5 mm, such as less than about 0.1 mm, such as from about 0.05 mm to about 0.95 mm, such as from about 0.1 mm to about 0.9 mm, such as from about 0.15 mm to about 0.85 mm, such as from about 0.2 mm to about 0.8 mm, such as from about 0.25 mm to about 0.75 mm, such as from about 0.3 mm to about 0.7 mm, such as from about 0.35 mm to about 0.65 mm, such as from about 0.4 mm to about 0.6 mm, such as from about 0.45 mm to about 0.55 mm. In at least one embodiment, the particles of the powder can have a particle size that is from about 0.05 mm to about 0.5 mm, such as from about 0.1 mm to about 0.45 mm, such as from about 0.15 mm to about 0.4 mm, such as from about 0.2 mm to about 0.35 mm, such as from about 0.25 mm to about 0.3 mm or from about 0.3 mm to about 0.35 mm. In some examples, the particle size is from about 0.149 mm to about 0.50 mm. In some examples, the particle size is from about 30 μm to about 1 mm. Larger or smaller particle sizes are contemplated. If desired, a sieve or mesh can be utilized to separate the particles into particles of various sizes.

It is contemplated that other processes beyond pulverization may also be utilized to break down the biomass for the purpose of, e.g., preventing mechanical resistance by compressing the loose powder into pellets. Accordingly, feedstock preparation processes that increase the surface area of the feedstock for pyrolysis can be advantageously utilized in the carbon foam production processes described herein.

In some embodiments, the feedstock powder formed in operation 205 can be compressed or compacted into pellets prior to further operations of the process 200. Suitable apparatus and methods can be utilized to compress/compact the powder into pellets such as loading the powder into a pellet die of a suitable diameter or dimensions, and pressing the powder into pellets at a desired pressure. A steel pellet press can be utilized. In some examples, the powder can be compressed/compacted into pellets and compressing the powder at a pressure from about 50,000 psi (~345 megapascals (MPa)) to about 150,000 psi (~1030 MPa), such as from about 75,000 psi (~520 to about 125,000 psi (~860 MPa), such as about 100,000 psi (~690 MPa). Before, during, or after operation 205, the feedstock may be optionally dried using suitable apparatus and methods. For example, a dryer such as an oven, kiln, rotary dryer, flash-tube dryer, or combinations thereof can be utilized to dry the material at elevated temperatures, e.g., greater than 95° C., such as greater than about 100° C. The dried material can then be further processed.

Feedstocks, either loose (e.g., particles/powder) or compacted pellets, can then be loaded into the reactor 101.

Optionally, the feedstock can be placed in a container, vessel, packet, tube, receptacle, or other structure to house, hold, or otherwise contain at least a portion of the feedstock as described above. The container, vessel, packet, tube, receptacle, or other structure, if used, is then placed in the reactor 101.

The process 200 further includes positioning or placing the reactor into a furnace (or chamber) at operation 210. The feedstock positioned within the reactor 101 and the furnace 103 is then ready for, e.g., pyrolysis. Process 200 further includes operating the reactor at supercritical conditions for a given fluid environment of $CO_2$ and/or $N_2$ at operation 215. Operating the reactor at supercritical conditions forms a supercritical fluid of the $CO_2$ and/or $N_2$. Additionally, or alternatively, the reactor 101 can be operated at subcritical conditions for a given fluid environment of $CO_2$ and/or $N_2$ at operation 215. In some embodiments, $H_2O$ can be introduced into the reactor 101 if desired, under supercritical or subcritical conditions. $H_2O$ can be added in addition to, or as an alternative to, $CO_2$ and/or $N_2$. Other materials besides $CO_2$, $N_2$, and $H_2O$ are contemplated.

Operation 215 can include pressurizing the reactor 101 and introducing the feedstock to the environment of $CO_2$, $N_2$, and/or $H_2O$ (supercritical conditions or subcritical conditions). That is, the $CO_2$, $N_2$, and/or $H_2O$ contacts the feedstock. Here, the $CO_2$, $N_2$, and/or $H_2O$ flows over the feedstock such that the volume of the reactor is swept, e.g., at least about once per minute. In other words, a volume of the reactor is overturned and/or replaced, e.g., at least about once per minute. The pressurization process of operation 215 can include operating the reactor 101 at a pressure that is from about 100 psi (~0.68 MPa) to about 5,000 psi (~34.5 MPa), such as from about 200 psi (~1.4 MPa) to about 4,000 psi (~27.6 MPa), such as from about 300 psi (~2.1 MPa) to about 3,000 psi (~20.7 MPa), such as from about 400 psi (~2.8 MPa) to about 2,500 psi (~17.2 MPa), such as from about 500 psi (~3.4 MPa) to about 2,000 psi (~13.8 MPa), such as from about 595 psi (~4.1 MPa) to 1520 psi (~10.5 MPa), such as from about 750 psi (~5.2 MPa) to about 1250 psi (~8.6 MPa), such as from about 1,000 psi (~6.9 MPa) to about 1,090 psi (~7.5 MPa). Higher or lower pressures are contemplated. This aforementioned pressure can be the pressure at which the reactor 101 is operated. Operation 215 enables formation of the supercritical fluid (or subcritical material depending on conditions) inside the reactor 101. Optionally, operation 215 can include heating the furnace 103 such that a temperature of the reactor 101 is from about 300° C. to about 700° C., such as from about 400° C. to about 600° C., such as from about 450° C. to about 550° C., such as from about 400° C. to about 500° C. or from about 500° C. to about 550° C.

In some embodiments, operation 215 can include flowing $CO_2$, $N_2$, $H_2O$, combinations thereof, and/or other agent(s) into the reactor 101 at an adjustable flow rate. The flow rate of $CO_2$ can be from about 1 $gCO_2$/min to about 20 $gCO_2$/min, such as from about 5 $gCO_2$/min to about 15 $gCO_2$/min, such as from about 8 $gCO_2$/min to about 12 $gCO_2$/min, such as about 9 $gCO_2$/min (which is equivalent to about 5 standard liters per minute (SLPM) at 298 K and 0.1 MPa). When $N_2$ is utilized, the flow rate of $N_2$ can be from about 1 $gN_2$/min to about 20 $gN_2$/min, such as from about 5 $gN_2$/min to about 15 $gN_2$/min, such as from about 8 $gN_2$/min to about 12 $gN_2$/min, such as about 9 $gN_2$/min. When $H_2O$ is utilized, the flow rate of $H_2O$ can be from about 1 $gH_2O$/min to about 20 $gH_2O$/min, such as from about 5 $gH_2O$/min to about 15 $gH_2O$/min, such as from about 8 $gH_2O$/min to about 12 $gH_2O$/min, such as about $gH_2O$/min. Other flow rates are contemplated.

Process 200 further includes heating the reactor at a selected heat rate until the reactor reaches a specified temperature at operation 220. During heating of operation 220, the carbon foam can be produced. The temperature of the reactor 101 can be monitored by positioning a thermocouple inside the reactor 101. The heating process of operation 220 can include operating the furnace 103 under conditions such that a specified temperature inside the reactor 101 can be from about 100° C. to about 900° C., such as from about 200° C. to about 800° C., such as from about 300° C. to about 700° C., such as from about 400° C. to about 600° C., such as from about 450° C. to about 550° C., such as from about 450° C. to about 500° C. or from about 500° C. to about 550° C. In at least one embodiment, and when the apparatus 100 does not include furnace 103, the heating process of operation 220 can include operating the reactor under conditions such that the specified temperature inside the reactor 101 is from about 100° C. to about 900° C., such as from about 200° C. to about 800° C., such as from about 300° C. to about 700° C., such as from about 400° C. to about 600° C., such as from about 450° C. to about 550° C., such as from about 450° C. to about 500° C. or from about 500° C. to about 550° C. Higher or lower temperatures are contemplated for operation 220.

Heating rates for operation 220 can be from about 1° C./min to about 300° C./min, such as from about 5° C./min to about 200° C./min, such as from about 10° C./min to about 100° C./min, such as from about 20° C./min to about 90° C./min, such as from about 30° C./min to about 80° C./min, such as from about 40° C./min to about 70° C./min, such as from about 50° C./min to about 60° C./min. In some embodiments, the heating rate for operation 220 is from about 50° C./min to about 150° C./min, such as from about 60° C./min to about 140° C./min, such as from about 70° C./min to about 130° C./min, such as from about 80° C./min to about 120° C./min, such as from about 80° C./min to about 100° C./min or from about 90° C./min to about 110° C./min. In some examples, the heating rate is from about 70° C./min to about 100° C./min. In at least one embodiment, the heat rate is from about 5° C./min to about 50° C./min, such as from about 10° C./min to about 45° C./min, such as from about 15° C./min to about 40° C./min, such as from about 20° C./min to about 35° C./min, such as from about 25° C./min to about 30° C./min, Higher or lower heating rates are contemplated. Operation 220 can further include heating the heated line (e.g., line 109c) at the aforementioned temperatures and/or heating rates.

The process 200 further includes exposing the reactor 101 (as well as the feedstock therein) to the specified temperature (e.g., the temperature in operation 220) for a period of time at operation 225. Exposure of the reactor and the biomass sample to the specified temperature at operation 225 causes, e.g., pyrolysis of the biomass sample and formation of a carbon foam. In some examples, the carbon foam is produced during operations 220 and/or 225. During operation 225, the reactor is held isothermal, or substantially isothermal, at the specified temperature for a period of time that is about 1 minute (min) or more and/or about 5 h or less, such as from about 5 min to about 1 h, such as from about 10 min to about 30 min. In at least one embodiment, the period of time for operation 225 can be at least about 5 min, such as at least about 10 min, such as at least about 30 min, such as at least about 1 h. In some embodiments, the period of time for operation 225 can be about 5 h or less, such as about 4 h or less, such as about 3 h or less, such as about 2.5 h or less, such as about 2 h or less, such as about 1.5 h or less, such as about 1 h or less, such as about 30 min or less. Longer or shorter periods of time are contemplated. The pressure during operation 225 can be those listed above for operation 215. The pyrolysis results in, e.g., a porous or substantially porous material. The pores of the carbon foam can include intact pores, substantially intact pores, and/or not intact pores. The carbon foam can be electrically conductive.

In some embodiments, process 200 can further include collecting a co-product such as a bio-oil during and/or after operation 225. The bio-oil co-product can be collected in, e.g., collection unit 125.

In some embodiments, the carbon foams can be further processed after pyrolysis. Here, and in some examples, a post-pyrolysis heat treatment (operation 230) can be optionally performed at a temperature of about 700° C. to about 1100° C., such as from about 750° C. to about 1050° C., such as from about 800° C. to about 1000° C., such as from about 850° C. to about 950° C., such as from about 850° C. to about 900° C. or from about 900° C. to about 950° C. The post pyrolysis heat treatment can be performed at a pressure from about ambient pressure (e.g., 15 psi) to about 2,100 psi, such as from about 200 psi to about 600 psi; and/or for a time duration of about 5 min to about 24 h, such as from about 1 h to about 3 h.

It is contemplated that embodiments herein can be used to increase product yield. The carbon foams produced by pyrolysis, with or without a post-pyrolysis heat treatment, and as described herein, can have one or more of the following characteristics or properties listed below.

A weight percent (wt %) of carbon in the carbon foam can be from about 15 wt % to about 100 wt %, such as from about 30 wt % to about 90 wt %, such as from about 40 wt % to about 80 wt %, such as from about 50 wt % to about 70 wt %, such as from about 55 wt % to about 65 wt %, based on a total weight of the carbon foam, the total weight of the carbon foam not exceeding 100 wt %. A higher or lower wt % of sulfur is contemplated. The wt % of sulfur is determined by elemental analysis on a dry basis.

A wt % of non-carbon elements in the carbon foam can be from about 0 wt % to about 85 wt %, such as from about 5 wt % to about 75 wt %, such as from about 10 wt % to about 70 wt %, such as from about 20 wt % to about 60 wt %, such as from about 30 wt % to about 50 wt %, based on a total weight of the carbon foam. A higher or lower wt % of non-carbon elements is contemplated. The wt % of non-carbon elements is determined by elemental analysis on a dry basis.

A bulk density of the carbon foam can be from about 0.1 g/mL to about 0.8 g/mL, such as from about 0.2 g/mL to about 0.6 g/mL, such as from about 0.3 g/mL to about 0.5 g/mL. A higher or lower bulk density of the carbon foam is contemplated. The bulk density is determined by measuring the mass and volume of pieces of carbon foam A specific surface area of the carbon foam can be from about 1.0 m$^2$/g to about 800 m$^2$/g, such as from about 1.0 m$^2$/g to about 50 m$^2$/g or from about 50 m$^2$/g to about 700 m$^2$/g, such as from about 100 m$^2$/g to about 600 m$^2$/g, such as from about 200 m$^2$/g to about 500 m$^2$/g, such as from about 300 m$^2$/g to about 400 m$^2$/g. A higher or lower specific surface area of the carbon foam is contemplated. The specific surface area is determined by physisorption analysis.

An average pore diameter of the pores (whether the pores are intact pores, substantially intact, and/or not intact) of the carbon foam can be from about 0.5 nm to about 400 µm, such as from about 1 nm to about 5 nm or from about 20 µm to about 200 µm. A higher or lower average pore diameter is contemplated. The average pore diameter is determined by physisorption for smaller pores and SEM for larger pores.

When the pores include macropores, the average macropore diameter of the macropores can be from about 20 µm to about 200 µm, such as from about 30 µm to about 180 µm, such as from about 50 µm to about 150 µm, such as from about 75 µm to about 125 µm. A higher or lower average macropore diameter is contemplated.

When the pores include mesopores, the average mesopore diameter of the mesopores can be from about 1 nm to about 50 nm, such as from about 2 nm to about 45 nm, such as from about 5 nm to about 40 nm, such as from about 10 nm to about 35 nm, such as from about 15 nm to about 30 nm, such as from about 20 nm to about 25 nm. A higher or lower average mesopore diameter is contemplated.

An average pore volume of the pores (whether the pores are intact pores, substantially intact, and/or not intact) of the carbon foam can be from about 0.05 mL/g to 0.8 mL/g, such as from about 0.2 mL/g to about 0.6 mL/g, such as from about 0.3 mL/g to about 0.5 mL/g. A higher or lower average pore volume is contemplated. The average pore volume is determined by physisorption analysis.

An electrical conductivity of the carbon foam can be from about $1\times10^{-8}$ to about $9\times10^5$ S/m, such as from about $1\times10^{-4}$ S/m to about $10^{-2}$ S/m or from about $1\times10^2$ S/m to about $5\times10^5$ S/m. A higher or lower electrical conductivity of the carbon foam is contemplated. The electrical conductivity is determined by the two-probe method.

A thermal conductivity of the carbon foam can be from about 0.1 W·m$^{-1}$·K$^{-1}$ to about 200 W·m$^{-1}$·K$^{-1}$, such as from about 0.3 W·m$^{-1}$·K$^{-1}$ to about 3 W·m$^{-1}$·K$^{-1}$ or from about 5 W·m$^{-1}$·K$^{-1}$ to about 30 W·m$^{-1}$·K$^{-1}$. A higher or lower thermal conductivity of the carbon foam is contemplated. The thermal conductivity is determined by thermal conductivity measurement such as ISO 12987.

An ultimate compressive strength of the carbon foam can be from about 0.1 MPa to about 20 MPa, such as from about 0.3 MPa to about 1 MPa or from about 2 MPa to about 10 MPa. A higher or lower ultimate compressive strength of the carbon foam is contemplated. The ultimate compressive strength is determined by compressive strength testing such as ASTM C 365.

Composites can also be fabricated by processes described herein and are further discussed below. The composites generally include at least two components. The first component includes a carbon foam and the second component includes particles. The carbon foam can be a matrix that includes a plurality of pores. The particles, e.g., sulfur particles or silicon particles, can be encapsulated, embedded, located, trapped, or otherwise disposed within the pores of the carbon foam. The particles can be dispersed, encapsulated, embedded, located, trapped, or otherwise disposed within the matrix of the carbon foam. Similarly, the particles may be disposed within the matrix of the carbon foam and within the pores. Generally, the composites are formed by mixing a feedstock with a substance, the substance comprising a sulfur source, a silicon source, a surfactant, or combinations thereof; and the resulting mixture is pyrolyzed to form the composite.

B. Sulfur-Carbon Composites

Figure 2B:
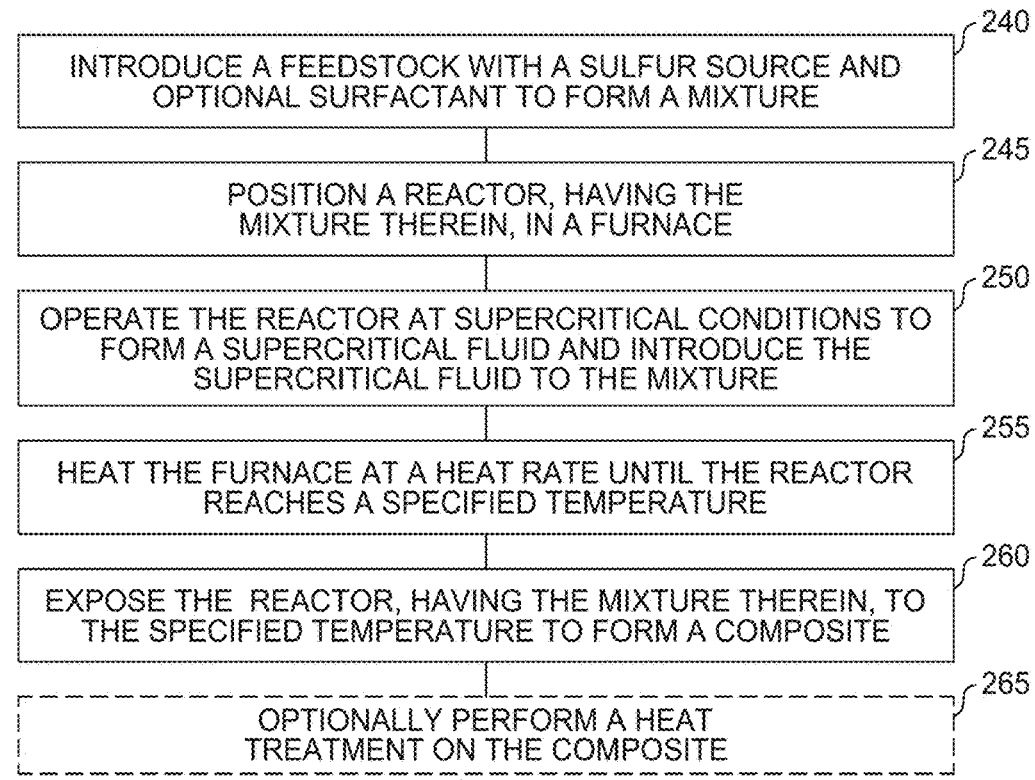
FIG. 2B is a flowchart showing selected operations of an example process for forming a sulfur-carbon composite according to at least one embodiment of the present disclosure.

The present disclosure also relates to processes for forming doped carbon composites such as sulfur-carbon composites. FIG. 2B is a schematic illustration of a process 235 for producing sulfur-carbon composites. Although FIG. 2B specifies a supercritical fluid, subcritical fluids can be utilized as described below. Briefly, the sulfur-carbon composites are formed by mixing a biomass feedstock, a sulfur source, and an optional surfactant, and the resulting mixture is pyrolyzed at elevated temperatures and/or pressures. The apparatus 100 shown in FIG. 1 can be utilized to produce the sulfur-carbon composites. Such sulfur-carbon composites can be utilized as at least a portion of an electrode such as at least a portion of a cathode.

The process 235 can be the same as, or similar to, process 200, except that sulfur and an optional surfactant is utilized to form the sulfur-carbon composites. The process 235 begins with operation 240 where a feedstock (e.g., lignocellulosic biomass or its derivatives, such as lignin) is introduced with a sulfur source, e.g., elemental sulfur (sulfur powder) and/or sodium sulfide, and an optional surfactant. Operation 240 can include processes of operation 205. For example, the biomass can be processed into the feedstock, formed into a powder/particles, and/or dried. Converting biomass to feedstock is further described above. The feedstock and sulfur source, with or without surfactant, can be blended or otherwise mixed to form a blend or a mixture. In some embodiments, one or more surfactants can be mixed or blended with the feedstock and sulfur prior to pyrolysis. Mixing can be performed by, e.g., placing the biomass and sulfur source in a beaker and stirring, or mixing with a blender, ball, or hammer mill.

The one or more surfactants, if used, can include non-ionic surfactants, cationic surfactants, anionic surfactants, or combinations thereof. Illustrative, but non-limiting, examples of non-ionic surfactants include alkylphenol ethoxylates such as Triton X-100, fatty acid esters of sorbitol such as Tween 20, and fatty alcohol ethoxylates such as octaethylene glycol monododecyl ether, or combinations thereof. Illustrative, but non-limiting, examples of cationic surfactants include quaternary ammonium salts such as cetrimonium bromide, cetylpyridinium chloride, or combinations thereof. Illustrative, but non-limiting, examples of anionic surfactants include organosulfates such as sodium dodecyl sulfate, ammonium lauryl sulfate, or combinations thereof.

In some embodiments, the surfactant includes cetrimonium bromide, an alkylphenol ethoxylate such as $C_{14}H_{22}O(C_2H_4O)_{9-10}$ (e.g., Triton X-100), a polysorbate 20 (e.g., Tween 20), a linear alkylbenzene sulfonic acid, a sodium C14-16 olefin sulfonate, or combinations thereof.

For operation 240, a mass ratio (on a dry basis) of the biomass feedstock to sulfur source can be from about 1:9 to about 9:1, such as from about 3:7 to about 1:1 or from about 3:2 to about 4:1. Higher or lower mass ratios can be utilized.

A mass ratio (on a dry basis) of the biomass feedstock to surfactant (when used) for operation 240 can be from about 1000:1 to about 10:1, such as from about 1000:1 to about 100:1, such as from about 100:1 to about 50:1 or from about 50:1 to about 10:1. Higher or lower mass ratios can be utilized.

A mass ratio (on a dry basis) of the sulfur source to surfactant (when used) for operation 240 can be from about 1000:1 to about 1:1, such as from about 1000:1 to about 200:1, such as from about 200:1 to about 50:1, such as from about 50:1 to about 1:1. Higher or lower mass ratios can be utilized.

The reactor 101, having the feedstock, sulfur source, and optional surfactant therein, can be positioned in the furnace 103 at operation 245. Operation 245 can be the same as, or similar to, operation 210 of process 200. Process 235 further includes operating the reactor 101 at supercritical conditions for a given fluid environment of $CO_2$ and/or $N_2$ at operation 250. Operating the reactor at supercritical conditions forms a supercritical fluid of the $CO_2$ and/or $N_2$. Additionally, or alternatively, the reactor 101 can be operated at subcritical conditions for a given fluid environment of $CO_2$ and/or $N_2$ at operation 250. In some embodiments, $H_2O$ can be introduced into the reactor 101 if desired, under supercritical or subcritical conditions. $H_2O$ can be added in addition to, or as an alternative to, $CO_2$ and/or $N_2$. Other materials besides $CO_2$, $N_2$, and $H_2O$ are contemplated.

Operation 250 can be the same as, or similar to, operation 215. Specifically, the reactor 101 can be pressurized to form an environment of $CO_2$, $N_2$, and/or $H_2O$ (supercritical conditions or subcritical conditions) in the reactor 101 and introducing the $CO_2$, $N_2$, and/or $H_2O$ with the mixture of the feedstock, the sulfur source, and the optional surfactant. That is, the $CO_2$, $N_2$, and/or $H_2O$ contacts the feedstock. Here, the $CO_2$, $N_2$, and/or $H_2O$ flows over the mixture such that the volume of the reactor is swept, e.g., at least about once per minute. In other words, a volume of the reactor 101 is overturned and/or replaced, e.g., at least about once per minute. Pressures, flow rates, temperatures, and other operating conditions are described above. In some examples, a pressure used during operation 250 is from about 1 MPa to about 20 MPa, such as from about 5 MPa to about 15 MPa, such as from about 5 MPa to about 10 MPa or from about 10 MPa to about 15 MPa.

The furnace 103 is then heated at a specified heating rate until the reactor 101 reaches a specified temperature at operation 255. The temperature of the reactor 101 can be monitored by positioning a thermocouple inside the reactor 101. Operation 255 can be the same as, or similar to, operation 220 of process 200. In at least one embodiment, and when the apparatus 100 does not include furnace 103, the heating process of operation 255 can include heating the reactor 101 at a specified heating rate until the reactor 101 reaches a specified temperature at operation 255. Operation 255 can further include heating the heated line (e.g., line 109c) at specified temperatures and specified rates. Such temperatures and heating rates are described above with operation 220 of process 200. In some examples, the temperature of the reactor 101 during operation 255 is from about 250° C. to about 900° C., such as from about 300° C. to about 800° C., such as from about 350° C. to about 700° C., such as from about 400° C. to about 600° C., such as from about 450° C. to about 550° C., such as from about 450° C. to about 500° C. or from about 500° C. to about 550° C.

The reactor 101, having the biomass feedstock, sulfur, and optional surfactant therein, are then exposed to the specified temperature (e.g., the specified temperature in operation 255) for a period of time at operation 260. Exposure of the reactor and the biomass sample to the specified temperature at operation 260 causes, e.g., pyrolysis of the biomass feedstock, sulfur source, and optional surfactant and formation of a sulfur-carbon composite. During operation 260, the reactor 101 can be held isothermal, or substantially isothermal, at the specified temperature for a period of time that is about 1 minute (min) or more and/or about 5 h or less, such as from about 5 min to about 1 h, such as from about 10 min to about 30 min. In at least one embodiment, the period of time for operation 225 can be at least about 5 min, such as at least about 10 min, such as at least about 30 min, such as at least about 1 h.

Figure 2C:
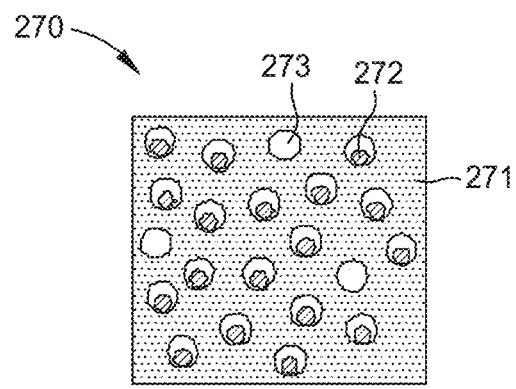
FIG. 2C is an illustration of an example sulfur-carbon composite according to at least one embodiment of the present disclosure

Operation 260 results in a sulfur-carbon composite 270 as shown in FIG. 2C. The sulfur carbon composite is a porous and electrically conductive foam. The sulfur-carbon composite 270 includes a carbon foam 271, or similar structure, and sulfur particles 272. The carbon foam of the sulfur-carbon composite 270 can be a porous, or substantially porous, material. As shown in FIG. 2C, the sulfur particles 272 can be encapsulated, embedded, located, trapped, or otherwise disposed within the pores 273 of the carbon foam 271. Although not shown, it is contemplated that the sulfur particles may be dispersed, encapsulated, embedded, located, trapped, or otherwise disposed within the matrix of the carbon foam. Similarly, the sulfur particles may be disposed within the matrix of the carbon foam and within the pores. A bio-oil can also be collected during process 235 as described above with respect to process 200. The pores of the sulfur-carbon composite can include intact pores, substantially intact pores, and/or not intact pores.

Process 235 can further include an optional post-pyrolysis heat treatment at operation 265. The post-pyrolysis heat treatment of operation 265 can increase the electrical conductivity of the sulfur-carbon composite 270. The optional post-pyrolysis heat treatment can be performed at a temperature of about 700° C. to about 1100° C., such as from about 750° C. to about 1050° C., such as from about 800° C. to about 1000° C., such as from about 850° C. to about 950° C., such as from about 850° C. to about 900° C. or from about 900° C. to about 950° C. The post-pyrolysis heat treatment can be performed at a pressure from about 15 psi to about 2,100 psi, such as from about 200 psi to about 800 psi; and/or for a time duration of about 1 h to about 24 h, such as from about 1 h to about 4 h. The post-pyrolysis heat treatment can remove all, or substantially all, sulfur that is not dispersed, encapsulated, embedded, located, trapped, or otherwise disposed within the pores/matrix of the sulfur-carbon composite 270. The optional surfactant, when used, can also be removed by operation 265.

It is contemplated that embodiments herein can be used to increase product yield and improve the characteristics of sulfur-carbon composites engineered under high pressure and high temperature conditions using biomass.

In some examples, the mass yield (on a dry basis of feedstock) of carbon foam can be about 20% or more, such as from about 25% to about 95%, such as from about 30% to about 85%, such as from about 40 wt % to about 60 wt %, though higher or lower mass yields are contemplated.

The sulfur-carbon composite 270 (or sulfur-carbon foam) before or after the post-pyrolysis heat-treatment, can have one or more of the following characteristics/properties listed below:

A weight percent (wt %) of sulfur in the sulfur-carbon composite 270 can be from about 0 wt % to about 80 wt %, such as from about 5 wt % to about 75 wt %, such as from about 10 wt % to about 70 wt %, such as from about 20 wt % to about 60 wt %, such as from about 30 wt % to about 50 wt %, based on a total weight of the sulfur-carbon composite, the total weight of the composite not exceeding 100 wt %. In some examples, the wt % of sulfur is from about 30 wt % to about 65 wt %, such as from about 35 wt % to about 60 wt %, such as from about 40 wt % to about 55 wt %, such as from about 45 wt % to about 55 wt %. A higher or lower wt % of sulfur is contemplated. The wt % of sulfur is determined by a Thermo Scientific Flashsmart elemental analyzer.

A wt % of non-carbon elements in the sulfur-carbon composite 270 can be from about 0 wt % to about 85 wt %, such as from about 1 wt % to about 15 wt % or from about 20 wt % to about 60 wt %, based on a total weight of the sulfur-carbon composite. In some examples, the wt % of non-carbon elements is from about 25 wt % to about 55 wt %, such as from about 30 wt % to about 50 wt %, such as from about 35 wt % to about 45 wt %. A higher or lower wt % of non-carbon elements is contemplated. The wt % of non-carbon elements is determined by a Thermo Scientific Flashsmart elemental analyzer.

A wt % of carbon in the sulfur-carbon composite 270 can be from about 15 wt % to about 100 wt %, such as from about 25 wt % to about 40 wt % or from about 55 wt % to about 95 wt %, based on a total weight of the sulfur-carbon composite. In some examples, the wt % of carbon is from about 25 wt % to about 90 wt %, such as from about 30 wt % to about 80 wt %, such as from about 40 wt % to about 70 wt %, such as from about 50 wt % to about 60 wt %. A higher or lower wt % of carbon is contemplated. The wt % of carbon is determined by a Thermo Scientific Flashsmart elemental analyzer.

A bulk density of the sulfur-carbon composite 270 can be from about 0.2 g/mL to about 2.0 g/mL, such as from about 0.3 g/mL to about 0.6 g/mL or from about 0.6 g/mL to about 1.2 g/mL. A higher or lower bulk density of the sulfur-carbon composite is contemplated. The bulk density is determined by measurement of bulk volume and mass.

A specific surface area of the sulfur-carbon composite 270 can be from about 1 m$^2$/g to about 1000 m$^2$/g, such as from about 10 m$^2$/g to about 200 m$^2$/g or from about 300 m$^2$/g to about 800 m$^2$/g, such as from about 400 m$^2$/g to about 700 m$^2$/g, such as from about 500 m$^2$/g to about 600 m$^2$/g. A higher or lower specific surface area of the sulfur-carbon composite is contemplated. The specific surface area is determined by physisorption analysis.

An average pore diameter of the pores (whether the pores are intact pores, substantially intact, and/or not intact) of the sulfur-carbon composite 270 can be from about 0.3 nm to about 500 μm, such as from about 0.5 nm to about 10 nm or from about 1.0 μm to about 200 μm. A higher or lower average pore diameter is contemplated. The average pore diameter is determined by electron microscopy.

When the pores of the sulfur-carbon composite 270 include macropores, the average macropore diameter of the macropores can be from about 1 μm to about 200 μm, such as from about 20 μm to about 200 μm, such as from about 30 μm to about 180 μm, such as from about 50 μm to about 150 μm, such as from about 75 μm to about 125 μm. A higher or lower average macropore diameter is contemplated.

When the pores of the sulfur-carbon composite 270 include mesopores, the average mesopore diameter of the mesopores can be from about 0.3 nm to about 50 nm, such as from about 0.5 nm to about 50 nm, such as from about 2 nm to about 45 nm, such as from about 5 nm to about 40 nm, such as from about 10 nm to about 35 nm, such as from about 15 nm to about 30 nm, such as from about 20 nm to about 25 nm. In some embodiments, the average mesopore volume is from about 0.5 nm to about 10 nm, such as from about 1 nm to about 8 nm, such as from about 3 nm to about 7 nm. A higher or lower average mesopore diameter is contemplated.

An average pore volume of the pores (whether the pores are intact pores, substantially intact, and/or not intact) of the sulfur-carbon composite 270 can be from about 0.05 mL/g to about 0.5 mL/g, such as from about 0.1 mL/g to about 0.3 mL/g. A higher or lower average pore volume is contemplated. The average pore volume is determined by electron microscopy.

An electrical conductivity of the sulfur-carbon composite 270 can be from about $1\times10^{-8}$ S/m to about $9\times10^{5}$ S/m, such as from about $1\times10^{-7}$ S/m to about $9\times10^{-2}$ S/m or from about $1\times10^{2}$ S/m to about $9\times10^{5}$ S/m. A higher or lower electrical conductivity of the sulfur-carbon composite is contemplated. The electrical conductivity is determined by the two-probe method.

A thermal conductivity of the sulfur-carbon composite 270 can be from about 0.1 W·m$^{-1}$·K$^{-1}$ to about 200 W·m$^{-1}$·K$^{-1}$, such as from about 0.2 W·m$^{-1}$·K$^{-1}$ to about 2.0 W·m$^{-1}$·K$^{-1}$, or from about 3.0 W·m$^{-1}$·K$^{-1}$ to about 120 W·m$^{-1}$·K$^{-1}$. A higher or lower thermal conductivity of the sulfur-carbon composite is contemplated. The thermal conductivity is determined by thermal conductivity measurement such as ISO 12987.

An ultimate compressive strength of the sulfur-carbon composite 270 can be from about 0.1 MPa to about 5.0 MPa, such as from about 0.1 MPa to about 1.0 MPa or from about 1.0 MPa to about 4.0 MPa. A higher or lower ultimate compressive strength of the sulfur-carbon composite is contemplated. The ultimate compressive strength is determined by compressive strength testing.

The sulfur-carbon composites described herein can be used in energy storage devices such as batteries, as further described below. For example, the sulfur-carbon composite can be at least a portion of a cathode. In addition, the sulfur-carbon composites described herein can be used in fuel cells.

C. Silicon-Carbon Composites

The present disclosure also relates to processes for forming silicon-carbon composites. Briefly, the silicon-carbon composites foams can be formed by mixing a feedstock, a silicon source, and an optional surfactant, and then pyrolyzing at elevated temperatures and/or pressures. A post-pyrolysis heat-treatment can also be performed as described above. Processes for forming the silicon-carbon composites can be the same as, or similar to, the operations of process 235 (FIG. 2B), except that a silicon source is used instead of a sulfur source. The process results in a silicon-carbon composite, similar to that shown in FIG. 2C (except silicon particles replace sulfur particles). A bio-oil can also be collected during processes for forming silicon-carbon composites.

The silicon-carbon composite includes a carbon foam, or similar structure, and silicon particles. The carbon foam of the silicon-carbon composite can be a porous, or substantially porous, material. The silicon particles can be encapsulated, embedded, located, trapped, or otherwise disposed within the pores of the carbon foam. The silicon particles may be dispersed, encapsulated, embedded, located, trapped, or otherwise disposed within the matrix of the carbon foam. Similarly, the silicon particles may be disposed within the matrix of the carbon foam and within the pores. The pores of the silicon-carbon composite can include intact pores, substantially intact pores, and/or not intact pores. The silicon-carbon composites can be electrically conductive.

Suitable silicon sources can include silicon nanoparticles, and silicon powder. Suitable surfactants can be those described above.

A mass ratio (on a dry basis) of the biomass feedstock to silicon source can be from about 9:1 to about 1:4, such as from about 9:1 to about 2:1, such as from about 2:1 to about 1:1 or from about 1:1 to about 1:4. Higher or lower weight ratios can be utilized.

It is contemplated that embodiments herein can be used to increase product yield and improve the characteristics of silicon-carbon composites engineered under high pressure and high temperature conditions using biomass.

In some examples, the mass yield (on a dry basis of feedstock) of carbon foam can be about 20% or more, such as from about 25% to about 95%, such as from about 30% to about 85%, such as from about 40 wt % to about 60 wt %, though higher or lower mass yields are contemplated.

The silicon-carbon composite, before or after the post-pyrolysis heat-treatment, can have one or more of the following characteristics/properties listed below:

A weight percent (wt %) of silicon in the silicon-carbon composite can be from about 0 wt % to about 85 wt %, such as from about 10 wt % to about 70 wt %, such as from about 20 wt % to about 60 wt %, such as from about 30 wt % to about 50 wt %, based on a total weight of the silicon-carbon composite, the total weight of the composite not exceeding 100 wt %. A higher or lower wt % of silicon is contemplated. The wt % of silicon is determined by elemental analysis.

A wt % of non-carbon elements in the silicon-carbon composite can be from about 0 wt % to about 10 wt %, such as from about 1 wt % to about 7 wt %, such as from about 3 wt % to about 5 wt %, based on a total weight of the silicon-carbon composite. A higher or lower wt % of non-carbon elements is contemplated. The wt % of non-carbon elements is determined by elemental analysis and/or thermogravimetric analysis.

A wt % of carbon in the silicon-carbon composite can be from about 10 wt % to about 85 wt %, such as from about 20 wt % to about 80 wt %, such as from about 30 wt % to about 70 wt %, such as from about 40 wt % to about 60 wt %, based on a total weight of the silicon-carbon composite. A higher or lower wt % of carbon is contemplated. The wt % of carbon is determined by elemental analysis.

A bulk density of the silicon-carbon composite can be from about 0.2 g/mL to about 2.0 g/mL, such as from about 0.3 g/mL to about 0.8 g/mL, such as from about 0.9 g/mL to about 1.6 g/mL. A higher or lower bulk density of the silicon-carbon composite is contemplated. The bulk density is determined by measurement of mass and volume of bulk foams.

A specific surface area of the silicon-carbon composite can be from about 2 m$^2$/g to about 800 m$^2$/g, such as from about 5 m$^2$/g to about 50 m$^2$/g or from about 60 m$^2$/g to about 600 m$^2$/g, such as from about 100 m$^2$/g to about 500 m$^2$/g, such as from about 200 m$^2$/g to about 400 m$^2$/g. A higher or lower specific surface area of the silicon-carbon composite is contemplated. The specific surface area is determined by physisorption analysis.

An average pore diameter of the pores (whether the pores are intact pores, substantially intact, and/or not intact) of the silicon-carbon composite can be from about 0.3 nm to about 400 μm, such as from about 0.5 nm to about 15 nm or from about 50 μm to about 400 μm. A higher or lower average pore diameter of the silicon-carbon composite is contemplated. The average pore diameter is determined by electron microscopy.

When the pores of the silicon-carbon composite include macropores, the average macropore diameter of the macropores can be from about 1 μm to about 400 μm, such as from about 50 μm to about 300 μm, such as from about 75 μm to about 250 μm, such as from about 100 μm to about 200 μm, such as from about 225 μm to about 275 μm. A higher or lower average macropore diameter is contemplated.

When the pores of the silicon-carbon composite include mesopores, the average mesopore diameter of the mesopores can be from about 0.3 nm to about 50 nm, such as from about 0.5 nm to about 50 nm, such as from about 2 nm to about 45 nm, such as from about 5 nm to about 40 nm, such as from about 10 nm to about 35 nm, such as from about 15 nm to about 30 nm, such as from about 20 nm to about 25 nm. In some embodiments, the average mesopore volume is from about 0.3 nm to about 15 nm, such as from about 0.5 nm to about 15 nm, such as from about 1 nm to about 10 nm, such as from about 2 nm to about 8 nm, such as from about 3 nm to about 7 nm. A higher or lower average mesopore diameter is contemplated.

An average pore volume of the pores (whether the pores are intact pores, substantially intact, and/or not intact) of the silicon-carbon composite can be from about 0.05 ml/g to about 0.6 ml/g, such as from about 0.1 ml/g to about 0.25 ml/g, such as from 0.3 ml/g to about 0.55 ml/g. A higher or lower average pore volume of the silicon-carbon composite is contemplated. The average pore volume is determined by electron microscopy.

An electrical conductivity of the silicon-carbon composite can be from about $1\times10^{-8}$ S/m to about $9\times10^{5}$ S/m, such as from about $1\times10^{-7}$ S/m to about $9\times10^{-2}$ S/m or from about $1\times10^{2}$ S/m to about $9\times10^{5}$ S/m. A higher or lower electrical conductivity of the silicon-carbon composite is contemplated. The electrical conductivity is determined by the two-probe method.

A thermal conductivity of the silicon-carbon composite can be from 0.1 $W \cdot m^{-1} \cdot K^{-1}$ to about 200 $W \cdot m^{-1} \cdot K^{-1}$, such as from about 0.1 $W \cdot m^{-1} \cdot K^{-1}$ to about 10 $W \cdot m^{-1} \cdot K^{-1}$ or from about 10 $W \cdot m^{-1} \cdot K^{-1}$ to about 200 $W \cdot m^{-1} \cdot K^{-1}$. A higher or lower thermal conductivity of the silicon-carbon composite is contemplated. The thermal conductivity is determined by measuring heat flow through a sample foam.

An ultimate compressive strength of the silicon-carbon composite can be from about 0.2 MPa to about 5.0 MPa, such as from about 0.2 MPa to about 1.5 MPa or from about 1.5 MPa to about 5.0 MPa. A higher or lower ultimate compressive strength of the silicon-carbon composite is contemplated. The ultimate compressive strength is determined by compressive strength testing.

Embodiments of the disclosure utilize a novel process to encapsulate silicon in a porous, graphitized (partially and/or completely graphitized), and electrically conductive biomass-derived carbon foam matrix to serve as a lithium ion battery electrode such as an anode. The porous carbon matrix provides, e.g., structural integrity and pore volume for silicon swelling during lithiation, while the high silicon content, e.g., increases the capacity of the anode.

The silicon-carbon composites described herein can be used in energy storage devices such as batteries, as further described below. For example, the silicon-carbon composite can be at least a portion of an anode. In addition, the silicon-carbon composites described herein can be used in fuel cells.

Energy Storage Device

Figure 3A:
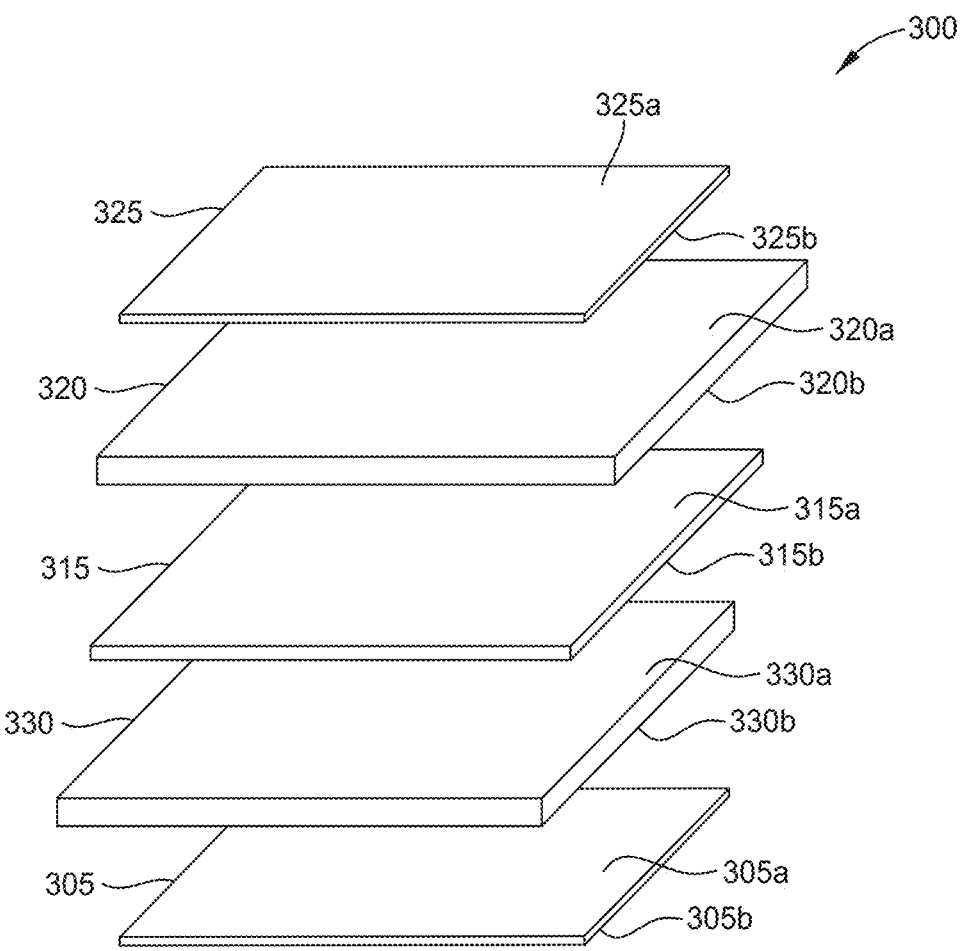
FIG. 3A is an exploded perspective view of an example battery according to at least one embodiment of the present disclosure.

Embodiments described herein also generally relate to energy storage device technology, e.g., battery technology. FIG. 3A is an exploded perspective view of a battery 300 according to some embodiments of the present disclosure. The battery 300 can be a lithium battery, such as a lithium metal anode based battery. One or more of the electrodes of the battery can include a sulfur-carbon composite or a silicon-carbon composite.

The battery 300 includes a first current collector 305. The first current collector 305 can include an electrically conductive material such as aluminum. The first current collector 305 has a top surface 305*a* and a bottom surface 305*b*. The battery 300 further includes a cathode 310 disposed on or over at least a portion of the first current collector 305. As shown in FIG. 3A, a bottom surface 310*b* of the cathode 310 is disposed on or over at least a portion of the top surface 305*a* of the first current collector 305. The first current collector 305 can serve to, e.g., collect electrons from the cathode 310 and/or supply electrons to the cathode 310 during charge/discharge processes of the battery 300. A separator 315 is disposed on or over at least a portion of the cathode 310, such that a bottom surface 315*b* of the separator is disposed on or over at least a portion of the top surface 310*a* of the cathode 310.

The battery 300 further includes an anode 320 having a bottom surface 320*b*, the bottom surface 320*b* of the anode 320 being disposed on or over at least a portion of a top surface 315*a* of the separator 315. The battery 300 further includes a second current collector 325 having a top surface 325*a* and a bottom surface 325*b*. The bottom surface 325*b* of the second current collector 325 is disposed on or over at least a portion of a top surface 320*a* of the anode 320. The second current collector 325 can serve to, e.g., collect electrons from the anode 320 and/or supply electrons to the anode 320 during charge/discharge processes in the battery 300. The second current collector 325 can include an electrically conductive material such as copper.

In some embodiments, the battery 300 can further include a first tab or lead contacting an exposed surface of the first current collector 305 and/or a second tab or lead contacting an exposed surface of the second current collector 325. The tabs/leads can be soldered or fused to the respective current collectors via a low-resistance contact formed between the tabs and conductive component(s) of the respective current collectors 305, 325. Although not shown, the battery 300 can include one or more electrolytes.

The electrodes (e.g., cathode 310 and anode 320), separator 315, current collectors (e.g., first current collector 305 and second current collector 325) as well as other battery components such as electrolytes are described further below.

Sulfur-Carbon Composite as an Electrode

Embodiments described herein also relate to uses of sulfur-carbon composites as, e.g., as an electrode. Some embodiments useful for the sulfur-carbon composite in these and other applications are described above. The sulfur-carbon composite can be used as at least a portion of a cathode, e.g., cathode 310, of a battery 300, other battery, or other suitable energy storage device.

One conventional technique for producing high performance and durable Li—S batteries has been utilization of porous, electrically conductive carbon to support the active sulfur comprising the electrode, for example, the cathode. The electrically conductive carbon facilitates electron transport to and from sulfur while polysulfide species remain partially immobilized in pores of the carbon. These composite cathodes are generally constructed by the so called "melt infiltration" method in which sulfur is heated to approximately 160° C., where liquid sulfur reaches its minimum viscosity, and is poured over the porous carbon. Some of the sulfur diffuses into pores in the carbon and excess sulfur can be removed from the carbon surface by heat treatment or solvent washes. The sulfur-carbon composite is then mixed with conductivity additives and binder and cast onto metallic current collectors. While the solid sulfur is trapped in the electrode, issues still arise when sulfur is lithiated during discharge to form soluble polysulfide species. These polysulfide species can diffuse out of the porous carbon structure and react harmfully with, e.g., the electrode and electrolyte, thus degrading battery performance.

Figure 3B:
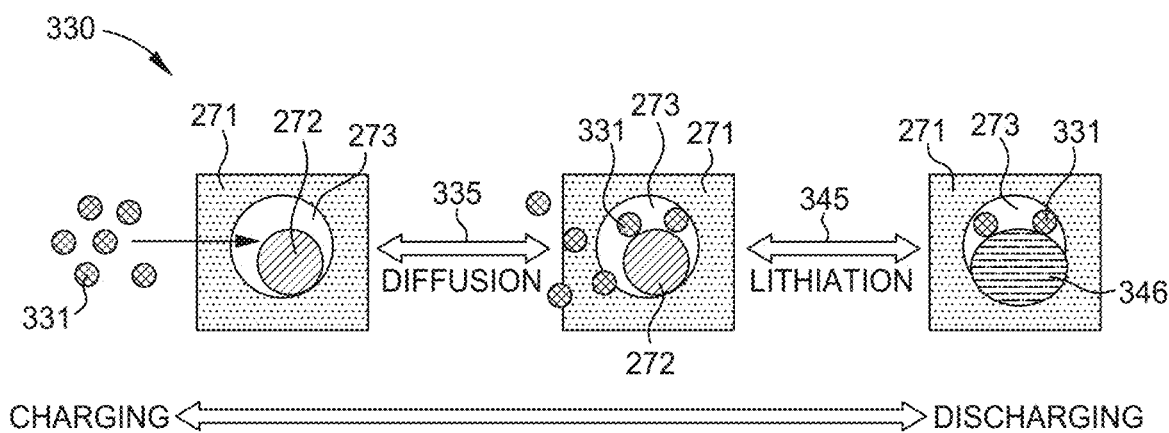
FIG. 3B is a schematic of lithium diffusion and sulfur lithiation within example carbon foams during cycling according to at least one embodiment of the present disclosure.

To solve the problem of polysulfide diffusion, the inventors have discovered a process that encapsulates sulfur within the pores of a closed cell carbon foam as described above. Properties of the produced foams encapsulating sulfur (the sulfur-carbon composites) can be tailored by varying process parameters such as feedstock composition and particle size, heating rate, and pressure. Functionality of these sulfur-carbon composites is illustrated in FIG. 3B for a Li—S battery cathode. During discharge of such batteries, lithium ions 331 diffuse through the thin walls of the carbon foam 271 walls and into closed pores 273 as shown by the diffusion process 335. The lithium ions 331 react with sulfur particles 272 via lithiation 340 to form lithium polysulfides 346. These polysulfides are then contained within the closed pores 273 and are unable to react harmfully with the electrolyte or the anode. The lithiation reactions are reversible and the polysulfides are de-lithiated during charging, when lithium ions are transported back to the anode.

A thickness of the sulfur-carbon composite used as an electrode layer can be about 10 μm to about 200 μm, such as from about 40 μm to about 70 μm, such as from about 80 μm to about 150 μm. Thicker and thinner layers are considered. Other properties and characteristics of the sulfur-carbon composite are described above. Other properties of the silicon-carbon composites are described above.

In some embodiments, a sulfur-carbon composite can be used as at least a portion of a cathode. The cathode can be formed by grinding or sieving the sulfur-carbon composites, and then washing the ground/sieved sulfur-carbon composites with a solvent (e.g., carbon disulfide or acetone) and/or heat-treating (e.g., at about 450° C. to about 1,200° C.) to remove residual sulfur not in the pores of the composite. The washed and/or heat-treated material can be mixed, if desired, with a conductivity additive (e.g., carbon black) and/or a binder (e.g., poly(vinylidene fluoride)), and then cast onto a metallic current collector.

In some embodiments, the cathode can have a sulfur content that is about 20 wt %, such as from about 20 wt % to about 90 wt %, such as from about 30 wt % to about 80 wt %, such as from about 40 wt % to about 70 wt %, such as from about 50 wt % to about 60 wt %, based on a total weight of the electrode.

The sulfur-carbon composite cathode may be assembled into, e.g., full cell batteries using lithium metal electrodes or another suitable configuration. It is contemplated that sulfur-carbon composites described herein may be utilized in cathode implementations for lithium ion batteries.

Silicon-Carbon Composite as an Electrode

Embodiments described herein also relate to uses of silicon-carbon composites as, e.g., an electrode. Some embodiments useful for the silicon-carbon composite in these and other applications are described above. The silicon-carbon composite can be used as at least a portion of an anode, e.g., anode 320, of a battery 300, other battery, or other suitable energy storage device.

Many state-of-the-art battery electrodes (anode or cathode) include graphite. Graphite is typically derived from fossil sources and is highly refined using multi-step processing and toxic chemicals, which translates to a significant positive carbon footprint and negative environmental impacts. Current production of graphite anodes is also expensive. In addition, other state-of-the-art battery technology uses silicon anodes. However, conventional silicon anodes are unstable. In contrast, processes for forming silicon-carbon composites described herein are environmentally benign and inexpensive compared with current graphite electrode production processes, and can enable integration of high levels of Si into an electrode. Further, the silicon-carbon composites described herein are believed to be promising materials for enhancing silicon anode stability because silicon-carbon composite materials combine the high performance electrical characteristics of silicon with the structural stability of carbon. In some embodiments, fabrication of the composite silicon-carbon electrode is an encapsulation-based approach, offering improved anode integrity and protection of embedded Si against pulverization and solid electrolyte interface (SEI) growth during lithiation. It is contemplated that the embodiments described herein may be utilized in anode and/or cathode implementations for lithium ion batteries.

Figure 3C:
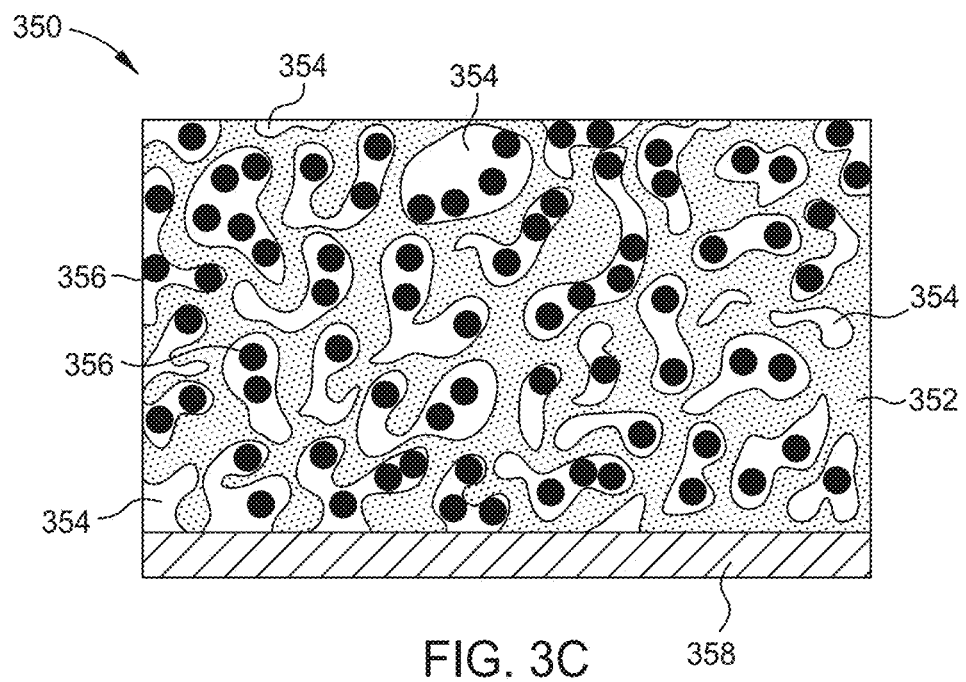
FIG. 3C is an illustration of a cross-sectional view of an example composite silicon-carbon anode according to at least one embodiment of the present disclosure.

FIG. 3C illustrates a schematic cross-sectional view of a composite silicon-carbon electrode 350 according to an embodiment of the disclosure. The silicon-carbon electrode 350 includes a carbon foam 352, such as the carbon foams described herein, which is disposed on a current collector 358. The current collector 358 may be fabricated from a metallic material, such as copper, aluminum, alloys thereof, and various other suitable materials. The current collector 358 can be a foil or other similar material. In certain embodiments, the current collector 358 is optional. The carbon foam 352 forms a matrix having a plurality of pores 354 formed therein. The pores 354 may be considered open spaces formed within the matrix which are substantially devoid of carbon. The pores 354 can have widths or diameters, depending upon pore morphology, between about 1 micrometer (μm) and about 500 μm. In certain embodiments, the pores 354 have widths or diameters on the sub-micron scale, depending upon, e.g., the desired carbon foam characteristics.

The carbon foam 352 is utilized to form a matrix or superstructure within which silicon particles 356 are encapsulated, embedded, located, trapped, or otherwise disposed within. In the illustrated embodiment, the silicon particles 356 are disposed within the pores 354. However, it is contemplated that the silicon particles 356 may be encapsulated, embedded, located, trapped, or otherwise disposed within the matrix of the carbon foam 352. Similarly, the silicon particles 356 may be disposed within the matrix of the carbon foam 352 and within the pores 354.

The silicon content of the silicon-carbon electrode 350 can be about 30 wt % or more, for example, about 50 wt % or more, based on the elemental analysis. In some embodiments, the carbon to silicon ratio of the anode is from about 2:1 to about 1:2 as determined by elemental analysis.

Silicon doping of the carbon foam 352 with about 30 wt % silicon does not adversely affect the structural integrity of the carbon foam 352. Significantly higher silicon dopant amounts, such as 50 weight percent or greater, are possible because, e.g., no structural integrity loss has been observed due to the morphology of the carbon foam 352. In addition, loss of carbon foam 352 integrity at higher dopant levels is not necessarily an impediment to anode success, as the Si-laden foams can be milled, slurried, and tape cast to form anodes while retaining micro- and meso-scale encapsulation of silicon. Thus, multiple anode forming techniques may be utilized to mitigate the risks associated with high Si loading of the carbon foam 352.

Anode degradation and reduced battery performance is a potential consequence of silicon loading of silicon-carbon anodes due to pulverization of silicon particles and SEI formation on the surface of the silicon. However, due to the unique carbon foam fabrication process, the carbon foam materials and processes for forming such materials enable minimization of potential adverse effects of silicon doping. For example, properties of the carbon foam, such as density and pore size, may be tailored during foam fabrication to ensure integrity of the ultimately formed anode. In some embodiments, carbon foams with encapsulated silicon are milled and tape cast onto a current collector through a slurrying process utilizing a binder. Non-limiting examples of a binder material for adhering the silicon doped carbon foam to the current collector include styrene-butadiene rubber and polyvinylidene fluoride, among others. In another embodiment, anodes are directly formed during the silicon-carbon composite anode fabrication process. Such a process may include embedding the current collector within the anode during fabrication. In this embodiment, the utilization of a binder is reduced or eliminated and may reduce fabrication cost while increasing anode performance.

The silicon-carbon composite anodes may be assembled into full cell batteries in a coin cell configuration or other suitable configuration. The silicon-carbon composite anodes are believed to exhibit a specific energy of greater than about 350 Wh/kg @ C/3, an energy density of greater than about 750 Wh/L @ C/3, and a calendar life and cycle life having less than about 20% energy fade and C/3 deep discharge to 350 Wh/g with less than about 20% energy fade, respectively, over 5 years and 3,000 cycles or 10 years and 1,000 cycles. The aforementioned battery performance characteristics can be enabled by utilization of the carbon foams described herein to provide structurally robust composite anodes which minimize the probability of anode destruction. Specifically, the carbon foams described herein provide structural support and pores for silicon expansion and protection to maintain anode integrity.

Composite silicon-carbon anodes fabricated according to the embodiments described herein provide various advantages over conventional composite anodes. For example, embodiments described herein utilize integration of high weight percentages of silicon into silicon-carbon composites, thereby dramatically increasing the specific capacity of these electrodes as compared to conventional graphite electrode or composite electrodes loaded with low levels of silicon. The high silicon loading is enabled through encapsulation during the carbon foam fabrication processes described herein.

Composite silicon-carbon electrodes of the present disclosure also mitigate or eliminate electrode degradation and retain electrode performance over repeated cycling by using silicon encapsulation within the silicon-carbon composite electrodes. The composite structure enables volumetric expansion of silicon in the pore space within the carbon foam during lithiation while maintaining structural integrity and electrical contact within the electrode. SEI growth on the silicon particles is also reduced or eliminated. The carbon source for the silicon-carbon electrodes is also a low cost, renewable biomass material as opposed to non-renewable and high cost fossil-derived graphite from which conventional electrodes are produced.

Referring again to FIG. 3A, the current collectors, e.g., the first current collector 305 and the second current collector 325, are not particularly limited. Each current collector can include, independently, an electrically conductive material such as an electrically conductive metal, an electrically conductive metal alloy, or a combination thereof. In some embodiments, the electrically conductive material comprises copper, aluminum, nickel, platinum, zinc, titanium, stainless steel, sintered carbon, or combinations thereof. In at least one embodiment, the first current collector 305—which is the current collector for the cathode 310—comprises aluminum as an electrically conductive material; and/or the second current collector 325—which is the current collector for the anode 320—comprises copper as an electrically conductive material.

The separator 315 is not particularly limited. The separator 315 can be single ply or multi-ply. The separator 315 can include at least one layer composed of or including one or more polymers. Suitable materials useful for the separator 315 include those known to persons of ordinary skill in the art for use in between battery anodes and cathodes, to provide a barrier between the anode and the cathode while enabling the exchange of lithium ions from one side to the other, such as a membranous barrier or a separator membrane. The separator membrane can be permeable to lithium ions, allowing them to travel from the cathode side to the anode side and back during the charge-discharge cycle. The separator membrane can be impermeable to anode and cathode materials, preventing them from mixing, touching, and shorting the battery. The separator membrane can also serve as an electrical insulator for metal parts of the battery (leads, tabs, metal parts of the enclosure, et cetera) preventing them from touching and shorting.

Illustrative, but non-limiting, examples of suitable materials that can be used as the one or more polymers of the separator 315 include polyolefins, e.g., polypropylene, polyethylene, polyimidazoles, polybenzimidazole (PBI), polyimides, polyamideimides, polyaramids, polysulfones, polyvinylidene fluoride, aromatic polyesters, polyketones, polytetrafluoroethylene (PTFE), and/or blends, mixtures, and combinations thereof. Commercial polymer separators include, for example, the Celgard™ line of separators. In some embodiments, the separator 315 is a thin (about 15-25 μm) polymer membrane (tri-layer composite: polypropylene-polyethylene-polypropylene, commercially available) between two relatively thick (about 20-1000 μm) porous electrode sheets. The thin polymer membrane may be about 15-25 μm thick, such as 15-23, 15-21, 15-20, 15-18, 15-16, 16-25, 16-23, 16-21, 16-20, 16-18, 18-25, 18-23, 18-21, 18-20, 20-25, 20-23, 20-21, 21-25, 21-23, 23-25, 15, 16, 17, 18, 19, 20, 21, 22, 23, 24, or 25 μm thick, or any integer or subrange in between. The two relatively thick porous electrode sheets may each independently be 50-500 μm thick, such as 50-450 μm, 50-400 μm, 50-350 μm, 50-300 μm, 50-250 μm, 50-200 μm, 50-150 μm, 50-100 μm, 50-75 μm, 50-60 μm, 50-55 μm, 55-500 μm, 55-450 μm, 55-400 μm, 55-350 μm, 55-300 μm, 55-250 μm, 55-200 μm, 55-150 μm, 55-100 μm, 55-75 μm, 55-60 μm, 60-500 μm, 60-450 μm, 60-400 μm, 60-350 μm, 60-300 μm, 60-250 μm, 60-200 μm, 60-150 μm, 60-100 μm, 60-75 μm, 75-500 μm, 75-450 μm, 75-400 μm, 75-350 μm, 75-300 μm, 75-250 μm, 75-200 μm, 75-150 μm, 75-100 μm, 100-500 μm, 100-450 μm, 100-400 μm, 100-350 μm, 100-300 μm, 100-250 μm, 100-200 μm, 100-150 μm, 150-500 μm, 150-450 μm, 150-400 μm, 150-350 μm, 150-300 μm, 150-250 μm, 150-200 μm, 200-500 μm, 200-450 μm, 200-400 μm, 200-350 μm, 200-300 μm, 200-250 μm, 250-500 μm, 250-450 μm, 250-400 μm, 250-350 μm, 250-300 μm, 300-500 μm, 300-450 μm, 300-400 μm, 300-350 μm, 350-500 μm, 350-450 μm, 350-400 μm, 400-500 μm, 400-450 μm, 450-500 μm, 50 μm, 55 μm, 60 μm, 75 μm, 100 μm, 150 μm, 200 μm, 250 μm, 300 μm, 350 μm, 400 μm, 450 μm, or 500 μm, or any integer or subrange in between.

Suitable materials useful for separators also include 1,3-dioxolane, 1,3-dimethoxyethane, 1,4-dioxane, and/or 1,2-dimethoxyethane.

The electrolyte is not particularly limited. In some embodiments, the electrolyte can include a liquid electrolyte, a solid electrolyte, a gel electrolyte, a polymer ionic liquid. In at least one embodiment, the gel electrolyte can be any suitable gel electrolyte known in the art. For example, the gel electrolyte can include a polymer and a polymer ionic liquid. For example, the polymer can be a solid graft (block) copolymer electrolyte. In some embodiments, the solid electrolyte can be, for example, an organic solid electrolyte or an inorganic solid electrolyte. Non-limiting examples of the organic solid electrolyte can include polyethylene derivatives, polyethylene oxide derivatives, polypropylene oxide derivatives, phosphoric acid ester polymer, polyester sulfide, polyvinyl alcohol, polyfluoride vinylidene, and polymers including ionic dissociative groups. A combination comprising at least one of the foregoing can also be used.

When a liquid electrolyte is utilized, the liquid electrolyte can be a non-aqueous liquid electrolyte and/or aqueous liquid electrolyte. The non-aqueous liquid electrolyte can include an electrolyte salt and a non-aqueous solvent. The non-aqueous solvent is not particularly limited. Illustrative, but non-limiting, examples include propylene carbonate, ethylene carbonate, vinylene carbonate, dimethyl carbonate, ethyl methyl carbonate, diethyl carbonate, methyl propyl carbonate, isopropyl methyl carbonate, ethyl propionate, methyl propionate, γ-butyrolactone, ethyl acetate, methyl acetate, tetrahydrofuran, 2-methyltetrahydrofuran, ethylene glycol dimethyl ether, ethylene glycol diethyl ether, acetonitrile, dimethyl sulfoxide, diethoxyethane, 1,1-dimethoxyethane, and/or tetraethylene glycol dimethyl ether.

An ionic liquid can be used as the non-aqueous solvent. Examples of ionic liquids can include aliphatic quaternary ammonium salts such as N,N,N-trimethyl-N-propylammonium bis(trifluoromethanesulfonyl)amide, N-methyl-N-propylpiperidinium bis(trifluoromethanesulfonyl)amide, N-methyl-N-propylpyrrolidinium bis(trifluoromethanesulfonyl)amide, N-methyl-N-butylpyrrolidinium bis(trifluoromethanesulfonyl)amide, and N,N-diethyl-N-methyl-N-(2-methoxyethyl)ammonium bis(trifluoromethanesulfonyl) amide; and alkylimidazolium quaternary salts such as 1-methyl-3-ethylimidazolium tetrafluoroborate, 1-methyl-3-ethylimidazolium bis(trifluoromethanesulfonyl)amide, 1-allyl-3-ethylimidazolium bromide, 1-allyl-3-ethylimidazolium tetrafluoroborate, 1-allyl-3-ethylimidazolium bis(trifluoromethanesulfonyl)amide, 1,3-diallylimidazolium bromide, 1,3-diallylimidazolium tetrafluoroborate, and 1,3-diallylimidazolium bis(trifluoromethanesulfonyl)amide.

The electrolyte salt can be soluble in non-aqueous solvents and able to exhibit desired ion conductivity. For example, a metal salt containing a metal ion desired to be conducted, can be used as the electrolyte salt. For example, lithium salts can be used as the electrolyte salt. For example, lithium salts such as $LiPF_6$, $LiBF_4$, $LiClO_4$, $LiAsF_6$, LiOH, LiCl, $LiNO_3$, and/or $Li_2SO_4$; and/or organic lithium salts such as $CH_3CO_2Li$, lithium bis(oxalate)borate (LiBOB), $LiN(CF_3SO_2)_2$ (LiTFSA), $LiN(C_2F_5SO_2)_2$ (LiBETA), and/or $LiN(CF_3SO_2)(C_4F_9SO_2)$ can be utilized.

The content of the electrolyte salt relative to the non-aqueous solvent in the non-aqueous liquid electrolyte is not particularly limited. The content can be appropriately determined depending on the combination of the solvent and the electrolyte salt. The non-aqueous liquid electrolyte may be used in the form of gel by adding a polymer thereto. Examples of methods for gelation of the non-aqueous liquid electrolyte include a method of adding a polymer such as polyethylene oxide (PEO), polyacrylonitrile (PAN), polyvinylidene fluoride (PVDF) or polymethyl methacrylate (PMMA) to the non-aqueous liquid electrolyte.

Examples of the aqueous liquid electrolyte include alkaline aqueous solutions (e.g., potassium hydroxide aqueous solution and/or sodium hydroxide aqueous solution) and acidic aqueous solutions (e.g., hydrochloric acid solution, nitric acid solution, and/or sulfuric acid solution). The aqueous liquid electrolyte can be appropriately selected, depending on, for example, the type of the anode active material.

Solid electrolyte can be utilized. Non-limiting examples of the solid electrolyte include inorganic solid electrolytes such as a solid sulfide electrolyte and/or a solid oxide electrolyte. The inorganic solid electrolyte can be in the form of glass, crystal, and/or glass ceramic. Solid sulfide electrolytes contain sulfur (S) and are ion-conductive. Non-limiting examples of solid sulfide electrolyte materials can include $Li_2S$—$P_2S_5$ ($Li_2S:P_2S_5$=50:50 to 100:0), $Li_2S$—$P_2S_5$—LiI, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (Z=Ge, Zn, Ga), $Li_2S$—$GeS_2$, $Li_2S$—$SiS_2$—$Li_3PO_4$, and/or $Li_2S$—$SiS_2$—$Li_xMO_y$ (M=P, Si, Ge, B, Al, Ga, In). Solid oxide electrolytes include LiPON (lithium phosphorus oxynitride), LiAlTi type (e.g., $Li_{1.3}Al_{0.3}Ti_{0.7}(PO_4)_3$), LaLiTi type (e.g., $La_{0.51}Li_{0.34}TiO_{0.74}$), $Li_3PO_4$, $Li_2SiO_2$, and/or $Li_2SiO_4$.

The following examples are put forth so as to provide those of ordinary skill in the art with a complete disclosure and description of how to make and use embodiments of the present disclosure, and are not intended to limit the scope of embodiments of the present disclosure. Efforts have been made to ensure accuracy with respect to numbers used (e.g. amounts, dimensions, etc.) but some experimental errors and deviations should be accounted for.

EXAMPLES

Characterization

A. Characterization of Carbon Foam and Composites

Specimen (carbon foam or composites) were weighed immediately following fabrication. Product yield is determined by measuring the solid, liquid, and gas mass yields of feedstock pyrolysis products.

Thermal conductivity of the specimen was measured using a heat flow meter (custom built) according to the following procedure: cylindrical specimens were placed between two brass rods. An electrical restive heater applied a known amount of heat to the end of one of the brass rods while the other rod was cooled with ice. Four K-type thermocouples recorded the temperature profile across the brass rod, and from this profile a thermal resistance and thermal conductivity were calculated.

Electrical conductivity of the specimen was measured using a conductivity meter (Fluke 117) and two probes according to the following procedure: silver paste was added to each end of a cylindrical specimen and allowed to dry for 48 hours. Probes were then applied to each end and the resistance of the sample was recorded.

Bulk density of the specimen was calculated by measuring the volume and mass according to the following procedure: Densities of the specimen were determined by measuring diameters and lengths of produced foams with digital calipers and massing foams on a digital microbalance. Four replicates of density are measured for each feedstock and test condition, and average values are reported along with standard deviations.

Ultimate compressive strength of the specimen was measured using an ADMET eXpert 2600 compressive strength tester and a 1,000 N load cell. The specimens were loaded under displacement control mode at a displacement rate of 1 mm/min until failure. Four replicates of compressive strength were measured for each feedstock and test condition. Average values and standard deviations were determined.

Porosity of the specimen was characterized by measuring macro-, meso-, and micro-pores visible under a scanning electron microscope (SEM) producing SEM images (FEI Quanta 250) with an accelerating voltage of 20 kV and a spot size of 5.

Thermogravimetric analysis (TGA) of the specimen was performed using a TA Instruments Q500 TGA. About 10 mg of the specimen was heated in a furnace while the mass of the sample was recorded by a highly sensitive balance. The TGA furnace was set to ramp from about room temperature to about 100° C. at about 20° C./min, then hold at about 100° C. for about 10 min (dehydration step), and then to ramp at about 10° C./min to about 500° C. and hold at this temperature for about 3 hours. During TGA, the furnace was continually purged with nitrogen gas to maintain an inert, non-oxidizing environment.

B. Characterization of Bio-Oils

As described above, the pyrolysis process generates co-products such as bio-oil(s). Bio-oil(s) are weighed immediately following fabrication and are analyzed via GC-MS (Shimadzu QP-2010) to identify major compounds in the pyrolysis oil. GC-MS is useful in illustrating the complexity of compositions in the liquid oil as the pyrolysis temperature and pressure increase. The major peaks are identified by the mass spectrum and assigned to their respective organic compounds.

Example Biomass Materials

Carbon foam fabrication processes described in the examples utilized the following non-limiting biomass materials: corn stover, Lodgepole pine ("pine"), and *Miscanthus giganteus* ("miscanthus"). Each of these biomass materials represent model lignocellulosic biomasses as each exemplifies a major category of biomass: agricultural waste, woody biomass, and energy crop, respectively. Corn stover was harvested from Howell Farms LLC in Morrill, NE; Miscanthus was obtained from Maple River Farms in Owosso, MI; and pine was obtained from The Lodgepole Products Company in Laramie, WY Cellulose (Avicel) was obtained from Sigma-Aldrich, hemicellulose (xylan) was obtained from Peptide Solutions, and Kraft lignin was obtained from Stora Enso. Biomass constituents (cellulose, xylan, and lignin) can be used as received without any particle size reduction or sieving.

The examples herein illustrate the breadth of biomass that can be utilized for forming carbon foams and composite materials. Carbon foam and composite materials formed from lignocellulosic biomasses and the major constituents of lignocellulosic biomasses (hemicellulose, cellulose, and lignin) can aid in understanding feedstock impacts on properties of produced carbon foams.

The biomass was processed into a feedstock as described below. Ultimate and proximate analyses for the lignocellulosic feedstocks—corn stover, miscanthus, and pine—on a dry basis, are presented in Table 1. The lignocellulosic feedstock contained predominantly carbon (C), hydrogen (H), nitrogen (N), and oxygen (O).

TABLE 1

| Feedstock Sample | Corn stover | Miscanthus | Pine |
| --- | --- | --- | --- |
| C, wt % | 45.8 | 49.8 | 50.8 |
| H, wt % | 5.97 | 5.87 | 5.80 |
| N, wt % | 1.12 | 0.40 | 0.41 |
| O, wt % | 37.5 | 41.5 | 41.9 |
| Volatiles, wt % | 83.4 | 80.4 | 80.4 |
| Fixed carbon, wt % | 6.93 | 17.2 | 18.6 |
| Ash, wt % | 9.64 | 2.47 | 1.04 |

Example Pre-Pyrolysis Feedstock Preparation

Prior to pyrolysis, the biomass was processed into a feedstock, e.g., powders, pellets, and particles. Processing can aid in forming carbon foams of varying mechanical integrities depending on, e.g., the desired application. Any suitable method of processing can be used, some of which are described below. Combinations of biomass or feedstock can be utilized.

In some examples, the biomass was processed into a feedstock by grinding or blending the biomass to a feedstock powder with a particle size range of about 0.15 mm to about 0.40 mm. The small particle size of the powder can be favorable for moldability of the carbon foam. After reaching the desired particle size range, about 15 mL to about 25 mL of ground feedstock was loaded into a fine stainless steel mesh packet. The stainless steel mesh packet was then placed in a stainless steel reactor coupled to a backpressure valve, as shown in the apparatus 100 of FIG. 1.

In other examples, the biomass was processed into a feedstock by grinding the biomass to a powder (particle size of about 0.15 mm to about 0.40 mm), and then compressed into feedstock pellets. The compressed mass of the pellets can provide a more suitable form for characterization compared to that of a single particle substance. Pellet formation demonstrated the capability of the feedstock to reform into carbon foam of sufficient mechanical integrity. Following compression, about 15 mL to about 20 mL of ground feedstock formed into pellets was loaded into a fine stainless mesh packet. The stainless steel mesh packet was then placed in a stainless steel reactor coupled to a backpressure valve, as shown in the apparatus 100 of FIG. 1.

In other examples, the biomass was processed into a feedstock by grinding the biomass into feedstock particles having a particle size range of about 149 μm to about 500 μm, and then drying the ground feedstock at a temperature of about 100° C. for about 24 hours. The dried feedstock was then loaded into a die and pressed into feedstock pellets by compressing/compacting at a pressure of about 100,000 psi (~690 MPa). The feedstock pellets were loaded into a fine stainless steel mesh packet, and the stainless steel mesh packet was then placed in a stainless steel reactor coupled to a backpressure valve, as shown in the apparatus 100 of FIG. 1.

In some examples, the biomass was processed into a feedstock by grinding in a Waring MX1200MTX blender for approximately 2 minutes, and then separating the particles by size using a Gilson sieve shaker. The particle size range of about 149 μm to about 500 μm (40-100 US standard mesh) was retained. The particles were then dried at a temperature of about 100° C. for about 24 hours. The ground feedstock was loaded into a 13 mm-diameter pellet die and pressed into pellets at a pressure of approximately 690 MPa. A steel pellet press having an inner diameter of about 13 mm can be utilized; compacting pressures can be between about 50,000 psi (~345 MPa) and about 150,000 psi (~1030 MPa). The resulting pellets were about 60 mm in length and about 5 grams (g) to about 7 g in mass, however pellets having a larger or smaller length, and/or larger or smaller mass may be utilized. The pellets were loaded into a fine stainless steel mesh packet, and the stainless steel mesh packet was then placed in the stainless steel reactor coupled to a backpressure valve, as shown in the apparatus 100 of FIG. 1.

The feedstocks, in the form of particles, powder, loose or compacted pellets, et cetera were examined. Instead of stainless steel mesh, the feedstocks can be wrapped in aluminum foil or by placing the pellets into a glass test tube that is approximately the same inner diameter as the pellet press.

Biomass such as corn stover, Lodgepole pine, miscanthus, esterified coal, bituminous coal, lignin, lignocellulose, xylan (hemicellulose), and/or cellulose (Avicel), were processed into a feedstock by first milling or grinding in a blender to reduce particle size if needed, and then separating the milled or ground feedstock by particle size in a sieve shaker and retaining certain mesh size fractions. Illustrative, but non-limiting, examples of mesh sizes and particle size ranges from which carbon foams and carbon-containing composites were produced are shown in Table 2 as approximate values. Biomass constituents (cellulose, xylan, and lignin) can be used as received without any particle size reduction or sieving if desired.

TABLE 2

| Mesh Size | Particle Size Range |
| --- | --- |
| 16-40 | 0.42-1.19 mm |
| 40-200 | 125-420 μm |
| 200-635 | 20-125 μm |

Example Fabrication of Carbon Foam by Pyrolysis

Embodiments of apparatus 100 were utilized to produce the carbon foam, though other apparatus are contemplated. Co-products such as bio-oils were produced during formation of the carbon foam. Embodiments described herein, and the non-limiting examples, enable production of high-quality foams from biomass feedstocks such as lignocellulosic feedstocks.

Example Pyrolysis Using Supercritical Conditions. Feedstock (formed above) was placed in a stainless steel mesh packet, and the packet was loaded into a 316L stainless steel reactor (e.g., reactor 101). A Pyrex boiling flask (e.g., collection unit 125) was coupled to the reactor via a needle valve (e.g., backpressure valve 122). The Pyrex boiling flask was submerged in a bath that was maintained at a temperature of about −78° C. using an ethanol/dry ice bath. A rotameter (e.g., flow meter 128) was coupled to the Pyrex boiling flask to measure the flow rate of $CO_2$, $N_2$, or other gases being purged.

The reactor was pressurized to supercritical conditions using $CO_2$ and/or $N_2$. For $CO_2$, and as an example, liquid $CO_2$ was drawn from a cylinder and pressurized up to about 10.5 MPa with an air-driven Maximator pump. The $CO_2$ flowed through a section of heated line and into the 316L stainless steel reactor, which has about 19.3 mm in inner diameter and about 305 mm in length. Following pressurization, the reactor was loaded into a tube furnace (e.g., furnace 103). Next, the reactor was heated inside the tube furnace at a heating rate of about 85° C./min until the temperature of the reactor reached a specified temperature (in this example about 500° C. to about 510° C.). The reactor, furnace, and $CO_2$ inlet temperatures were controlled using PID controllers. The temperature of the reactor was then held steady for about 10 min or more.

During this time period, the biomass pyrolysis produced volatile co-products and carbon foam. The carbon foam remained in the reactor 101 while volatile co-products flowed out of the reactor and collected in the Pyrex boiling flask. In this example, the $CO_2$ and condensable species exited the reactor, passing through the needle valve used to regulate flow and maintain backpressure. Condensable species, e.g., bio-oils, were collected in the Pyrex boiling flask cooled at about −78° C. The flask was massed before and after pyrolysis to determine liquid yields. The $CO_2$ finally flows through a rotameter to measure flow rate. The $CO_2$ flow rate was adjusted to about 9 g$CO_2$/min, equivalent to about 5.0 SLPM at 298 K and 0.1 MPa. At the conclusion of the run, the reactor was cooled to about ambient temperature under pressure, and then the reactor was depressurized and the samples were removed from the reactor and massed.

Example Pyrolysis Using Subcritical Conditions. A similar procedure was performed for pyrolysis under subcritical conditions of $CO_2$, $N_2$, and or $H_2O$. In one example, the reactor was pressurized to a pressure of about 4.1 MPa and up to the critical point of the fluid/gas used. At the conclusion of the run, the reactor was cooled to about ambient temperature under pressure, the reactor was depressurized, and the samples were removed from the reactor and massed. Bio-oils were also collected.

Pyrolysis of the feedstock was tested under various parameters, e.g., pressure, temperature, heating rates, hold times of the reactor at the specified temperature, et cetera. Pyrolysis under supercritical conditions was performed at temperature of about 450° C. or more and a pressure of about 10 MPa or more. The temperature/pressure for some examples of pyrolysis using supercritical conditions was about 500° C./about 13.8 MPa; and about 700° C./about 10.3 MPa. Other supercritical conditions were tested and are described herein. Pyrolysis under subcritical conditions was performed under suitable temperature and pressure conditions. The temperature/pressure for some examples of pyrolysis using subcritical conditions was about 500° C./about 6.9 MPa; about 500° C./about 4.1 MPa; and about 500° C./about 2.1 MPa. Other subcritical conditions were tested and are described herein.

Figure 4A:
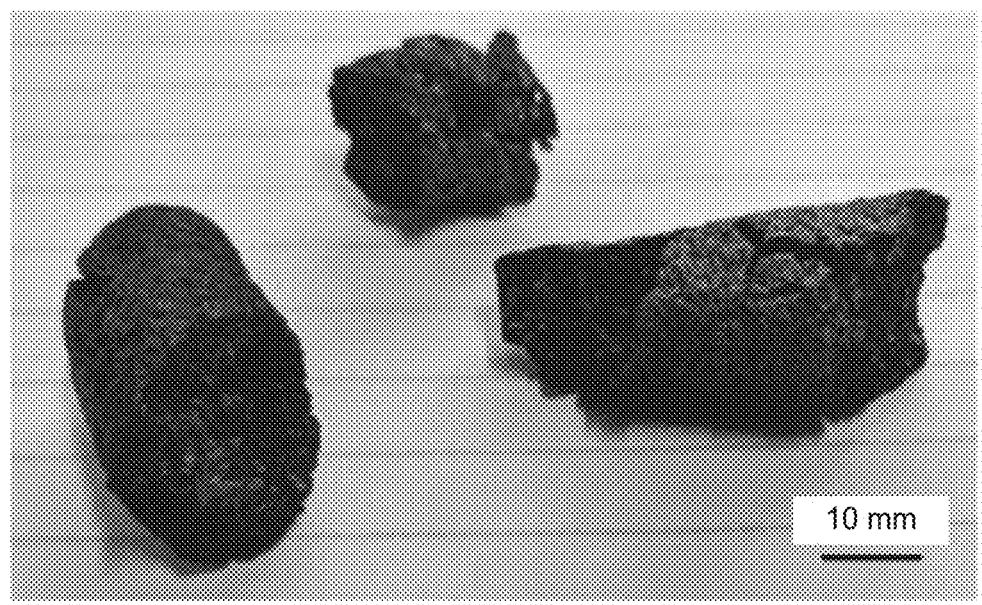
FIG. 4A is an image of example carbon foams produced from milled corn stover powder via supercritical $CO_2$ pyrolysis according to at least one embodiment of the present disclosure.
Figure 4B:
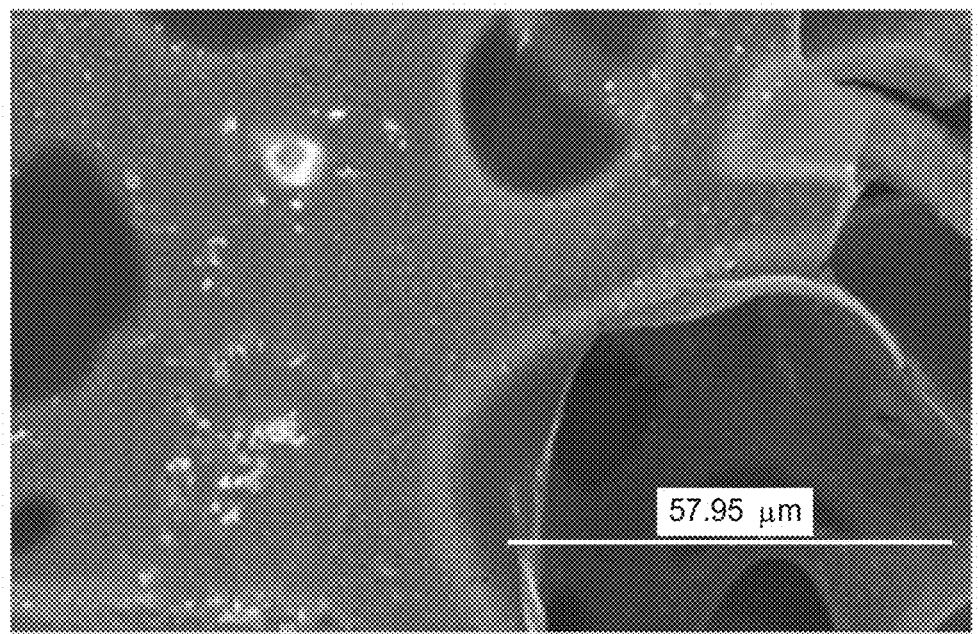
FIG. 4B is an exemplary scanning electron microscopy (SEM) image of the example carbon foam of FIG. 4A according to at least one embodiment of the present disclosure.

FIG. 4A shows images of carbon foam produced from milled corn stover powder via supercritical $CO_2$ pyrolysis. This image demonstrates that during the high pressure pyrolysis process the milled corn stover particles have combined to form a monolithic piece of carbon foam. FIG. 4B is an exemplary scanning electron microscopy (SEM) image of the carbon foam shown in FIG. 4A. This image indicates that corn stover particle have melted to form a uniform carbon matrix with many pores.

The pyrolysis of lignocellulose and cellulose indicated that temperatures between about 200° C. and about 400° C. can cause large transformations to occur. However, temperatures within this range can negatively affect the mechanical integrity of the carbon foam/composite. Example pyrolysis processes were performed at a temperature of about 450° C. or more and a pressure of about 10 MPa or more, such as about 500° C. and about 10.3 MPa. The critical point for $CO_2$ is 31.10° C. and 7.39 MPa and the critical point for $N_2$ is −146.9° C. and 3.39 MPa. Pyrolysis tests (temperature/pressure) conducted at about 700° C./about 10.3 MPa and about 500° C./about 13.8 MPa, which are each supercritical conditions for both $CO_2$ and $N_2$, showed similar results to the pyrolysis tests at about 500° C./about 10.3 MPa tests.

Subcritical conditions for the pyrolysis were also performed using $CO_2$. Here, pyrolysis tests (temperature/pressure) performed at about 500° C./about 6.9 MPa, produced foams exhibiting similar characteristics to the foams produced at about 500° C./about 10.3 MPa (supercritical tests). However, lower-pressure pyrolysis tests conducted at about 500° C./about 4.1 MPa and about 500° C./about 2.1 MPa (both of which are subcritical conditions) can result in poor quality, structurally weak foams. These results suggested that higher pressures can be utilized for high-quality carbon foam or composite production.

Hold times of the reactor at the aforementioned maximum processing temperatures were analyzed to assess, e.g., its impact on the quality of carbon foams and bio-oils. Hold times—where the reactor is held isothermal at a specified temperature—of about 15 minutes, about 45 minutes, about 1 hour, and about 3 hours were examined. Very little, or no, difference in the composition of the carbon foam was observed. This result indicated that that carbon foam/composite fabrication according to the embodiments described herein can be at least partially indifferent to hold time at a specified processing temperature.

Heating rates for pyrolysis were also examined to determine, e.g., its impact on the resulting foam characteristics such as bulk density and ultimate compressive strength. Individual tests were conducted at various heating rates— about 1° C./min, about 5° C./min, about 10° C./min, about 80° C./min, about 100° C./min, and about 120° C./min. It was determined that heating rates at 10° C./min or lower can result in poor quality and structurally weak foams having a tendency to crumble. Additionally, individual feedstock particles that had not been converted to foam were visible. In contrast, heating rates of about 80° C./min or more produced more uniform forms with significantly greater mechanical integrity such as density and ultimate compressive strength. This result may be due to the higher heating rates increasing the velocity of expanding spherical gas bubbles as well as affecting pore homogeneity. That is, the increased bulk density and ultimate compressive strength of foams may be partially the result of elevated heating rates, which can decrease the pore size of the carbon foams. Overall, these results indicate that carbon foams and composites can be achieved with varying porosity, mechanical properties, and/or morphological characteristics.

Bulk electrical resistivities of the carbon foams were measured. In some examples, the bulk electrical resistivities of the carbon foams were measured to be $\geq 3 \cdot 10^5$ $\Omega \cdot m$. Such values indicated that the carbon foams can be electrically insulating. A post-pyrolysis heat treatment of the carbon foams at 860° C. for 15 min in either $N_2$ or $CO_2$ decreased the bulk electrical resistivity to $10^{-2}$ $\Omega \cdot m$. For comparison, the bulk electrical resistivity of graphite varied from $10^{-6}$ to $10^{-3}$ $\Omega \cdot m$. The results indicate that the carbon foam is sufficiently electrically conductive to be used in electrode applications (e.g., a battery or other energy storage devices).

Example Sulfur-Carbon Composite

An example sulfur-carbon composite/foam was formed by the following procedure. A sulfur source (sulfur powder) and lignin were mixed at a mass ratio of about 50:50 by adding each component to a beaker and stirring. Alternatively, the components may be mixed by other methods such as a blender or a ball or hammer mill. The sulfur/lignin mixture was pressed into pellets at approximately 100,000 psi and the pellets were placed in glass test tubes. The glass tubes were then placed in a 316L stainless steel reactor. The reactor was pressurized to about 1,500 psi (~10.3 MPa) with $CO_2$ and heated at a heating rate of about 10° C./min to a maximum temperature of about 500° C. The reactor was then cooled and depressurized. Produced sulfur-carbon composites were removed from the reactor and massed.

Based on the solid yield of pure lignin when subjected to the foaming process (about 60 wt %), the final sulfur content of the composite/foam was calculated to be about 62 wt %. The produced composite/foam was enriched in sulfur compared to the 50:50 blend of lignin/sulfur precursor feedstock because a greater mass of lignin was lost during the foaming process compared to the mass of sulfur lost.

If desired, unencapsulated sulfur (sulfur not in the pores and/or the matrix) can be removed via a post-pyrolysis heat treatment. Sulfur readily evaporates at elevated temperatures. For example, at about 900° C., sulfur's vapor pressure reaches approximately 1,158 psia. Accordingly, and in some examples, the sulfur-carbon composite was subjected to a post-pyrolysis heat treatment at a temperature of 860° C. Such a post-pyrolysis heat treatment can eliminate the use of solvent-washing steps used in conventional sulfur-carbon matrix production processes.

Figure 4C:
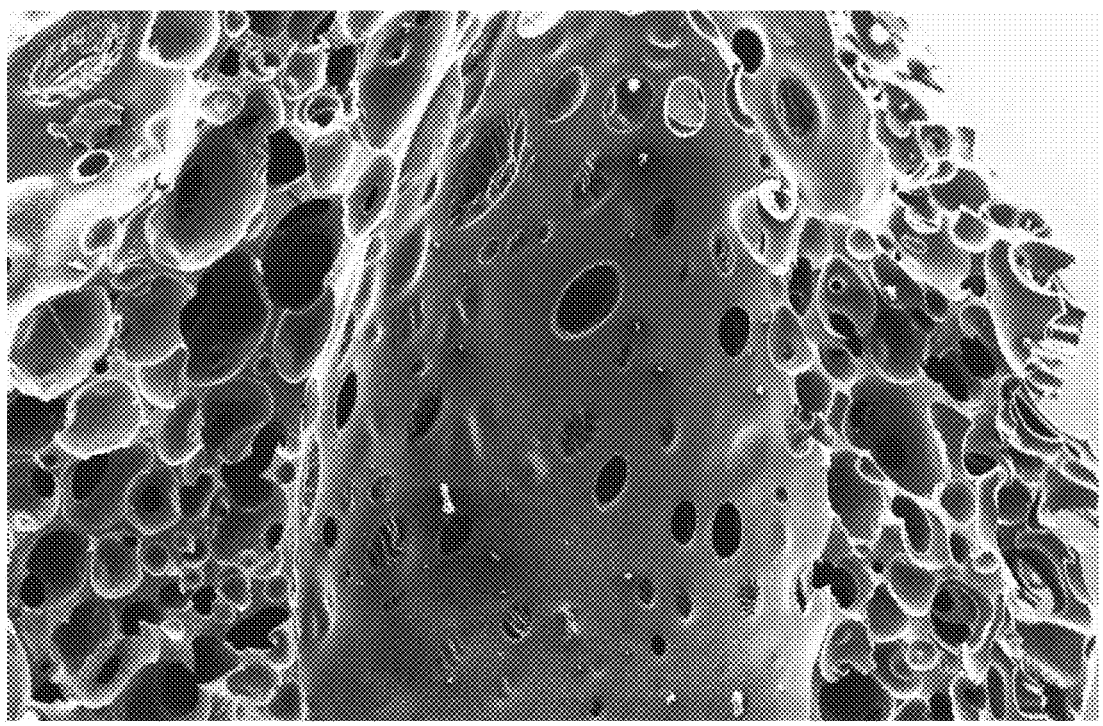
FIG. 4C is an exemplary SEM image of an example sulfur-carbon composite—a carbon foam loaded with about 62% sulfur by mass—according to at least one embodiment of the present disclosure.
Figure 4D:
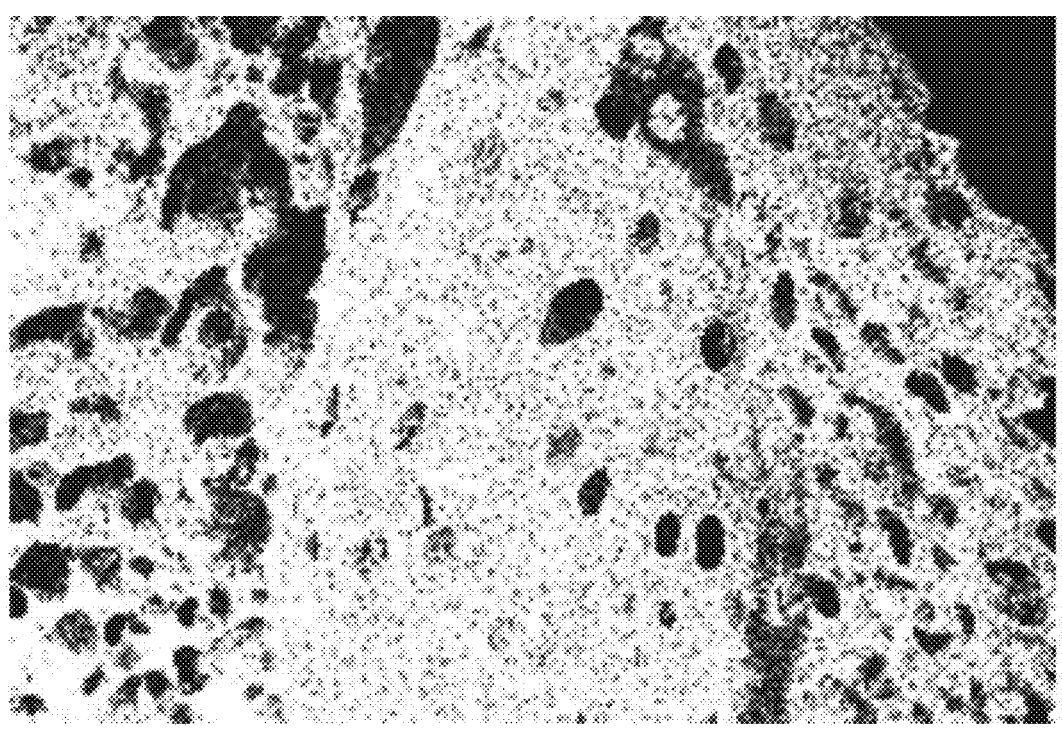
FIG. 4D is an exemplary energy dispersive X-ray (EDX) map showing the sulfur content of the example sulfur-carbon composite of FIG. 4C according to at least one embodiment of the present disclosure.
Figure 4E:
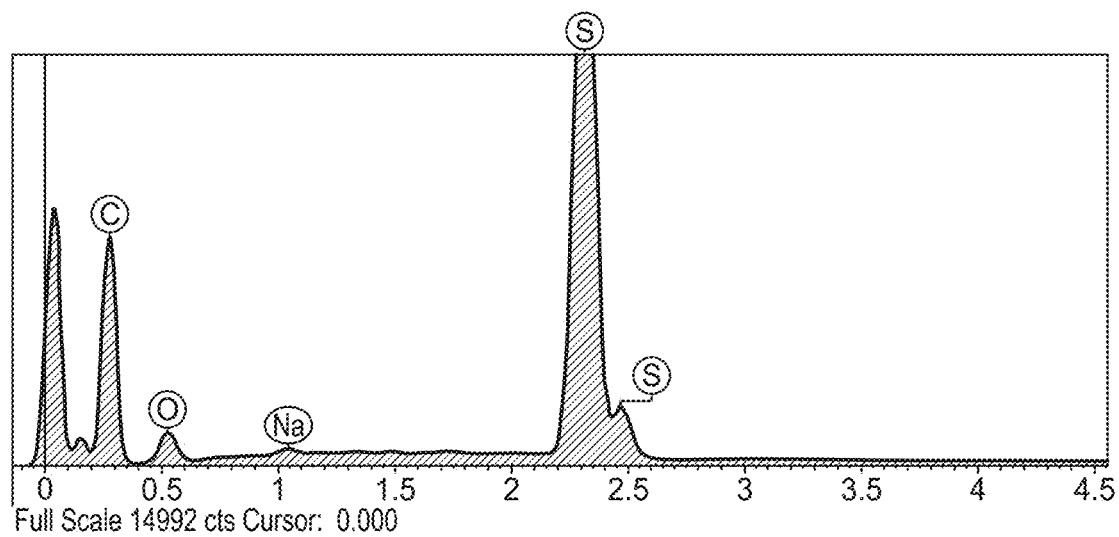
FIG. 4E is an exemplary EDX plot of the example sulfur-carbon composite of FIG. 4C according to at least one embodiment of the present disclosure.

This example procedure results in a sulfur-carbon composite which can also be referred to as a sulfur-doped carbon foam. As described above, the sulfur-carbon composite can be characterized as having a first component that includes a carbon foam and a second component comprising sulfur particles. The composition of the sulfur-carbon composite was investigated using SEM and EDX. FIG. 4C is an exemplary SEM image of the example sulfur-carbon composite, and specifically, a lignin-derived derived carbon foam loaded with about 62% sulfur by mass. FIG. 4D is an EDX map showing the sulfur content of the carbon foam/composite of FIG. 4C. Each pixel in the EDX map of FIG. 4D is mapped to the sulfur content of that point with brighter (white) pixels illustrating a higher sulfur concentration. FIG. 4E is an EDX plot of the example sulfur-carbon composite of FIG. 4C and the peaks between about 2.2 and about 2.5 keV correspond to sulfur. The results of the SEM and EDX analysis indicate that the sulfur-carbon composites can have high sulfur loading and uniform dispersion/distribution of sulfur particles at micron scales.

Figure 5:
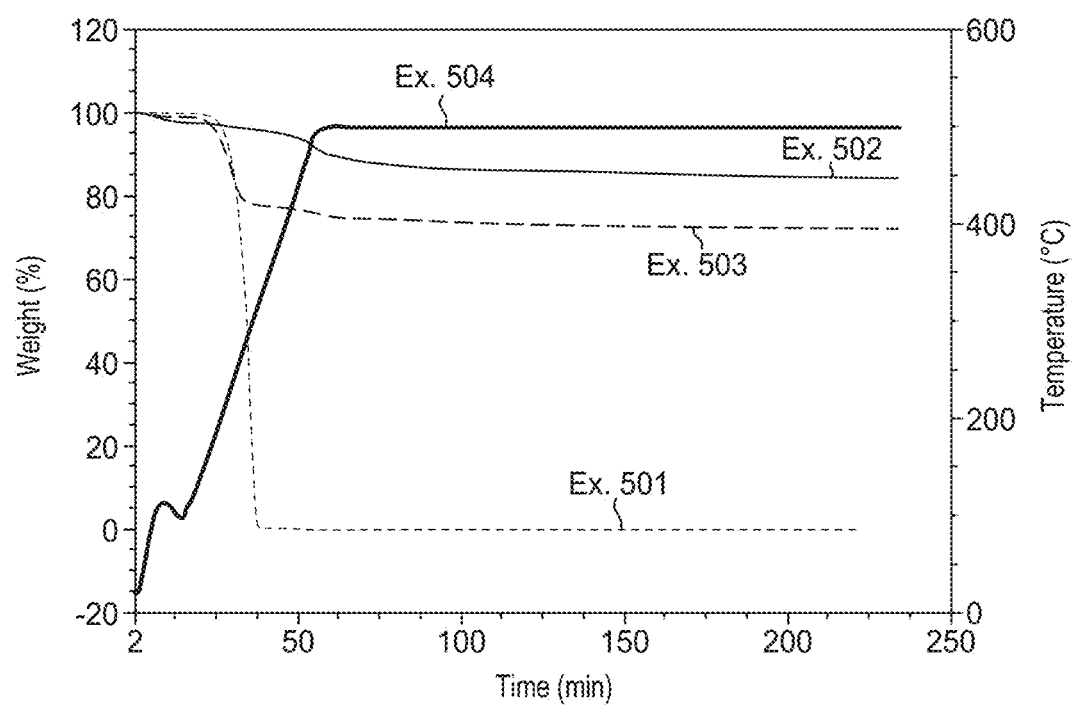
FIG. 5 is an exemplary thermogravimetric analysis (TGA) plot of pure sulfur, an example carbon foam, and an example sulfur-carbon composite with about 62% sulfur by mass according to at least one embodiment of the present disclosure.

TGA was used to confirm the closed cell nature of sulfur-carbon composites and results are shown in FIG. 5. Three different samples were subject to TGA: pure sulfur (Ex. 501), an example undoped lignin-derived carbon foam (Ex. 502), and an example sulfur-doped lignin-derived carbon foam with about 62 wt % sulfur loading (Ex. 503). The example sulfur-doped lignin-derived carbon foam is the sulfur-carbon composite made above. The temperature profile of the TGA furnace is also shown as Ex. 504. In FIG. 5, temperature profiles correspond to the right axis and mass loss profiles to the left axis.

The TGA curve of pure sulfur (Ex. 501) illustrated a large mass loss at about 300° C. All of the sulfur volatilized at a temperature of about 500° C. as indicated by the sulfur mass reaching about 0%. The TGA curve for the undoped lignin-derived carbon foam (Ex. 502) illustrated that this foam retained about 85% of its initial mass by the end of the test. During foam production, the high pressure (about 1,500 psi) is believed to inhibit volatilization of higher molecular weight products at about 500° C. In the TGA furnace, however, these higher molecular weight products can volatilize at about 500° C. at about ambient pressure and are believed to be responsible for the observed mass loss of about 15%.

The TGA curve for the lignin-derived carbon foam with about 62 wt % sulfur loading (Ex. 503) showed that the foam lost about 28% of its initial mass with a final mass retention of about 72%. Based on these mass losses it is believed that, after treatment in the TGA at about 500° C., the sulfur-loaded foam lost about 36% of the sulfur initially in the composite. Accordingly, the results indicated that about 64% of the sulfur is encapsulated in closed cells in the carbon foam. Knowing that the vapor pressure of sulfur at 500° C. is about 2.05 atm, a post-pyrolysis heat treatment at this temperature can be performed to remove non-encapsulated sulfur. The results also indicated that a heat-treated sulfur-carbon composite can be produced having a composition of about 55 wt % sulfur and about 45 wt % carbon foam, though other amounts of sulfur and carbon are contemplated.

Example Sulfur-Carbon Composite Cathode

A sulfur-carbon composite cathode was formed by the following procedure. The sulfur-carbon composite, made according to the procedure shown above, was ground and sieved into particles. The particles were washed with solvent (carbon disulfide) and/or heated-treated at about 800° C. The resulting material was mixed with carbon black and poly (vinylidene fluoride) in a ratio of 8:1:1 sulfur-carbon composite:carbon black:poly(vinylidene fluoride) to form a cathode. The cathode was then cast onto a metallic current collector such as aluminum foil.

The sulfur-carbon composite electrodes are believed to exhibit a cathode capacity of greater than or equal to about 600 mAh g$^{-1}$ and a less than 20% capacity loss at 400 cycles at a charge voltage of 2.8 V and a discharge voltage of 1.7 V at a moderate cycling rate of C/5. The aforementioned battery performance characteristics are enabled by utilization of the carbon foams described herein to provide structurally robust composite anodes that minimize the probability of electrode destruction. Specifically, the carbon foams described herein provide structural support and closed cells for sulfur to maintain electrode integrity and battery function.

Parametric Testing of Various Biomasses

Detailed parametric testing was performed to identify operational parameters for the pyrolysis process to produce high-quality carbon foams from lignocellulosic biomass. The biomass samples tested were lignocellulose, corn stover, Lodgepole pine (pine wood or pine), *Miscanthus giganteus* ("miscanthus"), xylan (hemicellulose), Avicel (cellulose), and lignin.

A summary of experimental details for the parametric testing are shown in Table 3. FIGS. 6A-6D, further discussed below, shows characteristic temperature profiles of the furnace and the individual feedstock samples during pyrolysis. The effects of pressure on pyrolysis and the resulting carbon foam were examined by the pressure sweep tests (Examples 611-614) of pyrolyzing a corn stover feedstock wrapped in aluminum foil (Foil). The corn stover feedstock was pyrolyzed at pressures of about 0.1 MPa (ambient pressure), about 3.5 MPa, about 7.0 MPa, and about 10.5 MPa. The effects of the type of biomass (Examples 621-623) on pyrolysis and the resulting carbon foam was examined by pyrolyzing three different biomasses—corn stover, miscanthus, and pine in glass test tubes (TT). Lastly, the impact of the specific biomass constituent (Examples 631-633) on pyrolysis and the resulting carbon foam was examined by pyrolyzing three biomass constituents—cellulose, xylan, and lignin. All pyrolysis tests were performed at a maximum temperature of about 510° C. All pyrolysis tests were performed in duplicate.

TABLE 3

|  | Example No. | Feedstock | Containment | Pressure, MPa | Maximum Temperature, ° C. |
|---|---|---|---|---|---|
| Full profile | Ex. 602 | Corn stover | Foil | 10.5 | 510 |
|  | Ex. 611 | Corn stover | Foil | 0.1 | 510 |
| Pressure | Ex. 612 | Corn stover | Foil | 3.5 | 510 |
| Sweep | Ex. 613 | Corn stover | Foil | 7.0 | 510 |
|  | Ex. 614 | Corn stover | Foil | 10.5 | 510 |
|  | Ex. 621 | Corn stover | TT | 10.5 | 510 |
| Biomass | Ex. 622 | Miscanthus | TT | 10.5 | 510 |
|  | Ex. 623 | Pine | TT | 10.5 | 510 |
|  | Ex. 631 | Lignin | TT | 10.5 | 510 |
| Biomass | Ex. 632 | Xylan | TT | 10.5 | 510 |
| Constituents | Ex. 633 | Cellulose | TT | 10.5 | 510 |

Detailed procedures for parametric testing are as follows. Each biomass sample was processed into a feedstock by grinding in a blender followed by separation in a sieve shaker. The particle size fraction of 149 µm to 500 µm (40-100 US standard mesh) was retained. The particles were then dried at 100° C. for 24 hours and then pressed into feedstock pellets at a pressure of approximately 690 MPa using a steel pellet press having an inner diameter of about 13 mm. For each feedstock sample, about 4 pellets were loaded into the 316L stainless steel reactor. The feedstock samples tested were about 6 g in mass. Prior to loading into the reactor, the 4 pellets were either wrapped in aluminum or placed in a glass test tube. The foil can serve to prevent produced foams from adhering to the reactor walls. It was found that certain feedstocks such as pine, xylan, and lignin can melt and flow out of the foil wrapping during heating and pyrolysis. In such cases the glass test tubes can be used to prevent the flow of liquefied products from clogging reactor tubing as the liquid products would pool in the bottom of the test tubes. Pellet temperature during pyrolysis was monitored by drilling a ~3.2 mm hole axially into one of the 4 pellets that were loaded into the reactor and inserting a 3.2 mm K-type thermocouple into that pellet. The thermocouple maintains direct contact with the feedstock throughout the pyrolysis process and as the foam is produced. The K-type thermocouple embedded inside of the feedstock pellets accurately measures sample temperatures during pyrolysis.

Each feedstock was pyrolyzed at pressures ranging from about 0.1 MPa (ambient) to about 10.5 MPa, and heated to at maximum temperature of about 510° C. Here, the reactor was pressurized at a desired pressure and the flow rate of $CO_2$ was adjusted to about 9 g$CO_2$/min, equivalent to about 5.0 SLPM at 298 K and 0.1 MPa. The furnace and heated $CO_2$ line are ramped from ambient temperature to about 510° C. at about 10° C./min and held isothermal for about 10 min. The furnace and sample temperatures are recorded at ~1 Hz during the pyrolysis. At the conclusion of each run, the reactor is cooled to ambient temperature under pressure, and then the reactor is depressurized and the samples are removed and massed. Foams formed within the glass test tubes were retrieved by shattering the glass test tubes. All tests were conducted in duplicate.

Feedstock temperature profiles were monitored during pyrolysis using the K-type thermocouple embedded inside of the feedstock pellets as described above. The furnace temperature was also measured using a K-Type thermocouple external to the reactor. FIGS. 6A-6D show exemplary temperature profile data during pyrolysis of the different feedstocks under the conditions shown in Table 3. The temperature profiles are abbreviated in FIGS. 6B, 6C, and 6D to show the experimental time of about 25 to about 50 minutes to highlight the location and features of the exothermic pyrolysis events.

Figure 6A:
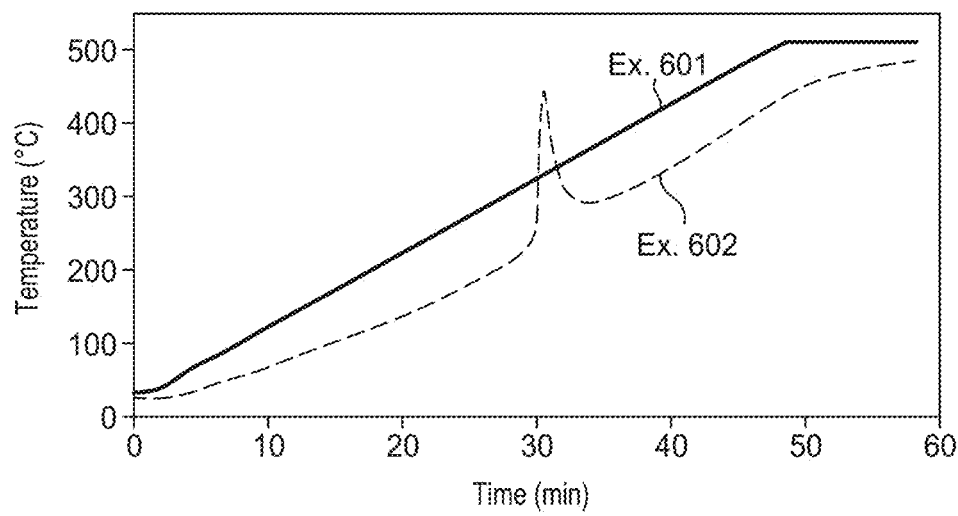
FIG. 6A shows exemplary data of the full temperature profile of corn stover pyrolyzed at a pressure of about 10.5 MPa according to at least one embodiment of the present disclosure.
Figure 6B:
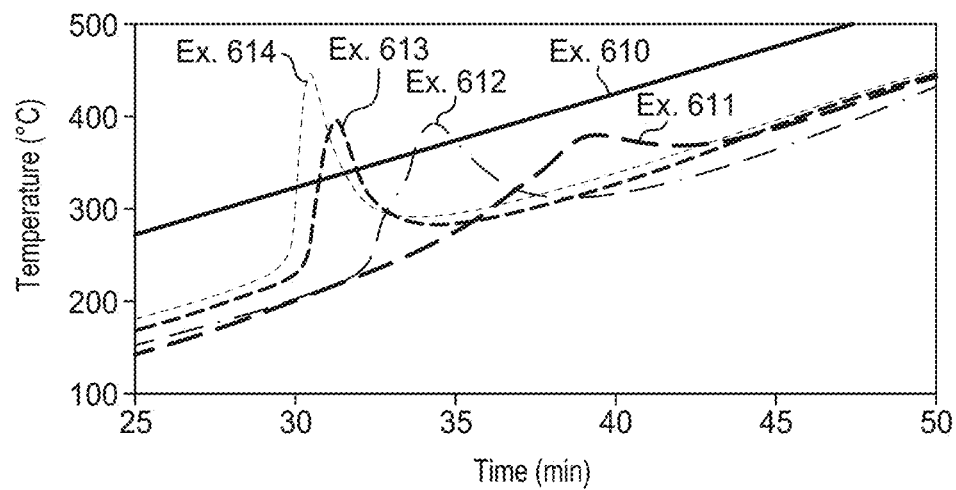
FIG. 6B shows exemplary data of the temperature profiles of corn stover contained in foil and pyrolyzed at pressures of about 0.1 MPa, about 3.5 MPa, about 7.0 MPa, and about 10.5 MPa, and the stainless steel reactor used during pyrolysis according to at least one embodiment of the present disclosure.

Specifically, FIG. 6A shows exemplary data of full temperature profiles characteristic of furnace (Ex. 601) and corn stover pellets pyrolyzed at about 10.5 MPa (Ex. 602). FIG. 6B shows exemplary data for the temperature profiles of the furnace (Ex. 610) and corn stover pellets pyrolyzed at about 0.1 MPa (Ex. 611), about 3.5 MPa (Ex. 612), about 7.0 MPa (Ex. 613), and about 10.5 MPa (Ex. 614). As the furnace was heated at a heating rate of about 10° C./min, the temperatures of the feedstock samples lagged behind the furnace temperature. While not wishing to be bound by theory, it is believed that this difference is due to the relatively low thermal conductivities of the thick-walled stainless steel reactor, the working fluid inside the reactor, and the feedstocks themselves. For example, at a time of about 25 minutes into the pyrolysis run, the furnace temperature had reached about 275° C., while the feedstock temperature ranged from about 144° C. (at about 0.1 MPa, Ex. 611) to about 182° C. (at about 10.5 MPa, Ex. 614). The results indicated that feedstock temperature varied with pressure at a given time, with ambient pressure samples (Ex. 611) lagging the most behind the furnace temperature and the temperature difference decreasing at progressively higher pressures. While not wishing to be bound by theory, this pressure dependence may be attributed to the density of the $CO_2$ which increases from about $1.1 \times 10^{-3}$ g/mL to about 0.13 g/mL as the pressure increases from about 0.1 MPa to about 10.5 MPa at about 200° C. Further, higher $CO_2$ densities may facilitate greater heat transfer within the reactor and thus result in increased feedstock temperatures. Despite the temperature lag, all feedstocks were heated at a heating rate of about 10° C./min corresponding to the heating rate at which the furnace was heated.

Temperature spikes were observed for all feedstock samples, with temperature peaks occurring between about 30 minutes and about 40 minutes. The temperature spikes also coincided with the collection of bio-oils in the collection flask, which may indicate that that significant pyrolysis occurred during these intervals. Using a definition of spike onset to be the point where the heating rate of the feedstock sample is twice that of the furnace, at about 0.33° C./s for the samples, the corn stover pyrolyzed at pressures greater than ambient pressure showed temperature spikes beginning in the range of about 226° C. to about 230° C. In contrast to the sharp temperature spikes observed at the elevated pressures, corn stover pyrolyzed at ambient pressure (Ex. 611) showed a more gradual temperature increase. It is believed that using the above definition of spike onset, the initiation temperature is about 276° C., although acceleration of sample heating can be observed at lower temperatures.

In addition, the magnitude of the temperature peak increased with higher pyrolysis pressures, increasing from about 61° C. (at about 0.1 MPa, Ex. 611) to about 206° C. (at about 10.5 MPa Ex. 614). Further, it was determined that the rate of temperature increase varied with pyrolysis pressure. For example, the corn stover pyrolyzed at about 0.1 MPa (Ex. 611) showed a maximum temperature gradient of about 0.6° C./s during the temperature spike, while the corn stover pyrolyzed at about 10.5 MPa (Ex. 614) produced a maximum temperature gradient of about 14° C./s. These results may indicate that, under the conditions examined in this study, the pyrolysis of corn stover is significantly exothermic once a temperature of approximately 226° C. to 230° C. was reached, and is increasingly exothermic as the pyrolysis pressure is increased. For comparison, the heat of pyrolysis for lignocellulosic biomass have been shown to vary from endothermic to exothermic depending on, e.g., the feedstock, moisture content, gas environment, flow rate, heating rate, temperature, and analytical techniques employed for measurement.

Figure 6C:
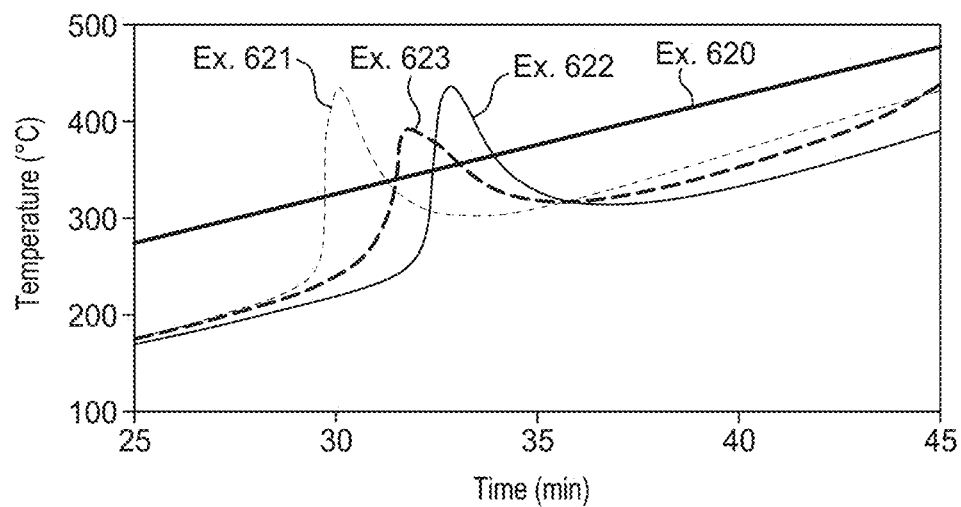
FIG. 6C shows exemplary data of the temperature profiles of example feedstocks—corn stover, Lodgepole pine, and *Miscanthus giganteus*—contained in test tubes and pyrolyzed at about 10.5 MPa according to at least one embodiment of the present disclosure.

FIG. 6C shows exemplary data of the temperature profiles of various feedstock samples—corn stover (Ex. 621), miscanthus (Ex. 622), and pine (Ex. 623)—pyrolyzed at about 10.5 MPa, with a maximum temperature of about 510° C. Each of the feedstock samples were pyrolyzed in glass test tubes. The temperature profile of the furnace is shown as Ex. 620. All three feedstocks samples showed a similar temperature spike behavior as that observed for corn stover pyrolysis during pressure variation testing (FIG. 6B). The data indicated that the temperature spike initiated at approximately 226° C. for corn stover and about 238° C. for pine and miscanthus, with the latter occurring at different times due to slightly different sample temperature gradients. Corn stover (Ex. 621) showed a maximum gradient of 17° C./s during the temperature spike, while miscanthus (Ex. 622) and pine (Ex. 623) showed maximum gradients of about 9° C./s and about 10° C./s, respectively.

The results also showed that pyrolysis can be affected by the containment of the feedstock sample. For example, the pyrolysis of corn stover in test tubes showed a slightly higher maximum gradient of about 17° C./s (Ex. 621) than the maximum gradient of about 14° C./s (Ex. 614) observed for the pyrolysis of corn stover contained in foil. While not wishing to be bound by theory, it is believed that the different temperature gradients are due to the relatively insulating nature of the glass test tube versus the more thermally conductive nature of the thin aluminum foil. While the maximum gradient was slightly higher for test tube containment, the temperature profiles were otherwise similar between the aluminum foil and test tube conditions.

Figure 6D:
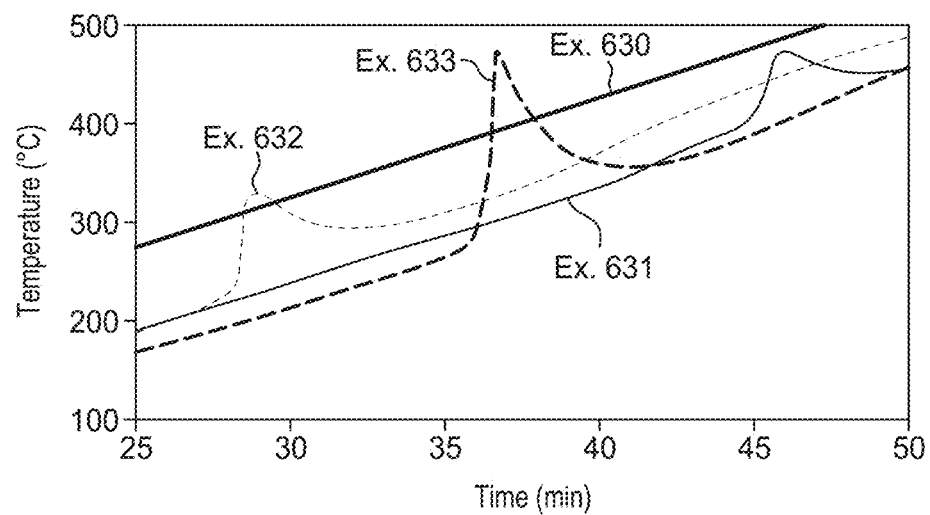
FIG. 6D shows exemplary data of the temperature profiles of example biomass constituents—lignin, xylan, and cellulose—contained in test tubes and pyrolyzed at about 10.5 MPa according to at least one embodiment of the present disclosure.

FIG. 6D shows exemplary data of the temperature profiles of various biomass constituents—lignin (Ex. 631), xylan (Ex. 632), and cellulose (Ex. 633)—pyrolyzed at about 10.5 MPa with a maximum temperature of about 510° C. Each of the biomass constituents were pyrolyzed in glass test tubes. The temperature profile of the furnace is shown as Ex. 630. The results of FIG. 6D showed that all of the three biomass constituents had a temperature spike associated with pyrolysis, though the onset temperatures varied. The temperature spike onsets for xylan (Ex. 632), cellulose (Ex. 633), and lignin (Ex. 631) were about 230° C., about 280° C. (Ex. 633), and about 400° C., respectively. The early temperature spike onset of xylan, beginning at about 230° C., corresponded to the onset of the temperature spiking for lignocellulosic biomasses at about the same temperature (FIG. 6C). The early temperature spike onset may suggest that the pyrolysis of hemicellulose (xylan) initiates a series of exothermic reactions in lignocellulose, raising the temperature of the feedstock which then leads to pyrolysis of the cellulose and lignin fractions of the feedstock. For comparison, the ambient pressure pyrolysis of xylan and cellulose has shown an onset of mass loss at about 230° C. and about 310° C., respectively, and these temperatures correspond reasonably well with those observed here at a pyrolysis pressure of about 10.5 MPa. Lignin does not have a well-defined mass loss event during ambient pressure pyrolysis, instead slowly pyrolyzing over a temperature range of approximately 200-900° C. At elevated pyrolysis pressures (e.g., at about 10.5 MPa), however, lignin demonstrated a significant and discrete temperature spike during pyrolysis (Ex. 631).

Overall, FIGS. 6B-6D indicate that temperature spikes were observed for all feedstock samples. The temperature profiles, shown in FIGS. 6A-6D, indicate exothermic pyrolysis at all tested conditions, suggesting that pyrolysis becomes increasingly exothermic as pressure is increased. Taken together with the observed liquefaction and porous structure that results from pyrolysis, it is believed that the formation of carbon foam and exothermicity can be attributed to the devotalilization process under elevated pressures. It is believed that feedstock samples tested generated sufficient heat to produce the thermal runaways evidenced by the temperature spikes in FIGS. 6A-6D. The prescribed heating rate was about 10° C./min and the feedstock samples experienced heating rates of up to about 17° C./s during exothermic temperature spikes.

SEM was utilized to, e.g., assess the impact of varying pyrolysis pressures on the resulting solid pyrolysis products. FIGS. 7A-7H show a series of exemplary SEM images of example biochar or carbon foams produced from the pyrolysis of corn stover at varying pyrolysis pressures of about 0.1 MPa (ambient) (FIGS. 7A and 7B), about 3.5 MPa (FIGS. 7C and 7D), about 7.0 MPa (FIGS. 7E and 7F), and about 10.5 MPa (FIGS. 7G and 7H). The SEM images were taken at two magnification levels-1 mm magnification for FIGS. 7A, 7C, 7E, and 7G; and 100 μm magnification for FIGS. 7B, 7D, 7F, and 7H. For these biochar or carbon foams shown in FIGS. 7A-7H, the corn stover biomass was formed into a feedstock, wrapped in foil, and pyrolyzed under similar conditions as Ex. 611-614.

The pyrolysis of corn stover at about ambient pressure resulted in biochar production characterized by biomass fibers readily visible in the SEM images of FIGS. 7A and 7B. When the pyrolysis pressure was increased to about 3.5 MPa, a visibly different structure was produced as shown in FIGS. 7C and 7D. Here, the structure had few distinguishable biomass fibers and the majority of the solid includes a smooth carbon matrix with interspaced voids. When the corn stover was pyrolyzed at about 7.0 MPa, no biomass fibers were observed in the carbon matrix (FIGS. 7E and 7F). A few pores were visible in the carbon matrix produced at about 7.0 MPa, although much of the matrix was composed of walls of apparently destroyed pores. When corn stover was pyrolyzed at about 10.5 MPa, the majority of the structure was composed of intact pores with diameters of approximately 50-100 μm (FIGS. 7G and 7H). The SEM images shown in FIGS. 7A-7H indicated that carbon foam, visibly distinguished from biochar by a monolithic and porous structure, was produced from pyrolysis of corn stover at all pressures greater than about 0.1 MPa (ambient).

To evaluate whether the measured temperature spikes corresponds with foam formation during pyrolysis at pressures where foam production occurs, corn stover pyrolysis experiments were conducted at about 10.5 MPa with early termination prior to and following the temperature spike. In one example, the reactor was immediately removed from the furnace following the sample temperature spike and cooled to room temperature. In another example, the reactor was removed prior to the temperature spike, with the sample reaching a maximum temperature of 200° C. Carbon foam was produced when the reactor was removed following the temperature spike, but carbon foam was not produced when the reactor was removed prior to the temperature spike. Thus, it is believed that foam formation occurs during or concurrently with temperature spikes measured during pyrolysis (FIG. 6B).

Figure 8A:
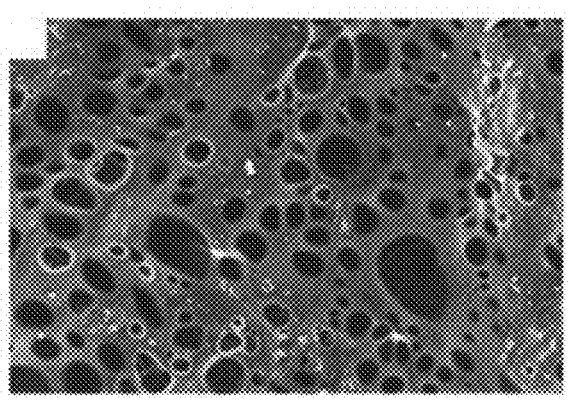
FIG. 8A is an exemplary SEM image of an example carbon foam produced from the pyrolysis of corn stover in glass test tubes at about 10.5 MPa according to at least one embodiment of the present disclosure.
Figure 8B:
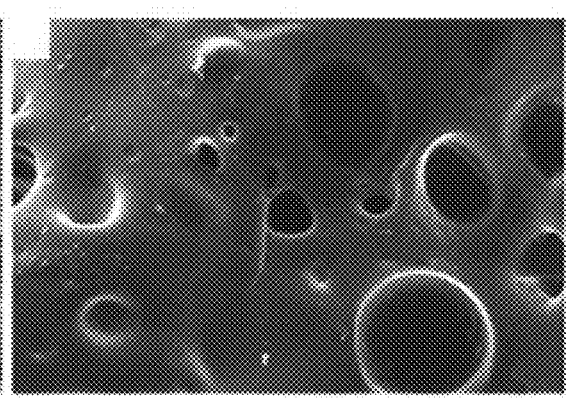
FIG. 8B is an exemplary SEM image of an example carbon foam produced from the pyrolysis of *Miscanthus giganteus* in glass test tubes at about 10.5 MPa according to at least one embodiment of the present disclosure.
Figure 8C:
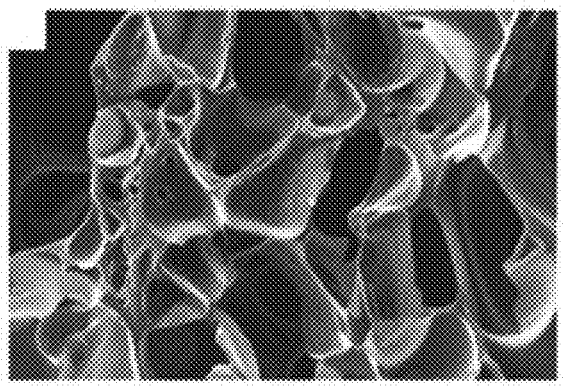
FIG. 8C is an exemplary SEM image of an example carbon foam produced from the pyrolysis of Lodgepole pine in glass test tubes at about 10.5 MPa according to at least one embodiment of the present disclosure.

FIGS. 8A, 8B, and 8C show exemplary SEM images of example carbon foams produced from the pyrolysis of corn stover, miscanthus, and pine, respectively, pyrolyzed at about 10.5 MPa in glass test tubes. For these carbon foams shown in FIGS. 8A-8C, the corn stover, miscanthus, and pine were formed into a feedstock, placed in glass test tubes, and pyrolyzed under similar conditions as Ex. 621-623.

The SEM images show that pyrolysis of each of the feedstocks resulted in production of carbon foam, though the carbon foams had differing morphologies. The corn stover pyrolyzed in glass test tubes (FIG. 8A) and the corn stover pyrolyzed in foil (FIGS. 7A-7H) both produced highly porous carbon foams with many pores in the ~50-100 μm range, although the carbon foam produced in the glass test tubes showed a larger fraction of the carbon foam having a solid carbon matrix with correspondingly fewer pores. The SEM image of FIG. 8B indicated that the pyrolysis of miscanthus, placed in glass test tubes and at a pyrolysis pressure of about 10.5 MPa, produced carbon foams having significantly fewer pores than those carbon foams produced from corn stover. The SEM image of FIG. 8C indicated that the pyrolysis of Lodgepole pine (pine), placed in glass test tubes and at a pyrolysis pressure of about 10.5 MPa, produced carbon foams having a distinct morphology with irregularly shaped cells.

Figure 8D:
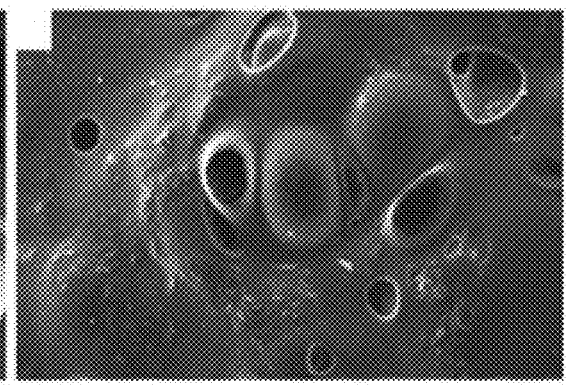
FIG. 8D is an exemplary SEM image of an example carbon foam produced from the pyrolysis of xylan in glass test tubes at about 10.5 MPa according to at least one embodiment of the present disclosure.
Figure 8E:
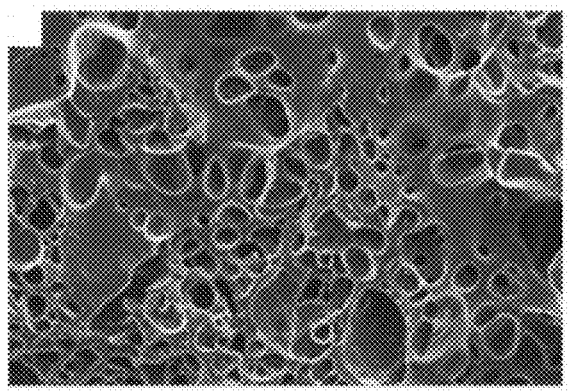
FIG. 8E is an exemplary SEM image of an example carbon foam produced from the pyrolysis of cellulose in glass test tubes at about 10.5 MPa according to at least one embodiment of the present disclosure.
Figure 8F:
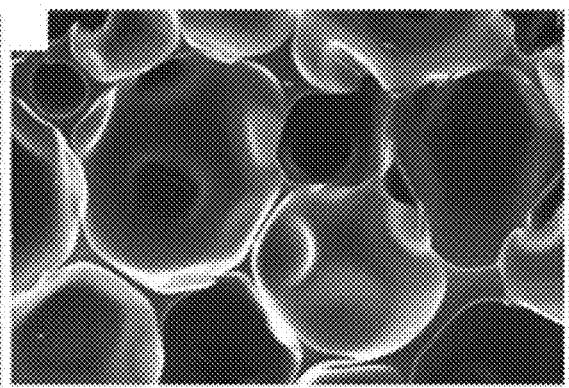
FIG. 8F is an exemplary SEM image of an example carbon foam produced from the pyrolysis of lignin in glass test tubes at about 10.5 MPa according to at least one embodiment of the present disclosure.

FIGS. 8D, 8E, and 8F show exemplary SEM images of example carbon foams produced from xylan, cellulose, and lignin, respectively, pyrolyzed at about 10.5 MPa. For these carbon foams shown in FIGS. 8D-8F, the biomass constituents were placed in glass test tubes, and pyrolyzed under similar conditions as Ex. 631-633. These SEM images confirmed that pyrolysis of each of the biomass constituents resulted in production of carbon foams, though the carbon foams had differing morphologies.

The SEM image of FIG. 8D indicates that the pyrolysis of xylan produced a carbon foam that exhibited significantly fewer visible pores than most other feedstocks and appeared most similar to miscanthus, which has a high hemicellulose (xylan) content of about 25.4% by mass compared to, for example, about 20.3% by mass in pinewood. The SEM image of FIG. 8E indicates that the pyrolysis of cellulose produced a carbon foam visually similar to the carbon foam produced from corn stover, with the cellulose-derived foam exhibiting many pores with a diameter of about 50 μm. The SEM image of FIG. 8F indicates that the pyrolysis of lignin produced a carbon foam composed of thin-walled, smooth, and spherical pores in the range of about 50 μm to about 200 μm. This bubble-like morphology of the lignin-derived carbon foam resembles the morphology present in pine-derived carbon foam (FIG. 8C). It is believed that the similarity between these foams may be attributable to the high lignin content of Lodgepole pine (pine).

Moreover, of the three tested lignocellulose feedstocks, Lodgepole pine has the highest lignin content, typically about 27% by mass, compared to about 23% by mass and about 18% by mass for miscanthus and corn stover, respectively. Additionally, the similarities in temperature profiles and foams generated from the three lignocellulosic feedstocks (corn stover, miscanthus, and Lodgepole pine) and their lignocellulose constituents (xylan, cellulose, and lignin) indicate that high-pressure pyrolysis can generate carbon foams from a diverse range of feedstocks, despite the differences in composition of these lignocelluloses.

Mechanistic insights into carbon foam formation under high-pressure pyrolysis conditions were achieved through monitoring of feedstock temperature during pyrolysis and evaluation of carbon foam production from major lignocellulose constituents: hemicellulose (xylan), cellulose, and lignin. As described above, the temperature profiles (FIGS. 6A-6D) indicated exothermic pyrolysis at all conditions, and suggested that pyrolysis becomes increasingly exothermic as pressure is increased. Taken together with the observed liquefaction and porous structure that results from pyrolysis, the formation of carbon foam and exothermicity may be attributed to the devolatilization process under elevated pressures.

At ambient pressure, volatile products that evolve during pyrolysis exist primarily in the gas phase. Without being bound by theory, it is believed that these volatile compounds can accumulate in pockets of the biomass structure, eventually building to sufficient pressures to rupture the cells of the biomass and release the volatile species. Such a process can be quite violent and can result in the physical disruption of the biomass structure as high velocity jets of pyrolysis products exit biomass pores. Volatile species can then be swept away by purge gases with minimal time to react either with themselves or with the remaining solid fraction. When pyrolysis is conducted at elevated pressures, species that would exist in the gas phase at ambient pressure may now exist in the liquid phase at greatly increased densities and concentrations. The increased densities and residence times of these liquid species may promote secondary pyrolysis reactions whereby the liquid species react either with themselves or with the remaining solid fraction to produce secondary char. These secondary pyrolysis reactions are believed to be highly exothermic and can dramatically increase the heat released during pyrolysis. Additionally, it has been suggested that when volatile products remain in the liquid phase at high pressure, the energy that would have been used to vaporize these products at lower pressure heats the biomass instead, further increasing the exothermicity of the pyrolysis process.

These mechanistic insights may be supported by findings of previous studies. One study showed that the heat released during the pyrolysis of cellulose changed from endothermic (117 J/g) at 0.1 MPa to exothermic (−105 J/g) when the pressure was increased to 2.5 MPa under low purge-flow conditions. As the purge flow increased, the heat of pyrolysis became more endothermic or less exothermic at all pressures due to purge gases sweeping volatiles away from solid cellulose and char, thereby reducing secondary reactions. Similarly, a separate study found that the heat of pyrolysis of corn stover became more exothermic, decreasing from −50 J/g to −272 J/g, as the pressure was increased from 0.1 MPa to 4 MPa. These previous studies examined samples with masses less than 13 mg and were constrained to specified heating rates (5° C./min or 10° C./min, respectively) over the tested temperature ranges.

Notably, the samples tested in the present application were much larger (approximately 6 g in mass) and generated sufficient heat to produce the thermal runaways evidenced by the temperature spikes in FIGS. 6A-6D. While the prescribed heating rate in the examples was about 10° C./min, the pellets experienced heating rates of up to about 17° C./s during exothermic temperature spikes.

The SEM images indicated that corn stover pyrolyzed at pressures of about 3.5 MPa or more, and all feedstocks and biomass constituents pyrolyzed at about 10.5 MPa, passed through a liquid phase before forming a carbon foam. While xylan and lignin are known to readily melt, the degree to which cellulose and lignocellulosic biomass pass through a liquid phase, or melt, during pyrolysis remains controversial. The lack of agreement may be attributable to the difficulty of observing lignocellulose during pyrolysis and the impacts of diverse variables including feedstock composition and processing, maximum temperature, heating rate, gas environment, pressure, and others. Biomass melting has been most commonly reported when biomass has been subjected to high heating rates, typically $10^{3°}$ C./s and greater, at ambient pressure. Melting has also been shown to occur at moderate heating rates when biomass is pyrolyzed at elevated pressure. For example, it has been demonstrated that pine and eucalyptus melt when pyrolyzed at 2 MPa and a moderately high heating rate of 500° C./s. It has also been demonstrated that oak will melt when pyrolyzed at 2.17 MPa, although the heating rate was not specified. Additionally, it has been demonstrated that wheat straw pyrolyzed at 0.45 MPa and a heating rate of 12° C./s shows no evidence of melting, suggesting that pressures greater than 0.45 MPa are necessary for melting at slow heating rates.

The presence of a liquid phase may be necessary for production of monolithic carbon foams, and biochar is produced instead of carbon foam when the feedstock does not melt. Additionally, it is believed that in the present application, all of the tested biomass constituents and feedstocks passed through a liquid phase during the pyrolysis process at tested pressures of about 3.5 MPa and above (corn stover) and at about 10.5 MPa (all feedstocks). The applied heating rate of about 0.17° C./s increased to at least about 9° C./s during the exothermic spike that each feedstock exhibited under foaming conditions. Thus, this heating rate is lower than has been previously applied to demonstrate melting in biomass, suggesting that both heating rate and pressure is important to achieving biomass melting.

The mass yields of solid, liquid, and gas products from high-pressure pyrolysis were determined and are shown in FIGS. 9A-9C. The mass yields can aid in characterizing the products of high-pressure pyrolysis. Specifically, FIG. 9A shows exemplary product yields, by mass, of the pyrolysis of corn stover at about 0.1 MPa (ambient), about 3.5 MPa, about 7.0 MPa, and about 10.5 MPa. As shown in FIG. 9A, the mass yield of solid products increased from about 43±2% at ambient pressure to about 51±4% at about 10.5 MPa. The mass yields of liquid products decreased from about 34±1% (at ambient pressure) to about 24±1% at (about 10.5 MPa). The mass yields of permanent gases were indirectly measured by difference based on mass balance, and the mass yields of gas products were calculated to be in the range of about 23% to about 25% at all tested pressures. Previous studies have demonstrated that higher pyrolysis pressures tend to increase solid yields, while the effects on the yields of the liquid products and gas products are less clear. While not wishing to be bound by theory, it is believed that the dependence of solid product yields on pressure can be attributed to many pyrolysis products existing in the gas phase at ambient pressure and typical pyrolysis temperatures utilized. Additionally, these gas products may be swept away by the purge gases with minimal possibility to react either with themselves or with biomass solids. The data may also indicate that at elevated pressures, more of the gas products exist in the liquid phase and these liquids have increased residence times inside of the biomass pores. Thus, the increased residence time may promote secondary reactions of liquid product species with themselves and with biomass solids. These secondary reactions can include cracking of liquids to produce solid products and gas products, thereby increasing the yields of solid products.

FIG. 9B shows exemplary product yields, by mass, of products formed from the pyrolysis of corn stover, miscanthus, and Lodgepole pine (pine) at about 510° C. and about 10.5 MPa. The mass yields of solid products from pyrolysis, which were in the form of carbon foams for all feedstocks, were determined to be about 34±1%, about 39±1%, and about 38±2% for corn stover, miscanthus, and pine, respectively. The mass yields of liquid products from pyrolysis were determined to be about 27±1%, about 27±0.2%, and about 31±1% for corn stover, miscanthus, and pine, respectively. The mass yields of gas products from pyrolysis were found to be about 38±2%, about 34±1%, and about 31±1% for corn stover, miscanthus, and pine, respectively. Overall, the mass yields of solid and liquid products of the three feedstocks were quite similar despite differences in the compositions of feedstocks.

The results shown in FIGS. 9A and 9B also indicated that the mass yields of solid, liquid, gas products from the pyrolysis (at about 10.5 MPa and about 510° C.) of corn stover can vary depending on whether the corn stover is contained in foil (FIG. 9A) or contained in glass test tubes (FIG. 9B). The pyrolysis conditions were otherwise identical. For the pyrolysis of corn stover contained in foil, the mass yields of solid products, liquid products, and gas products were about 51±2%, about 23±1%, and about 25±3%, respectively, as shown in FIG. 9A. When using glass test tubes to contain the corn stover, the mass yields of solid products, liquid products, and gas products from the pyrolysis of corn stover was found to be about 34±2%, about 27±1%, and about 38±3%, respectively. The significantly higher yield of solid products may be due to the foil improving retention of the pyrolysis products and promoting secondary reactions because, e.g., the foil was wrapped around corn stove pellets and folded at the ends, in contrast to containment of the corn stover in open test tubes.

FIG. 9C shows exemplary product yields, by mass, of products formed from the pyrolysis of various biomass constituents at about 510° C. and about 10.5 MPa. The biomass constituents tested included cellulose, xylan, and lignin. The pyrolysis of cellulose and xylan provided similar mass yields of solid products of about 34±1% and about 32±4%, respectively, while the pyrolysis of lignin showed a higher mass yield of solid products at about 60±2%. All solid products were carbon foams at the tested conditions. The mass yields of liquid products from the pyrolysis of cellulose and xylan were also similar at about 37±1% and about 35±1%, respectively, while the yield of liquid products from the pyrolysis of lignin was found to be about 18±2%. The yields of gas products from the pyrolysis of cellulose, xylan, and lignin were about 29±1%, about 34±4%, and about 22±3%, respectively.

Previous studies have shown that the mass yield of solid products from the pyrolysis of cellulose increases with pressure, reaching a mass yield of solid products of between 17% and 22% at the maximum tested pressure of 2.5 MPa, depending on the flow rate of inert gas. In contrast, the higher mass yield of solid products formed from the pyrolysis of cellulose described herein, about 34±1% shown in FIG. 9C, may be due to the significantly higher pyrolysis pressures of 10.5 MPa used here. The higher mass yield of solid products formed from the pyrolysis of cellulose may also be due to the larger sample size used for pyrolysis, as cellulose char yields during pyrolysis can be dependent on the starting mass of cellulose.

Mechanical properties such as bulk density and ultimate compressive strength of pyrolysis products, e.g., carbon foams and biochar, were also determined. FIG. 10A shows exemplary data for the bulk densities of biochar and carbon foams formed from the pyrolysis of corn stover at about 510° C. and at various pressures. As discussed above, biochar was a significant product formed from the pyrolysis at ambient pressure (about 0.1 MPa) while carbon foam was a significant product formed from the pyrolysis at higher pressures.

The biochar produced from pyrolysis at about ambient pressure had a bulk density of about 0.53±0.01 g/mL while the carbon foam produced at about 3.5 MPa had a significantly lower bulk density of about 0.32±0.03 g/mL. Increasing the pyrolysis pressure to about 7.0 MPa further reduced the bulk density of the carbon foam to about 0.24±0.02 g/mL, and the bulk density of the carbon foam remained approximately constant at about 0.24 g/mL when the pyrolysis pressure was increased to about 10.5 MPa.

FIG. 10A also shows exemplary data of the ultimate compressive strength of products formed from the pyrolysis of corn stover at various pressures. The ultimate compressive strength of biochar produced from the pyrolysis of corn stover at about ambient pressure was found to be about 3.8±1.6 MPa, while the ultimate compressive strength of carbon foams produced at pyrolysis pressures of about 3.5 MPa, about 7.0 MPa, and about 10.5 MPa were determined to be about 0.6±0.2 MPa, about 0.4±0.2 MPa, and about 0.3±0.1 MPa, respectively. When subjected to the compressive loading for the ultimate compressive strength tests, the biochar produced at a pyrolysis pressure of about 0.1 MPa deformed plastically at low stress levels and had a relatively high ultimate stress at an engineering strain of approximately 30%. The carbon foams produced at all pyrolysis pressures demonstrated brittle failure at a low strain of approximately 3%, with significant cracking and lower ultimate strengths compared to the biochar. The data indicates that there can be a step change from biochar to carbon foam when changing the pyrolysis pressure from ~0.1 MPa to ~3.5 MPa.

FIG. 10B shows exemplary data of the bulk densities and ultimate compressive strengths of carbon foams produced from the pyrolysis of corn stover, miscanthus, and pine. The pyrolysis conditions for the data in FIG. 10B included a temperature of about 510° C. and a pressure of about 10.5 MPa. The bulk densities of the carbon foams varied between about 0.2 g/mL and about 0.3 g/mL. The ultimate compressive strengths varied widely with the pine-derived foams showing the greatest compressive strength of about 1.3±0.3 MPa, followed by corn stover-derived foams at about 0.4±0.2 MPa, and miscanthus-derived foams at about 0.07±0.04 MPa. It is believed that the low compressive strength of miscanthus-derived foams are reflective of qualitative observations of low structural integrity for these foams.

FIG. 10C shows exemplary data of the bulk densities and ultimate compressive strengths of carbon foams produced from the pyrolysis of various biomass lignocellulose constituents feedstocks—cellulose, xylan, and lignin. The pyrolysis conditions for the data in FIG. 10C included a temperature of about 510° C. and a pressure of about 10.5 MPa.

The bulk densities of carbon foams produced from the three biomass constituents were determined to be similar at about 0.35±0.03 g/mL for cellulose-derived foams, about 0.29±0.06 g/mL for xylan-derived foams, and about 0.27±0.03 g/mL for lignin-derived foams. Ultimate compressive strengths were also found to be similar at about 1.7±0.3 MPa for cellulose-derived foams, about 1.4±0.8 MPa for xylan-derived foams, and about 2.1±0.7 MPa for lignin-derived foams. Overall, despite significant differences in the chemical makeup of the different constituents, the bulk densities and ultimate compressive strengths of produced foams were found to be highly similar. Prior work illustrates that carbon foams produced from coal and petroleum-derived precursors have compressive strengths ranging from 2.5 MPa to 18.7 MPa.

Embodiments described herein enable the production of carbon foams from biomass via high-pressure pyrolysis. The carbon foams described herein can be useful in various applications such as battery technology. The carbon foams can have sulfur particles or silicon particles within pores of the carbon foam. Such doped carbon composites/foams can be utilized as at least a portion of an electrode.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a layer" include aspects comprising one, two, or more layers, unless specified to the contrary or the context clearly indicates only one layer is included.

Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described are merely illustrative and are not considered elements or limitations of the appended claims except where explicitly recited in a claim (s). Likewise, reference to "the disclosure" shall not be construed as a generalization of any inventive subject matter disclosed herein and shall not be considered to be an element or limitation of the appended claims except where explicitly recited in a claim(s).

While the foregoing is directed to embodiments of the present disclosure, other and further embodiments of the disclosure may be devised without departing from the basic scope thereof, and the scope thereof is determined by the claims that follow.

What is claimed is:

1. A process for forming a carbon foam, comprising:
   processing lignocellulosic biomass into a feedstock, the feedstock comprising a plurality of particles having a particle size of about 30 μm to about 1 mm, the feedstock further comprising a sulfur source, a silicon source, or a combination thereof different from the lignocellulosic biomass;
   loading the feedstock into a reactor, the reactor disposed inside a furnace;
   pyrolyzing the feedstock to form the carbon foam, comprising:
   pressurizing the reactor with $CO_2$, $N_2$, $H_2O$, or combinations thereof, the $CO_2$, $N_2$, $H_2O$, or combinations thereof in a supercritical state or subcritical state, the pressure of the reactor is from about 4.1 MPa to about 10.5 MPa;
   contacting the feedstock with the $CO_2$, $N_2$, $H_2O$, or combinations thereof;
   heating the furnace at a heat rate of about 10° C./min to about 50° C./min until the reactor reaches a specified temperature of about 450° C. to about 550° C.; and
   exposing the reactor to the specified temperature for a period of about ten minutes to about 1 hour to form the carbon foam; and
   collecting a bio-oil during or after exposing the reactor to the specified temperature for a period of about ten minutes to about 1 hour, wherein the carbon foam has:
   a bulk density of about 0.2 g/mL to about 0.6 g/mL;
   a plurality of pores, the pores having an average pore diameter of about 20 μm to about 200 μm;
   an ultimate compressive strength of about 0.1 MPa to about 20 MPa;
   an electrical conductivity of about $1 \times 10^{-8}$ to about $9 \times 10^5$ S/m; or
   combinations thereof.

2. The process of claim 1, wherein the feedstock is formed into pellets prior to pyrolyzing the feedstock.

3. The process of claim 1, wherein pressurizing the reactor is performed at a pressure such that the $CO_2$, $N_2$, $H_2O$, or combinations thereof is in the supercritical state.

4. The process of claim 1, wherein pressurizing the reactor is performed at a pressure such that the $CO_2$, $N_2$, $H_2O$, or combinations thereof is in the subcritical state.

5. The process of claim 1, further comprising heat treating the carbon foam at a temperature of about 700° C. to about 1100° C. after pyrolyzing the feedstock to form a heat treated carbon foam.

6. A process for forming a carbon foam, comprising:
   processing lignocellulosic biomass into a feedstock, the feedstock comprising a plurality of particles having a particle size of about 30 μm to about 1 mm, the feedstock further comprising a sulfur source, a silicon source, or a combination thereof different from the lignocellulosic biomass;
   loading the feedstock into a reactor, the reactor disposed inside a furnace; and
   pyrolyzing the feedstock to form the carbon foam, comprising:
   pressurizing the reactor with $CO_2$, $N_2$, $H_2O$, or combinations thereof, the $CO_2$, $N_2$, $H_2O$, or combinations thereof in a supercritical state or subcritical state, the pressure of the reactor is from about 4.1 MPa to about 10.5 MPa;
   contacting the feedstock with the $CO_2$, $N_2$, $H_2O$, or combinations thereof;
   heating the furnace at a heat rate of about 10° C./min to about 50° C./min until the reactor reaches a specified temperature of about 450° C. to about 550° C.; and exposing the reactor to the specified temperature for a period of about ten minutes to about 1 hour to form the carbon foam.

7. The process of claim 6, wherein the feedstock further comprises a surfactant.

8. The process of claim 6, further comprising heat treating the carbon foam at a temperature of about 700° C. to about 1100° C. after pyrolyzing the feedstock to form a heat treated carbon foam.

9. A process for forming a carbon foam, comprising:
processing biomass into a feedstock, the feedstock comprising a plurality of particles having a particle size of about 30 µm to about 1 mm, wherein the feedstock further comprises a sulfur source, a silicon source, or a combination thereof, the sulfur source, silicon source, or combination thereof different from the biomass;
loading the feedstock into a reactor, the reactor disposed inside a furnace; and
pyrolyzing the feedstock to form the carbon foam, comprising:
pressurizing the reactor with $CO_2$, $N_2$, $H_2O$, or combinations thereof at a pressure such that the $CO_2$, $N_2$, $H_2O$, or combinations thereof is in a subcritical state;
contacting the feedstock with the $CO_2$, $N_2$, $H_2O$, or combinations thereof;
heating the furnace at a heat rate of about 10° C./min to about 50° C./min until the reactor reaches a specified temperature of about 450° C. to about 550° C.; and
exposing the reactor to the specified temperature for a period of about ten minutes to about 1 hour to form the carbon foam.

10. The process of claim 9, wherein the feedstock further comprises a surfactant.

11. The process of claim 9, further comprising heat treating the carbon foam at a temperature of about 700° C. to about 1100° C. after pyrolyzing the feedstock to form a heat treated carbon foam.

12. A process for forming a carbon foam, comprising:
processing biomass into a feedstock, the feedstock comprising a plurality of particles having a particle size of about 30 µm to about 1 mm, wherein the feedstock further comprises a sulfur source, a silicon source, or a combination thereof, the sulfur source, silicon source, or combination thereof different from the biomass;
loading the feedstock into a reactor, the reactor disposed inside a furnace;
pyrolyzing the feedstock to form the carbon foam, comprising:
pressurizing the reactor with $CO_2$, $N_2$, $H_2O$, or combinations thereof, the $CO_2$, $N_2$, $H_2O$, or combinations thereof in a supercritical state or subcritical state, the pressure of the reactor is from about 4.1 MPa to about 10.5 MPa;
contacting the feedstock with the $CO_2$, $N_2$, $H_2O$, or combinations thereof;
heating the furnace at a heat rate of about 10° C./min to about 50° C./min until the reactor reaches a specified temperature of about 450° C. to about 550° C.; and
exposing the reactor to the specified temperature for a period of about ten minutes to about 1 hour to form the carbon foam; and
heat treating the carbon foam at a temperature of about 700° C. to about 1100° C. after pyrolyzing the feedstock to form a heat treated carbon foam.

13. The process of claim 12, wherein the feedstock further comprises a surfactant.

* * * * *